United States Patent [19]
Hatanaka et al.

[11] Patent Number: 5,638,407
[45] Date of Patent: Jun. 10, 1997

[54] INVERSION PREVENTION DEVICE

[75] Inventors: Keiji Hatanaka; Yoshiyuki Shirasaki, both of Nagaokakyo, Japan

[73] Assignee: Mitsubishi Denki Kabushiki Kaisha, Tokyo, Japan

[21] Appl. No.: 221,394

[22] Filed: Mar. 31, 1994

[30] Foreign Application Priority Data

| Apr. 1, 1993 | [JP] | Japan | 5-075685 |
| Apr. 28, 1993 | [JP] | Japan | 5-102616 |
| Dec. 10, 1993 | [JP] | Japan | 5-310465 |

[51] Int. Cl.$^6$ ........................ H03D 3/18
[52] U.S. Cl. .............. 375/328; 375/342; 375/351; 329/318; 455/48; 455/303
[58] Field of Search ................ 375/322, 324, 375/328, 340, 342, 346, 349, 350, 351, 323; 329/318; 455/48, 202, 303–305

[56] References Cited

U.S. PATENT DOCUMENTS

| 4,862,099 | 8/1989 | Nakai et al. . | |
| 4,906,942 | 3/1990 | Nakai et al. . | |
| 4,910,799 | 3/1990 | Takayama | 455/304 |
| 5,185,679 | 2/1993 | Mishima et al. . | |
| 5,222,106 | 6/1993 | Satoh et al. | 455/303 |
| 5,375,143 | 12/1994 | Kazecki et al. | 375/349 |

FOREIGN PATENT DOCUMENTS

| 60-216681 | 10/1985 | Japan . |
| 62-219372 | 9/1987 | Japan . |

*Primary Examiner*—Stephen Chin
*Assistant Examiner*—Don Vo

[57] ABSTRACT

An inversion prevention device to prevent inversion and provide the best S/N ratio detects a point where the zero crossing is missing from a quantized FM signal. An output is provided by switching between the digital FM signal and the output signal of at least one sideband suppression filter based on a result of the inversion detection. Alternatively, an output is provided by switching between the digital FM signal and a specified value based on a result of the inversion detection. As a further alternative, an output is provided by switching between the digital FM signal, the output signal of a low-sideband emphasis filter and the output signal of a sideband suppression filter based on a result of the inversion detection.

54 Claims, 68 Drawing Sheets

INVERSION PREVENTION DEVICE

BACKGROUND OF THE INVENTION

1. Field of the invention

The present invention relates to an inversion prevention device to prevent inversion of FM signals.

2. Description of Related Art

When the point where an FM signal crosses the zero-level disappears, there happens the phenomenon that the demodulation signal of the FM signal being the white level in itself drops to the black level. This phenomenon is called as "inversion" hereinbelow.

As a generally known inversion prevention device of the prior art, there is a device called a double limiter. For example, FIG. 1 shows a block circuit diagram of a double limiter which is a conventional inversion prevention device disclosed in the Japanese Patent Application Laid-Open No. 62-219372 (1987). In FIG. 1, numeral 601 denotes an input terminal for reproduced FM signal. The FM signals are inputted to a high-pass filter (hereinafter called LPF) 602 and to a low-pass filter (hereinafter called LPF) 605 via the input terminal 601. The HPF 602 passes carrier wave component of the input FM signals and significantly attenuates lower sideband componet, then outputs the resultant signals to a limiter 603. The limiter 603 eliminates a difference in the amplitudes of the input signals arid sends sinusoidal output signals having a constant amplitude to a phase compensator 604. The phase compensator 604 compensates the phase of the input signals and outputs the compensated signals to a synthesizer 606. On the other hand, the LPF 605 attenuates the carrier wave component of the input FM signals sufficiently and outputs the resultant signals to the synthesizer 606. The synthesizer 606 synthesizes both input signals and outputs the synthesized signals to a limiter 607. The limiter 607 regulates the amplitude to a constant level to prevent the demodulated output from the FM demodulator later at a later stage from being distorted by AM component, then outputs the FM signals via an outpost terminal 608.

In the conventional inversion prevention device in such a constitution as described above, carrier wave component is amplified until a specified amplitude is obtained by the limiter 603 (at a cost of decreased S/N ratio) in a portion of the input FM signals where the carrier wave component is so small that an inversion is likely to occur, thus FM signals wherein only the carrier wave component is amplified and which are not susceptible to inversion are obtained at the output terminal of the synthesizer 606. In a portion of the input FM signals where the carrier wave component is large enough to prevent an inversion, the carrier wave component attains the specified amplitude without being subject to significant amplification by the limiter 603 (therefore the S/N ratio does not decrease), and consequently FM signals substantially equal to the input FM signals are obtained at the synthesizer 606. Therefore FM signals free from inversion are always outputted.

An example of a digital signal processing circuit which achieves the same functions of the inversion prevention device described above to deal with digital FM signals which are quantized is disclosed in the Japanese Patent Application Laid-Open No. 62-219372 (1987), with its block circuit, diagram being shown in FIG. 7.

This device handles digital FM signals which are quantized FM signals as an input and output. Numeral 701 in FIG. 7 denotes an input terminal for the digital FM signals. The digital FM signals are inputted to a HPF 702 and a LPF 706 via an input terminal 701. The HPF 702 outputs carrier wave component to an amplitude detector 704 and a divider 705 provided in a limiter 703 which regulates the amplitude of the output from the HPF 702 to a constant level. The amplitude detector 704 outputs the amplitude signal which represents the amplitude of the output signal of the HPF 702 to the divider 705. The divider 705 divides the output signal from the HPF 702 by the amplitude signal from the amplitude detector 704, and outputs the carrier wave component of a constant amplitude to a synthesizer 707. The synthesizer 707 synthesizes the output of the limiter 703 (divider 705) and the output, of the LPF 706, while the synthesized digital FM signals are outputted from the outputted terminal 708.

Because it is easy to make the HPF 702 and the LPF 706 operate with linear phase characteristics, a phase corrector is not necessary and the limiter 607 in FIG. 6 has no direct implication to the prevention of inversion and is therefore omitted. The basic operation in the digital inversion prevention device shown in FIG. 7 is similar to that shown in FIG. 6 and therefore the description thereof will be omitted.

However, the conventional device shown in FIG. 7 requires the amplitude detector 704. To construct the amplitude detector 704 requires a quadrature phase shifter which shifts the phase of input X to the amplitude detector 704 by 90° and an arithmetic logic unit which calculates the square root of $(X^2+Y^2)$ by using a signal Y having a phase which is shifted by 90°, leading to a considerably large circuit.

The divider 705 having a circuit substantially larger than the arithmetic logic unit is also required. Moreover, because the output signal of the HPF 702 is a carrier wave component having a large amplitude in contrast to the output signal of the LPF 706 which is the sideband component having a small amplitude, it is necessary to increase the data word length thereof. As a result, circuits of the divider 705 and the amplitude detector 704 become even larger, causing a problem that it is difficult to make a digital inversion prevention device. In addition, while the conventional device has a function of minimizing the deterioration of S/N ratio of the input FM signals, it cannot provide a S/N ratio higher than that of the input FM signals.

SUMMARY OF THE INVENTION

One object of the invention is to provide an inversion prevention device having a small circuit size which can be easily made at a low cost.

Another object of the invention is to provide art inversion prevention device having an effect of improving the S/N ratio beyond that of the input FM signals and is capable of providing FM signals having the best S/N ratio among the signals which do not experience an inversion.

In the inversion prevention device of the invention, an occurrence of inversion is monitored and, according to the result of monitoring, either the input digital FM signals or the output of a sideband suppression filter is selected and is outputted. When the upper sideband and the lower sideband of the FM signals are not balanced, the input digital FM signals are directly outputted in a portion where the carrier wave component has a sufficient amplitude and an inversion is not expected, while the signals are passed through the sideband suppression filter, which is equivalent to relatively increasing the carrier wave component, before being outputted in a portion where the carrier wave component is small and an inversion is expected. Thus digital FM signals free from inversion with minimized deterioration of S/N ratio can be obtained with a device of small circuit size at a low cost.

In another inversion prevention device of the invention, an occurrence of inversion is detected and, according to the result, either the input digital FM signals or a preset specified value is selected and is outputted. When the upper sideband and the lower sideband of the FM signals are not balanced, the input digital FM signals are directly output in a portion where the carrier wave component has a large amplitude and inversion is not expected, while the preset specified value is outputted in a portion where the carrier wave component is small and an inversion is expected. Thus digital FM signals free from inversion with minimized deterioration of picture quality can be obtained with a device of small circuit size at a low cost.

In further another inversion prevention device of the invention, an occurrence of inversion is monitored and, according to the result of monitoring, either the input digital FM signal or the output signals of a plurality of sideband suppression filters having different suppression ratios which suppress either the upper and lower sidebands or the lower sideband is selected and is outputted. When the upper sideband and the lower sideband of the FM signals are not balanced, the input digital signal FM signals are directly outputted in a portion where the carrier wave component has a large amplitude and an inversion is not expected, while the signals are passed through the sideband suppression filter which is free from inversion and has a suppression ratio of sideband as low as possible among the plurality of sideband suppression filters, which is equivalent to relatively increasing the carrier wave component, before the signals are outputted, in a portion where the carrier wave component is small and inversion is expected. Thus digital FM signals free from inversion with minimized deterioration of S/N ratio can be obtained with a device of small circuit size at a low cost.

In further another inversion prevention device of the invention, an occurrence of inversion is detected and, according to the result of detection, either the input digital FM signal, output signals of one or more low-sideband emphasis filters which suppress the upper sideband or emphasize the lower sideband, or the output signals of one or a plurality of sideband suppression filters having different suppression ratios which suppress both the upper and lower sidebands or the lower sideband is selected and is outputted. When it is determined that an inversion does not occur for the output signals of a filter which provides the best S/N ratios, namely the low-sideband maximum emphasis filter having the highest emphasizing ratio, output signals of the low-sideband maximum emphasis filter are output. If it is determined that inversion will occur, detection of inversion is performed on the output signals of the low-sideband emphasis filters having lower emphasizing ratios successively and, when it is determined that inversion does not occur, the output signals are outputted thereupon. When it is determined that inversion will occur in the output signals of all low-sideband emphasis filters, a similar operation is performed to the input digital FM signals. When it is determined that inversion will occur also in this case, a similar operation is performed on the output signals of the suppression filter having the lowest suppression ratio among the sideband suppression filters and, if inversion occurs, a sideband suppression filter having higher suppression ratio is selected thereby eventually the output signals of the sideband suppression filter having the highest effect of suppressing the inversion are outputted. As the result of the above operation, prevention of inversion is made possible with a small size of circuit with a low cost and, for the signals for which the low-sideband emphasis filter is selected, the S/N ratio is improved beyond that of the input digital FM signals, thus making it possible to provide FM signals of the best S/N ratio among the signals in which inversion does not occur.

The above and further objects and features of the invention will more fully be apparent from the following detailed description with accompanying drawings.

DESCRIPTION OF THE PREFERRED EMBODIMENTS

The invention will now be described in detail with reference to the accompanying drawings illustrative of the preferred embodiments.

Embodiments 1 through 13 of the inversion prevention device of the invention will be described below, wherein quantized digital FM signals are input and either the input digital FM signals or the output of the sideband suppression filter which suppresses both the upper and lower sidebands or the lower sideband is selected. Such an inversion prevention device may be constructed either in a constitution wherein a position having no zero-cross point (inversion) is detected by means of both the input digital FM signals and the output signal of the sideband suppression filter, or in a constitution wherein an inversion is detected by means of only the input digital FM signals. Examples of the former constitution will be described in the embodiments 1 through 11, and examples of the latter constitution will be described in the embodiments 12 and 13.

Embodiment 1

Figure 3:
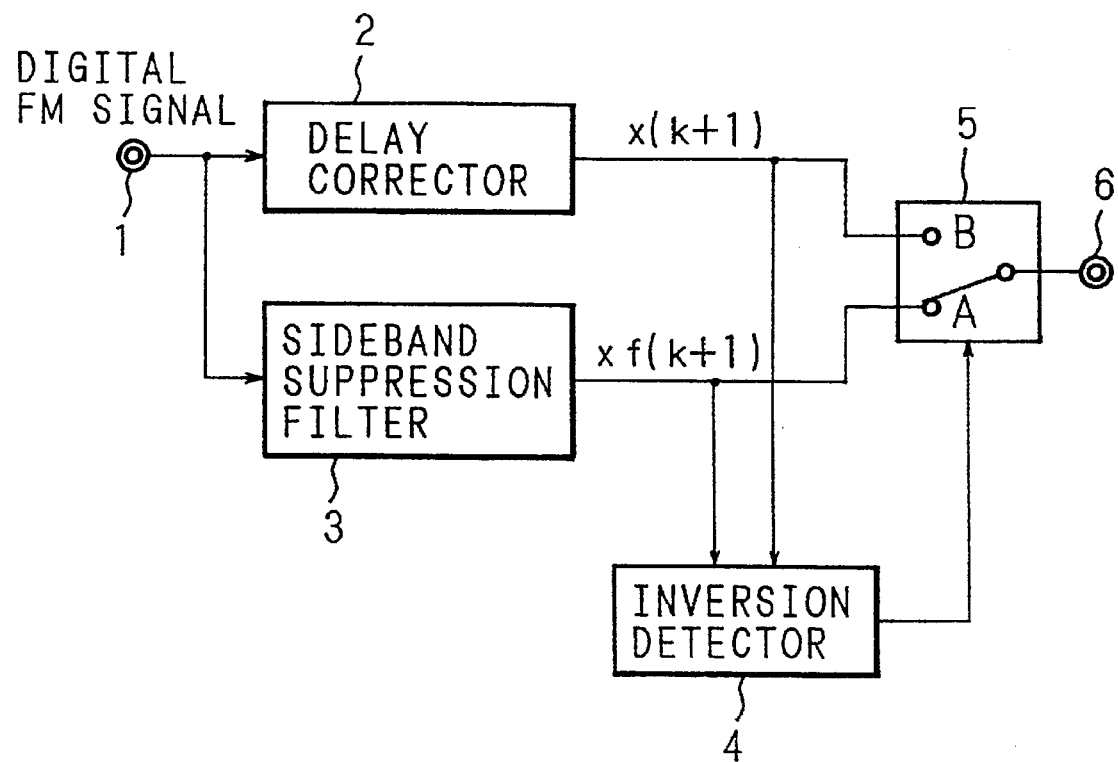
FIG. 3 is a block circuit diagram illustrative of the constitution of inversion prevention devices of the embodiments 1 through 11 of the invention.

FIG. 3 shows the constitution of an inversion prevention device according to the embodiment 1. Numeral 1 in FIG. 3 denotes an input terminal for the digital FM signals. The digital FM signals are inputted via the input terminal 1 to a sideband suppression filter 3 which suppresses either both the upper and lower sidebands or the lower sideband of the digital FM signals, and to a delay corrector 2 which introduces the same delay as the delay time of the output signal from the sideband suppression fitter 3 to the digital signals. The delay corrector 2 outputs the output signal x(k+1) to an inversion detector 4 and an input terminal B of a selector 5. On the other hand, the sideband suppression filter 3 outputs the output signal xf(k+1) to an inversion detector 4 and an input terminal A of the select or 5. At this time, outputs of the delay corrector 2 and of the sideband suppression fitter 3 are signals which are quantized at the same time. The inversion detector 4 checks the presence of inversion based on the outputs from the delay corrector 2 and the sideband suppression filter 3, and outputs 1 to the selector 5 when an inversion is detected and outputs 0 to the selector 5 when an inversion is not detected. The selector 5 selects the terminal A when the output from the inversion detector 4 is 1 and selects the terminal B when it is 0, and outputs the selected digital FM signals to an output terminal 6.

Now the operation in FIG. 3 will be described below. The selector 5 normally selects the terminal B. This means that the input signals to the input terminal 1 are outputted to the output terminal 6 after being delayed in the delay corrector 2. However, only when it is determined by the inversion detector 4 from the outputs of the delay corrector 2 and the sideband suppression filter 3 that demodulation under this condition will cause an inversion, the selector 5 selects the terminal A and signals which passed the sideband suppression filter 3 are outputted to the output terminal 6.

Figure 18:
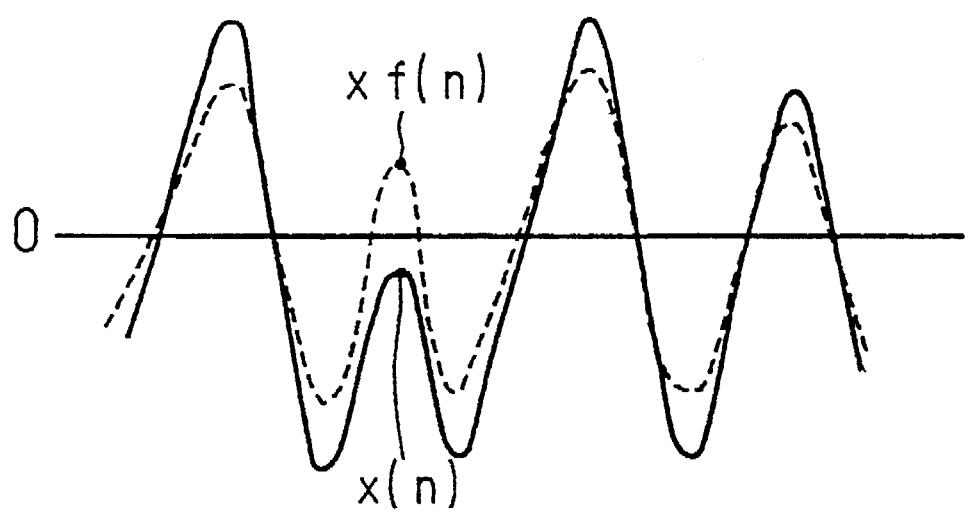
FIG. 18 is a waveform diagram of FM signals explanatory of the operation of the invention.

In FIG. 18, suppose that quantized FM signals indicated by the solid line are inputted to the input terminal 1, then the FM signal does not cross the alternate zero level near the point indicated by x(n) and demodulation under this condition causes an inversion. The output of the sideband suppression filter 3 at this time has a waveform indicated by the dashed line in FIG. 18 where the FM signal crosses the zero level near xf(n) which corresponds to x(n) so that an inversion will not occur upon demodulation. However, although an inversion will not occur, a demodulation output will have a low S/N ratio because the lower sideband having a higher S/N ratio is suppressed.

Figure 19:
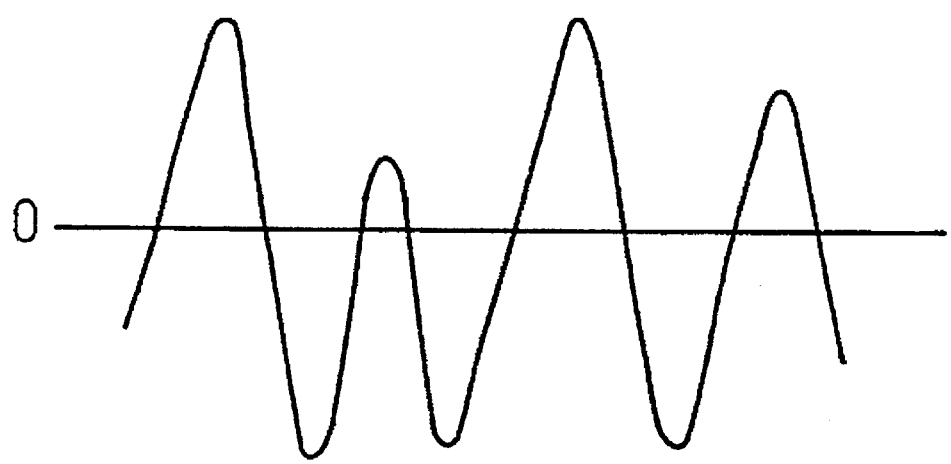
FIG. 19 is a waveform diagram of FM signals explanatory of the operation of the invention.

To avoid the above problem, the waveform indicated by the solid line in FIG. 18 is outputted to perform demodulation, while missing of cross point over the zero level near x(n) is detected by means of the inversion detector 4, thereby replacing only that portion with the waveform indicated by the dashed line near xf(n) and is outputted. Namely, when the FM signals as shown in FIG. 19 (represented by smooth solid curve connecting the quantized signal points) are outputted and demodulated, a demodulated waveform without inversion and significant deterioration of S/N ratio can be obtained because a crossing over the zero level is restored.

Figure 4:
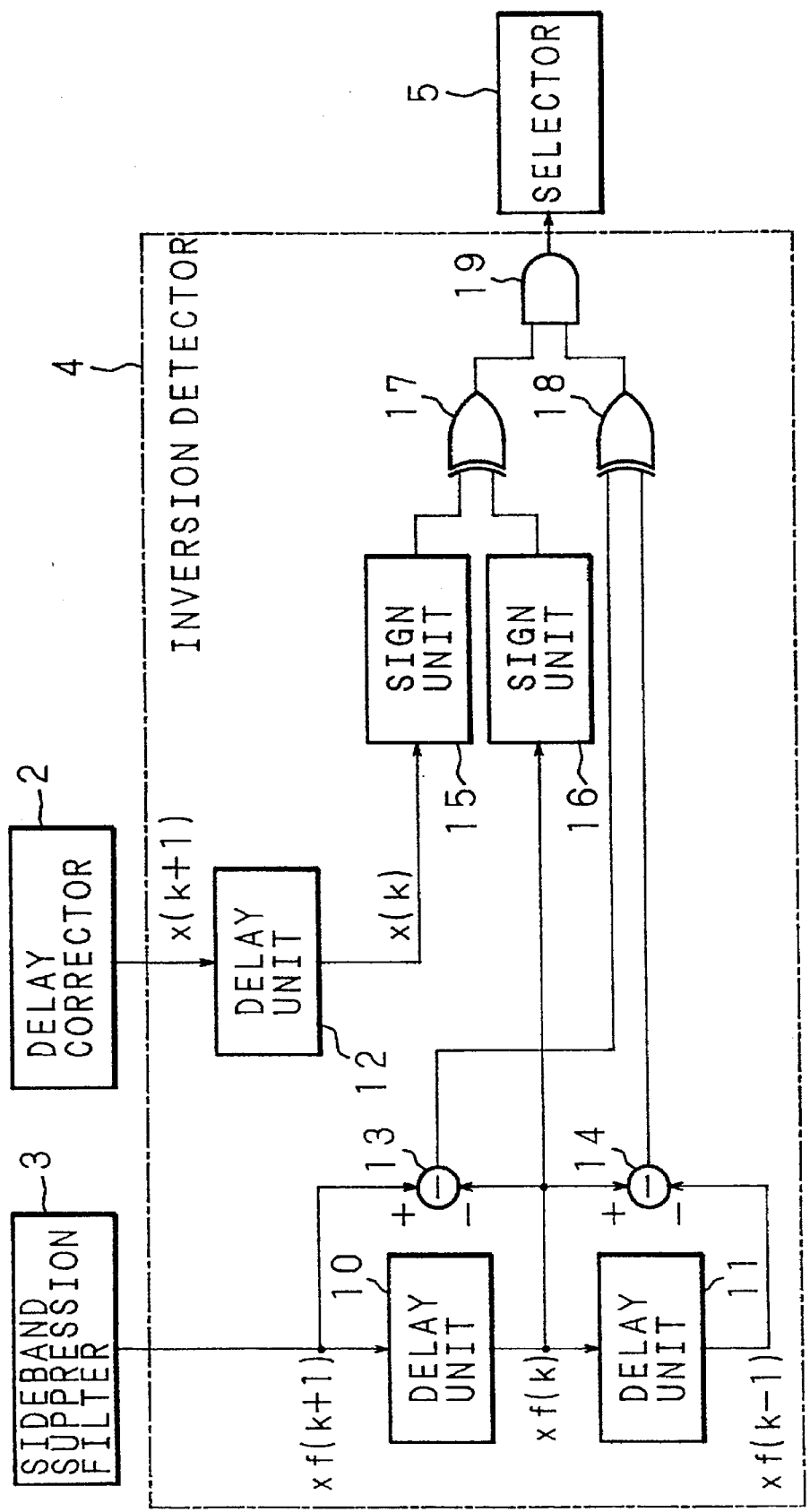
FIG. 4 is a block circuit diagram illustrative of the constitution of inversion prevention devices of the embodiments 1 and 14.

FIG. 4 shows a block circuit diagram of the inversion detector 4 in the first embodiment. Connected to the sideband suppression filter 3 are delay units 10 and 11 in series in this order, to introduce a delay of one sampling clock cycle to the input data. The output side of the delay unit 10 is connected to subtractors 13, 14 and an sign unit 16. The output side of the delay unit 11 is connected to the subtractor 14, and the subtractor 13 is connected to the sideband suppression filter 3. The subtractors 13, 14 are connected to a XOR gate 18. The subtractors 13, 14 carry out subtraction of the outputs of the sideband suppression filter 3 which have a phase difference of one sampling clock cycle and send only the sign of the result of subtraction, namely 1 to the XOR gate 18 when the result of subtraction has a negative sign and send 0 to the XOR gate 18 in other cases. Connected to the delay corrector 2 is a delay unit 12 which introduces a delay of one sampling clock cycle to the input data. The delay unit 12 is connected to a sign unit 15. The sign units 15, 16 are connected to a XOR gate 17 and send only the sign of the input signal, namely 1 to the XOR gate 17 when the input signal has a negative sign and send 0 otherwise. The output sides of the XOR gates 17, 18 are connected to the input side of an AND gate 19, and the output side of the AND gate 19 is connected to the selector 5.

Figure 20A:
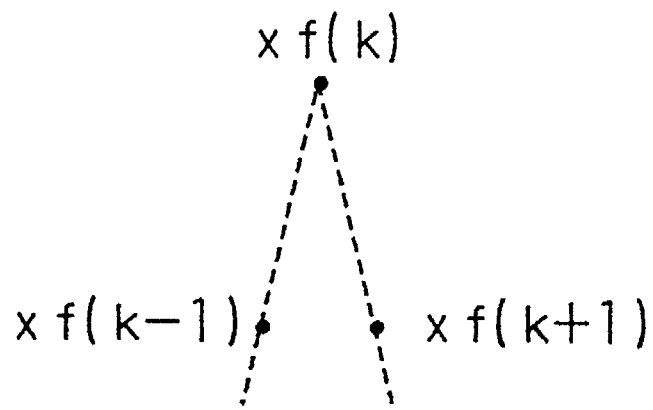
FIGS. 20A and 20B are waveform diagrams of FM signals explanatory of the operation of the invention.
Figure 20B:
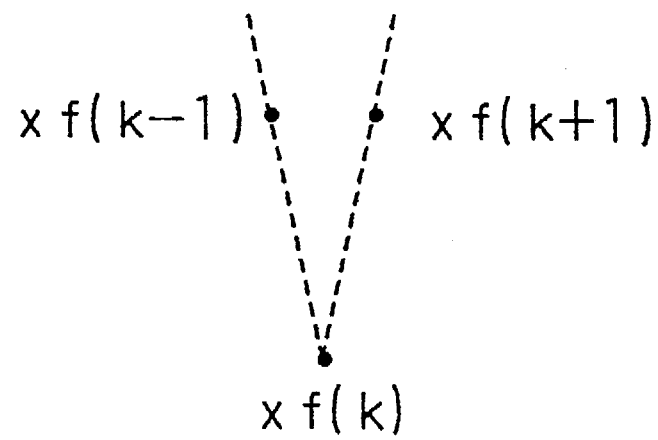
Figure 21A:
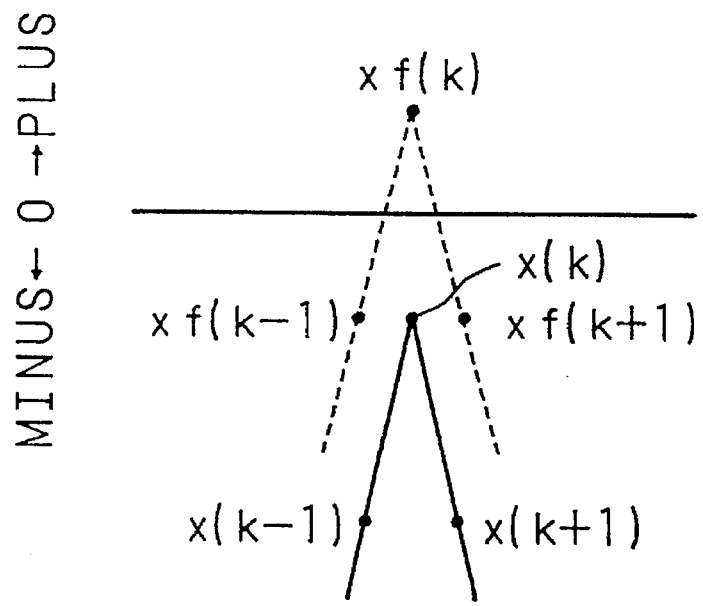
FIGS. 21A and 21B are waveform diagrams of FM signals explanatory of the operation of the invention.
Figure 21B:
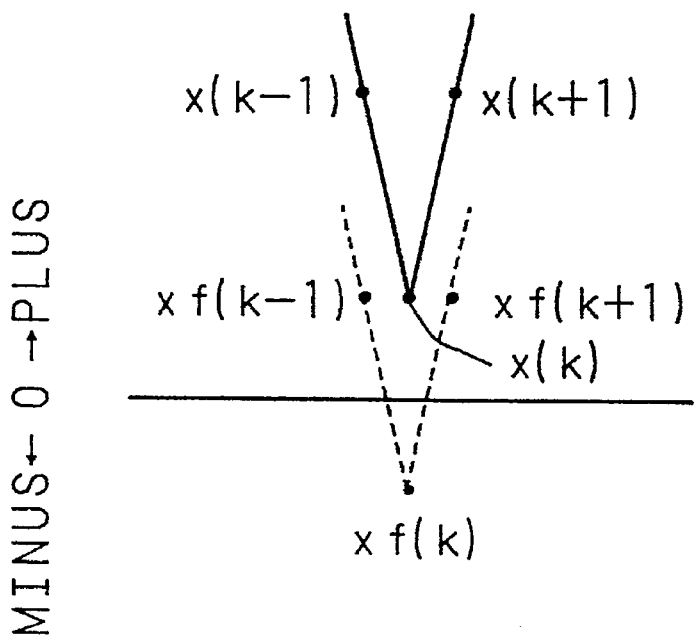

Now the operation will be described below. Let the output of the delay corrector 2 in FIG. 3 be x(k+1), and the output of the sideband suppression filter 3 be xf(k+1), then the XOR gate 18 sends 1 to the AND gate 19 when {xf(k)–xf(k–1)} and {xf(k+1)–xf(k)} have different signs and sends 0 when they have the same sign. That is, the value 1 is outputted when a waveform having a maximum or minimum value at xf(k) as shown in FIG. 20A, 20B is detected. The XOR gate 17 sends 1 to the AND gate 19 when x(k) and xf(k) have different signs, and sends 0 when they have the same sign. Therefore the AND gate outputs 1 when the waveform is as shown in FIG. 21A, 21B and outputs 0 otherwise.

Figure 22A:
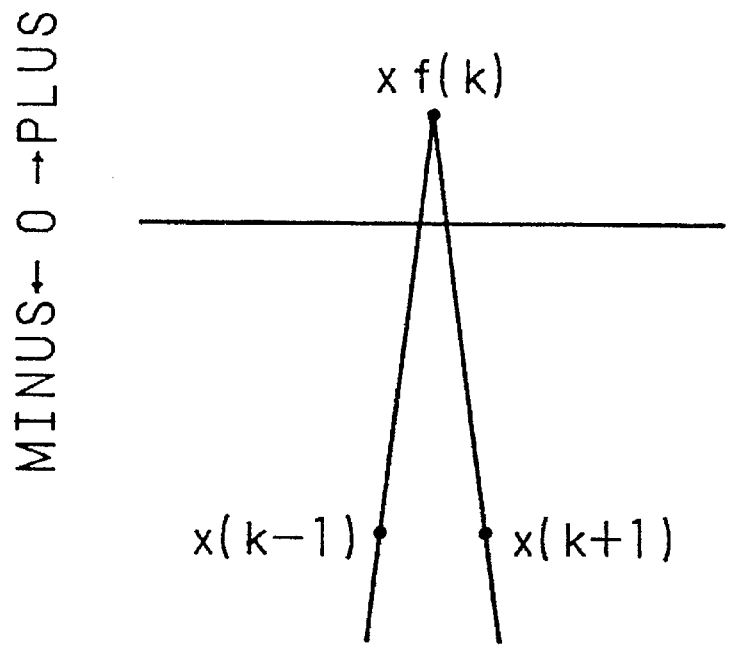
FIGS. 22A and 22B are waveform diagrams of FM signals explanatory of the operation of the invention.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 2

Figure 5:
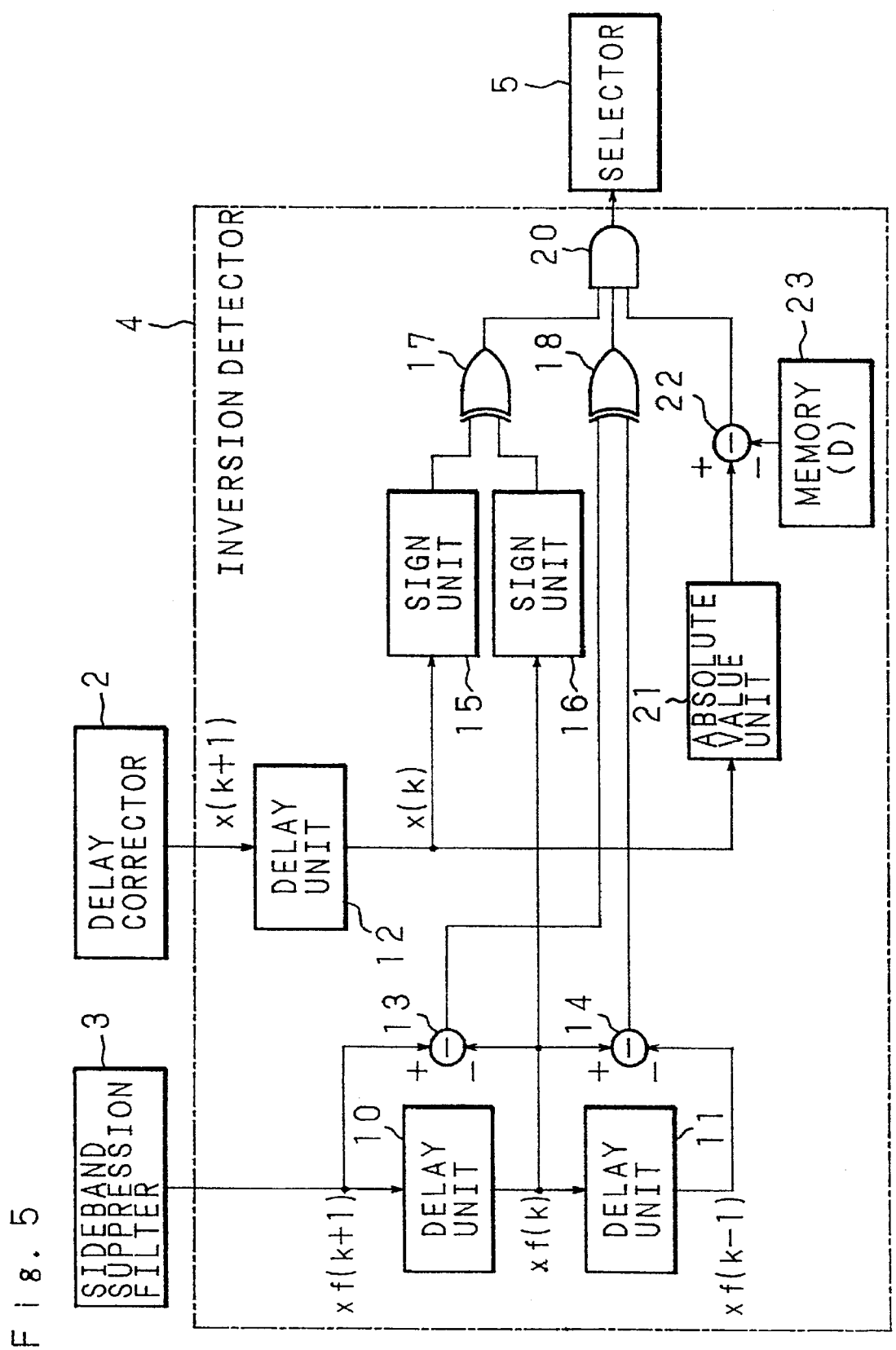
FIG. 5 is a block circuit diagram illustrative of the constitution of inversion prevention devices of the embodiments 2 and 15.

The overall constitution of the inversion prevention device in the second embodiment is the same as that of the first embodiment (FIG. 3) and the operation is also similar to that of the first embodiment, and therefore the description thereof will be omitted. FIG. 5 shows the block circuit diagram of the inversion detector 4 in the second embodiment. In FIG. 5, identical numerals as those in FIG. 4 denote the same components.

The output side of the delay unit 12 is connected to an absolute value unit 21 which provides the absolute value of the input signal and a subtractor 22 in this order. The subtractor 22 is connected to a memory 23 which holds a preset value D. The subtractor 22 subtracts the output of the memory 23 from the output of the absolute value unit 21 and sends only the sign of the result of subtraction, namely 1 to a 3-input AND gate 20 when the result of subtraction has a negative sign and sends 0 otherwise. The AND gate 20 receives the outputs of the XOR gates 17, 18 as inputs. The AND gate 20 sends 1 to the selector 5 only when three inputs thereto are all 1 and sends 0 in other cases.

Now the operation will be described below. The XOR gate 18 sends 1 to the AND gate 20 when $\{xf(k)-xf(k-1)\}$ and $\{xf(k+1)-xf(k)\}$ have different signs and sends 0 when they have the same sign. The XOR gate 17 sends 1 to the AND gate 20 when $x(k)$ and $xf(k)$ have different signs, and sends 0 when they have the same sign. The subtractor 22 sends 1 to the AND gate 20 when $|x(k)|<D$ and sends 0 otherwise. Thus the output of the AND gate 20 becomes 1 when only such a waveform is detected that has a maximum or minimum value at $xf(k)$ as shown in FIG. 20A, 20B at the time k which satisfies $|x(k)|<D$ and the output of the XOR gate 17 is 1. Consequently, the AND gate 20 outputs 1 in the case of waveforms as shown in FIG. 21A, 21B and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 3

Figure 6:
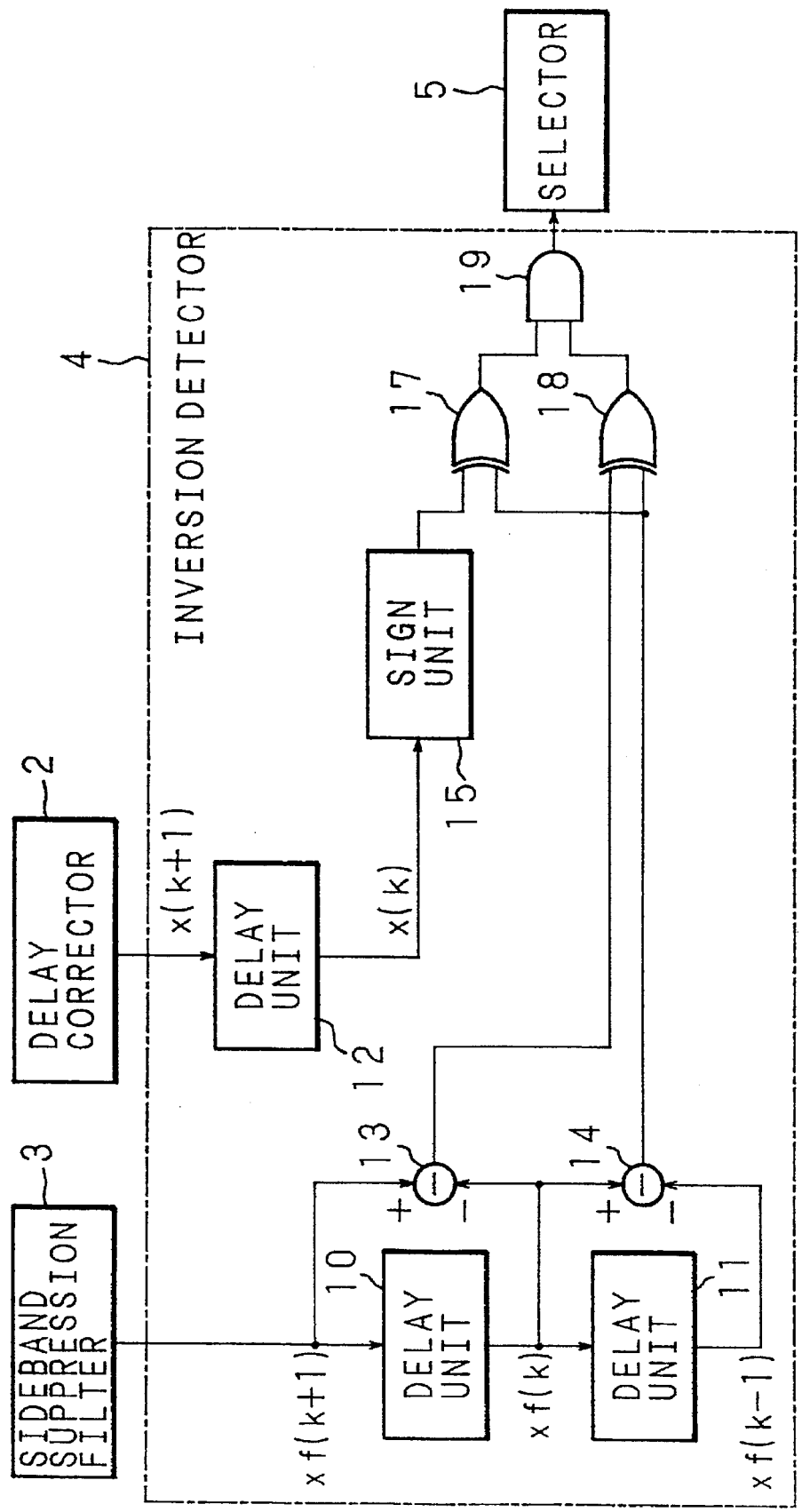
FIG. 6 is a block circuit diagram illustrative of the constitution of inversion prevention devices of the embodiments 3 and 16.

The overall constitution of the inversion prevention device in the third embodiment is the same as that of the first embodiment (FIG. 3) and the operation is also similar to that of the first embodiment, and therefore the description thereof will be omitted. FIG. 6 shows the block circuit diagram of the inversion detector 4 in the third embodiment. In FIG. 6, identical numerals as those in FIG. 4 denote the same components. The constitution shown in FIG. 6 is such that the sign unit 16 is eliminated from the constitution shown in FIG. 4 and the output of the subtractor 14 is inputted to the XOR gate 17.

Now the operation will be described below. The XOR gate 18 sends 1 to the AND gate 19 when $\{xf(k)-xf(k-1)\}$ and $\{xf(k+1)-xf(k)\}$ have different signs, and sends 0 when they have the same sign. Namely, the value 1 is outputted when only such waveforms are detected that have a maximum or minimum value at $xf(k)$ as shown in FIGS. 20A, 20B. The XOR gate 17 sends 1 to the AND gate 19 when $x(k)$ and $\{xf(k)-xf(k-1)\}$ have different signs, and sends 0 when they have the same sign, the AND gate 19 therefore sends 1 to the selector 5 when the waveform as shown in FIG. 21A, 21B is detected, and sends 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 4

Figure 7:
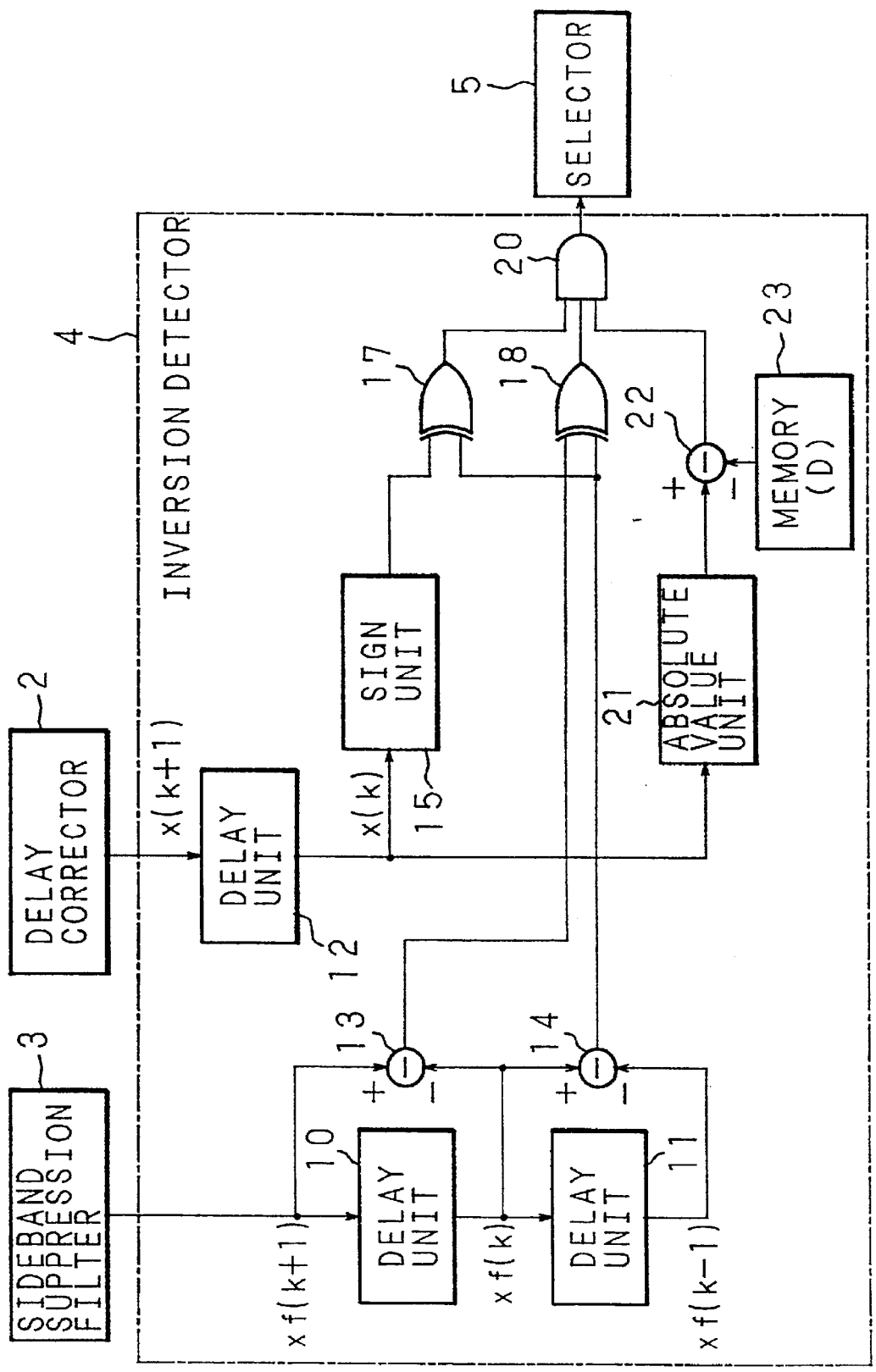
FIG. 7 is a block circuit diagram illustrative of the constitution of inversion prevention devices of the embodiments 4 and 17.

The overall constitution of the inversion prevention device in the fourth embodiment is the same as that of the first embodiment (FIG. 3) and the operation is also similar to that of the first embodiment, and therefore the description thereof will be omitted. FIG. 7 shows the block circuit diagram of the inversion detector 4 in the fourth embodiment. In FIG. 7, identical numerals as those in FIG. 4 denote the same components. The constitution shown in FIG. 7 is such that the sign unit 16 is eliminated from the constitution shown in FIG. 4 as in the case of the third embodiment, and the output of the subtractor 14 is inputted to the XOR gate 17. The absolute value unit 21, the subtractor 22, the memory 23 and the AND gate 20 similar to those of the second embodiment are also provided.

Now the operation will be described below. The XOR gate 18 sends 1 to the AND gate 20 when $\{xf(k)-xf(k-1)\}$ and $\{xf(k+1)-xf(k)\}$ have different signs, and sends 0 when they have the same sign. Namely, the value 1 is outputted when only such a waveform is detected that has a maximum or minimum value at $xf(k)$ as shown in FIG. 20A, 20B. The XOR gate 17 sends 1 to the AND gate 20 when $x(k)$ and $\{xf(k)-xf(k-1)\}$ have different signs, and sends 0 when they have the same sign. The subtractor 22 sends 1 to the AND gate 20 when $|x(k)|<D$ and sends 0 otherwise. Thus the output of the AND gate 20 becomes 1 when only such a waveform is detected that has a maximum or minimum value at $xf(k)$ as shown in FIGS. 20A, 20B at the time k which satisfies the condition $|x(k)|<D$ and the output of the XOR gate 17 is 1. Consequently the AND gate 20 outputs 1 in the case of waveform as shown in FIGS. 21A, 21B and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 5

Figure 8:
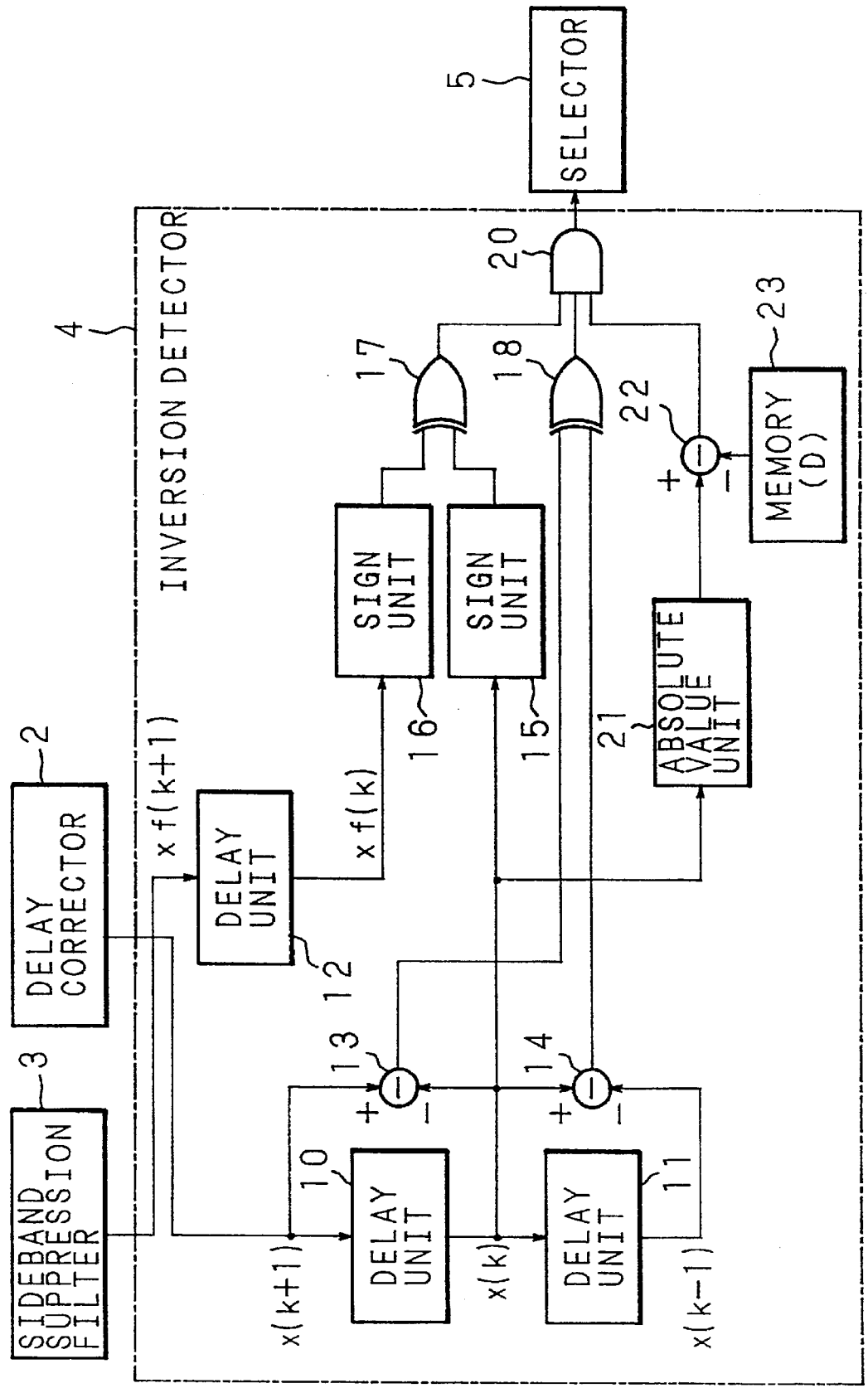
FIG. 8 is a block circuit diagram illustrative of the constitution of inversion prevention devices of the embodiments 5 and 18.

The overall constitution of the inversion prevention device in the fifth embodiment is the same as that of the first embodiment (FIG. 3) and the operation is also similar to that of the first embodiment and therefore the description thereof will be omitted. FIG. 8 shows the block circuit diagram of the inversion detector 4 in the fifth embodiment. In FIG. 8, identical numerals as those in FIG. 4 denote the same components. The constitution shown in FIG. 8 is such that points of the maximum and minimum values are detected by means of the output from the delay corrector 2 in the constitution (second embodiment) of FIG. 5.

Figure 23A:
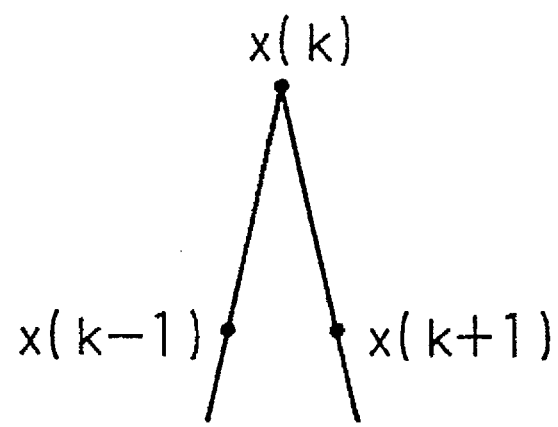
FIGS. 23A and 23B are waveform diagrams of FM signals explanatory of the operation of the invention.
Figure 23B:
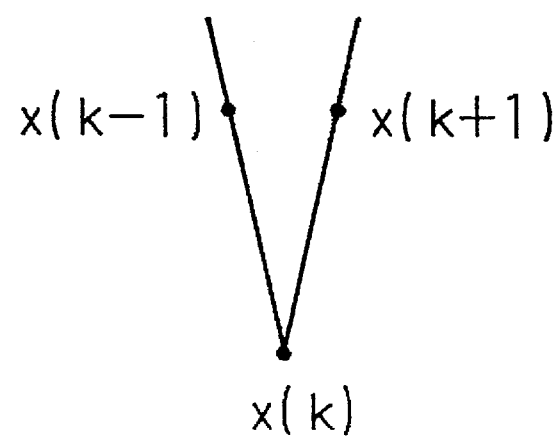

Now the operation will be described below. The XOR gate 18 sends 1 to the AND gate 20 when $\{x(k)-x(k-1)\}$ and $\{x(k+1)-x(k)\}$ have different signs, and sends 0 when they have the same sign. The XOR gate 17 sends 1 to the AND gate 20 when $x(k)$ and $xf(k)$ have different signs, and sends 0 when they have the same sign. The subtractor 22 sends 1 to the AND gate 20 when $|x(k)|<D$ and sends 0 otherwise. Thus the output of the AND gate 20 becomes 1 when only such a waveform is detected that has a maximum or minimum value at $x(k)$ as shown in FIGS. 23A, 23B at the time k which satisfies $|x(k)|<D$ and the output of the XOR gate 17 is 1. Consequently, the AND gate 20 outputs 1 in the case of the waveform as shown in FIG. 21A, 21B and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 6

Figure 9:
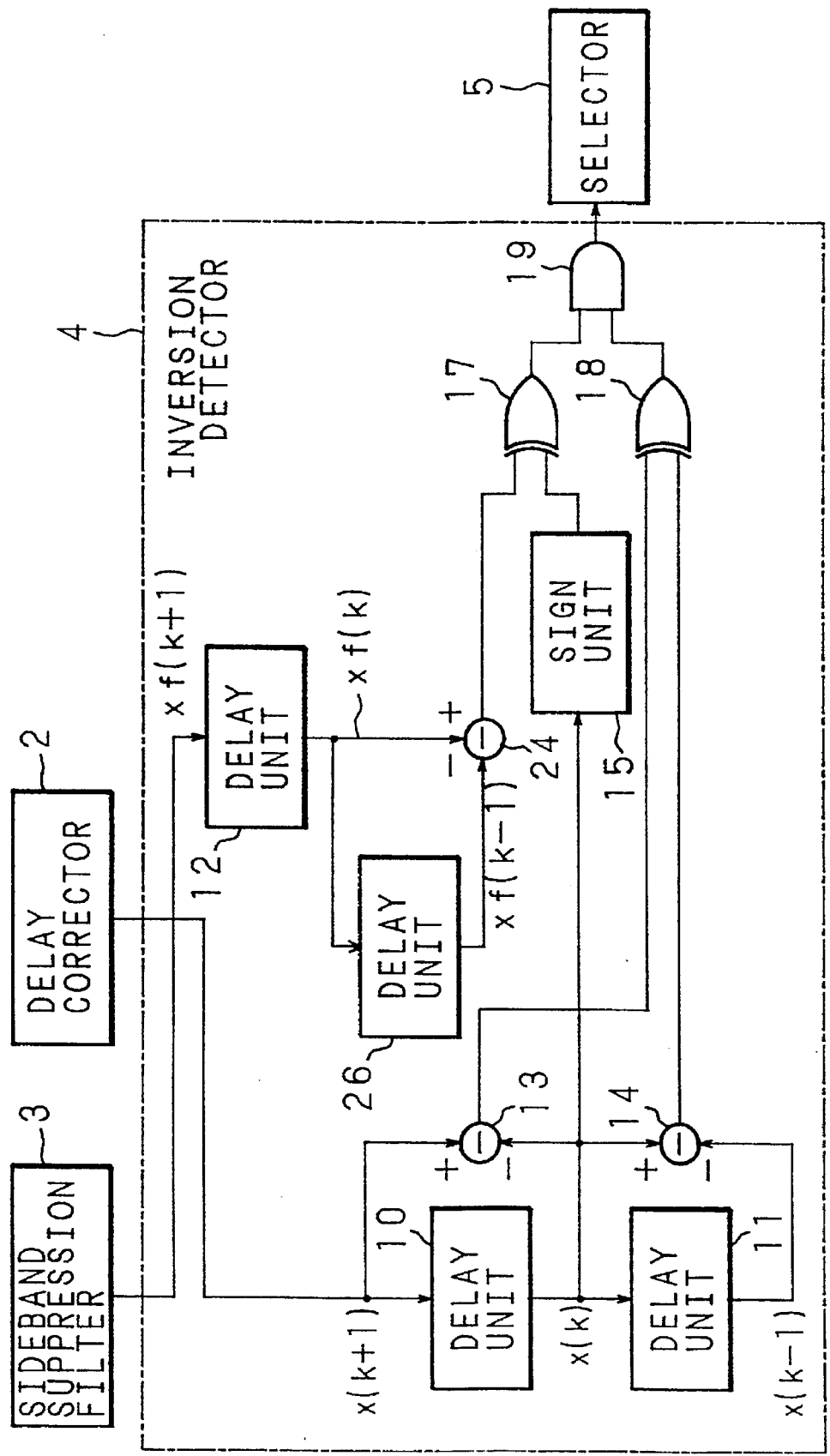
FIG. 9 is a block circuit diagram illustrative of the constitution of inversion prevention devices of the embodiments 6 and 19.

The overall constitution of the inversion prevention device in the sixth embodiment is the same as that of the first embodiment (FIG. 3) and the operation is also similar to that of the first embodiment, and therefore the description thereof will be omitted. FIG. 9 shows the block circuit diagram of the inversion detector 4 in the sixth embodiment. In FIG. 9, identical numerals as those in FIG. 4 denote similar components. The constitution shown in FIG. 9 is such that points of the maximum and minimum values are detected by means of the output from the delay corrector 2 in the constitution of FIG. 6 (third embodiment). The output of the delay unit 12 is connected to a subtractor 24 and a delay unit 26. A subtractor 24 subtracts the output signal from the input signal of the delay unit 26 which introduces a delay of one sampling clock cycle to the input data, and outputs only the sign of the result of subtraction, namely 1 to the XOR gate 17 when the difference is negative and outputs 0 otherwise.

Now the operation will be described below. The XOR gate 18 sends 1 to the AND gate 19 when {x(k)–x(k–1)} and {x(k+1)–x(k)} have different signs, and sends 0 when they have the same sign. Namely, value 1 is outputted when only such a waveform is detected that has a maximum or minimum value at x(k) as shown in FIGS. 23A, 23B. The XOR gate 17 sends 1 to the AND gate 19 when x(k) and {xf(k)–xf(k–1)} have different signs, and sends 0 when they have the same sign. Thus the AND gate 19 outputs 1 to the selector 5 in the case of waveform as shown in FIGS. 21A, 21B and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 7

Figure 10:
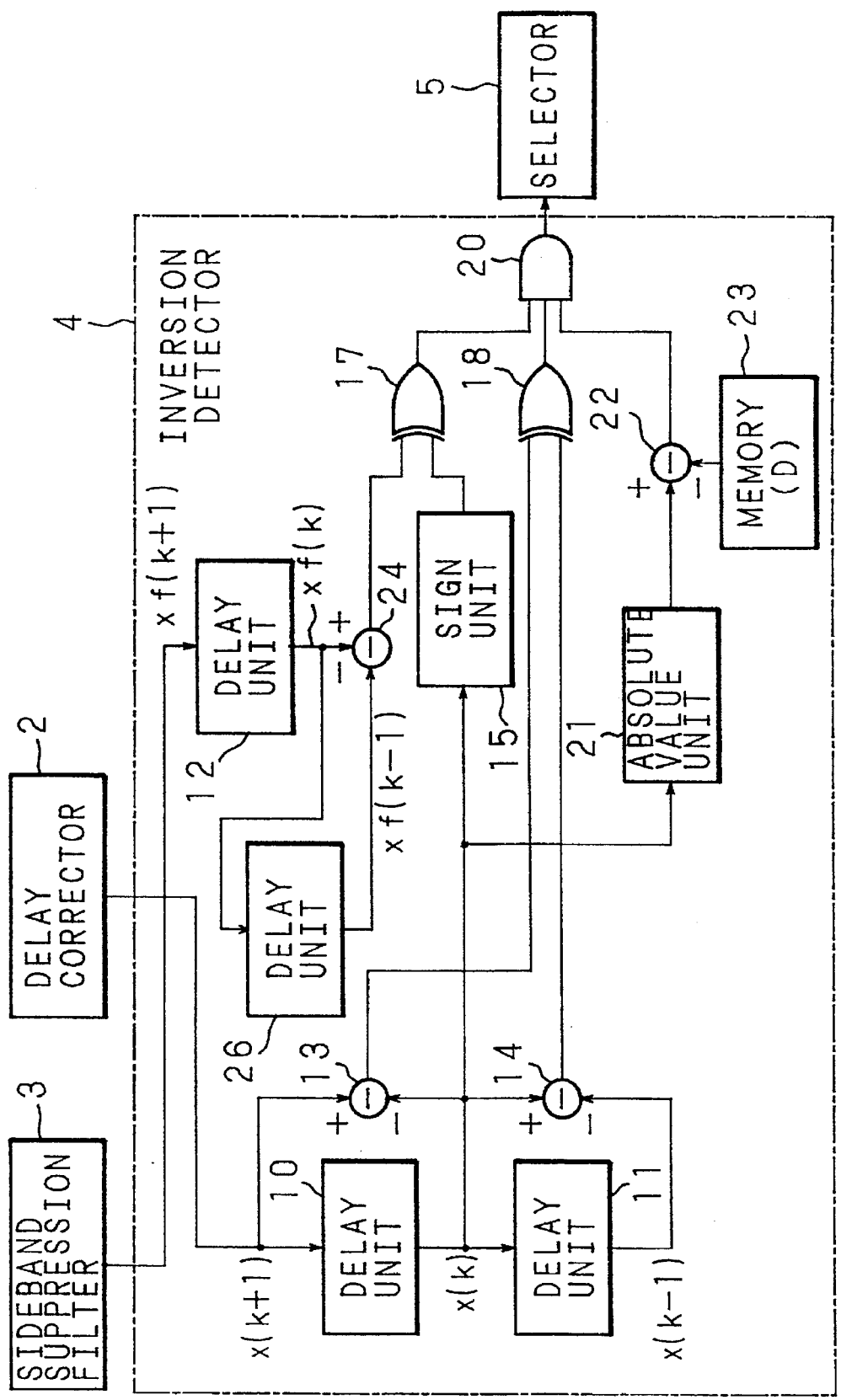
FIG. 10 is a block circuit diagram illustrative of the constitution of inversion prevention devices of the embodiments 7 and 20.

The overall constitution of the inversion prevention device in the seventh embodiment is the same as that of the first embodiment (FIG. 3) and the operation is also similar to that of the first embodiment, and therefore the description thereof will be omitted. FIG. 10 shows the block circuit diagram of the inversion detector 4 in the seventh embodiment. In FIG. 10, identical numerals as those in FIG. 4 denote the same components. The constitution shown in FIG. 10 is such that points of the maximum and minimum values are detected by means of the output from the delay corrector 2 in the constitution of FIG. 7 (fourth embodiment). The output side of the delay unit 12 is connected to the subtractor 24 and the delay unit 26. The subtractor 24 carries out subtraction of input and output signals of the delay unit 26 and outputs only the sign of the result of subtraction, namely 1 to the XOR gate 17 when the result of the subtraction is negative and outputs 0 otherwise.

Figure 22B:
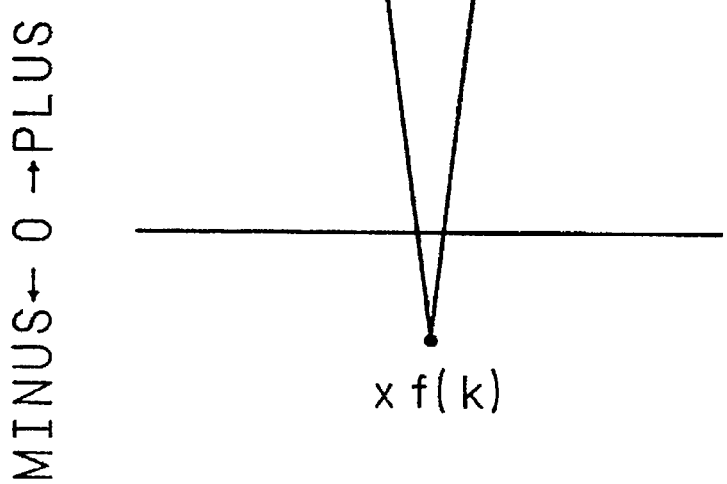

Now the operation will be described below. The XOR gate 18 sends 1 to the AND gate 20 when {x(k)–x(k–1)} and {x(k+1)–x(k)} have different signs and sends 0 when they have the same sign. The XOR gate 17 sends 1 to the AND gate 20 when x(k) and {xf(k)–xf(k–1)} have different signs, and sends 0 when they have the same sign. The subtractor 22 sends 1 to the AND gate 20 when |x(k)|<D and sends 0 otherwise. Thus the output of the AND gate 20 becomes 1 when only such a waveform is detected that has a maximum or minimum value at x(k) as shown in FIGS. 23A, 23B at the time k which satisfies |x(k)|<D and the output of the XOR gate 17 is 1. Thus the AND gate 20 outputs 1 to the selector 5 in the case of waveform as shown in FIGS. 21A, 22B and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 8

Figure 11:
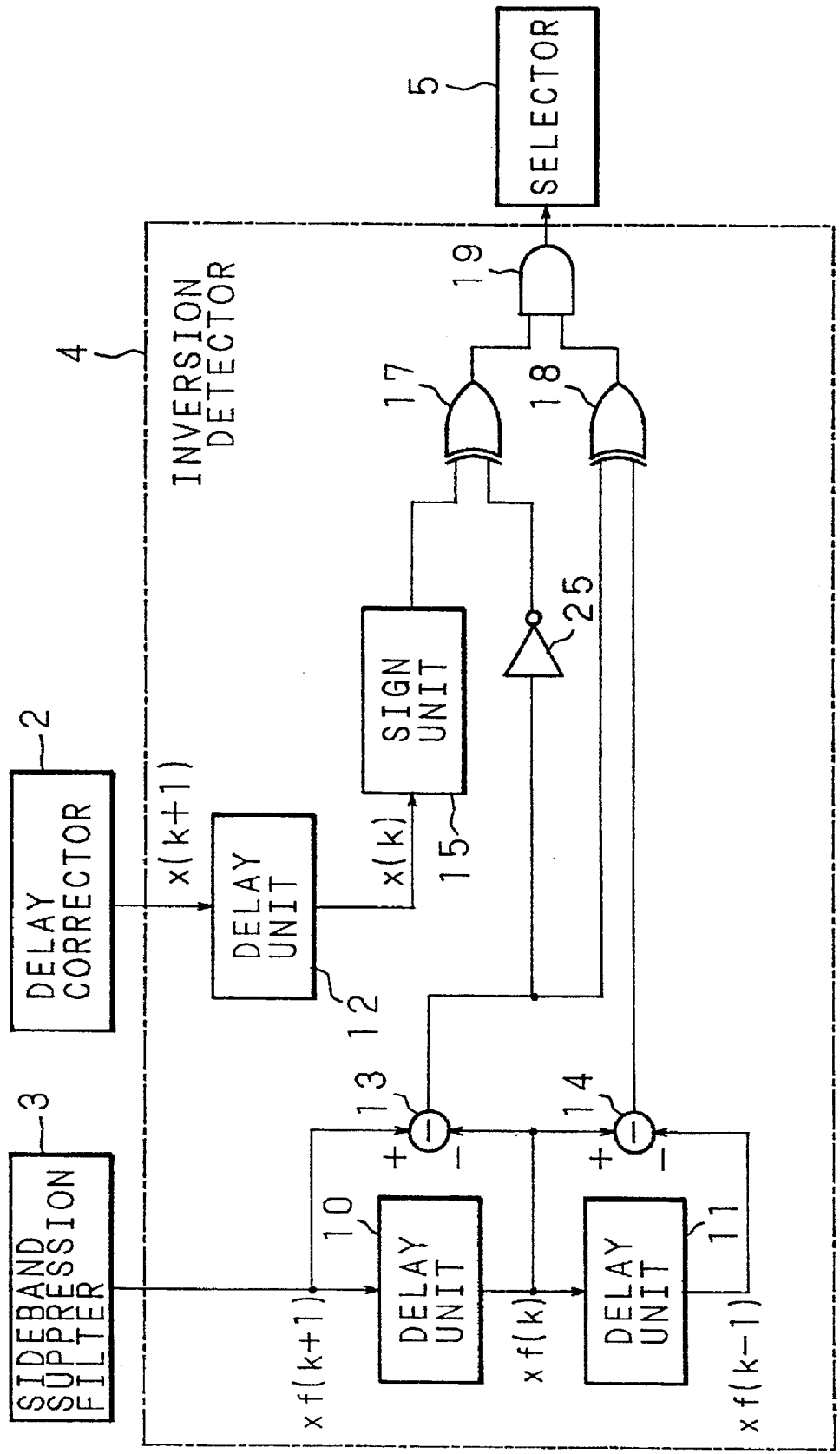
FIG. 11 is a block circuit diagram illustrative of the constitution of inversion prevention devices of the embodiments 8 and 21.

The overall constitution of the inversion prevention device in the eighth embodiment is the same as that of the first embodiment (FIG. 3) and the operation is also similar to that of the first embodiment, and therefore the description thereof will be omitted. FIG. 11 shows the block circuit diagram of the inversion detector 4 in the eighth embodiment. In FIG. 11, identical numerals as those in FIG. 4 denote similar components. The constitution shown in FIG. 11 is such that the output of the subtractor 13 is inputted to the XOR gate 17 via an inverter 25 which inverts the input signal in the constitution shown in FIG. 6 (third embodiment).

Now the operation will be described below. The XOR gate 18 sends 1 to the AND gate 19 when {xf(k)–xf(k–1)} and {xf(k+1)–xf(k)} have different signs, and sends 0 when they have the same sign. Namely, the value 1 is outputted when only such a waveform is detected that has a maximum or minimum value at xf(k) as shown in FIGS. 20A, 20B. The XOR gate 17 sends 1 to the AND gate 19 when x(k) and {xf(k+1)–xf(k)} have different signs, and sends 0 when they have the same sign. Consequently, the AND gate 19 outputs 1 to the selector 5 in the case of the waveform as shown in FIGS. 21A, 21B, and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 9

Figure 12:
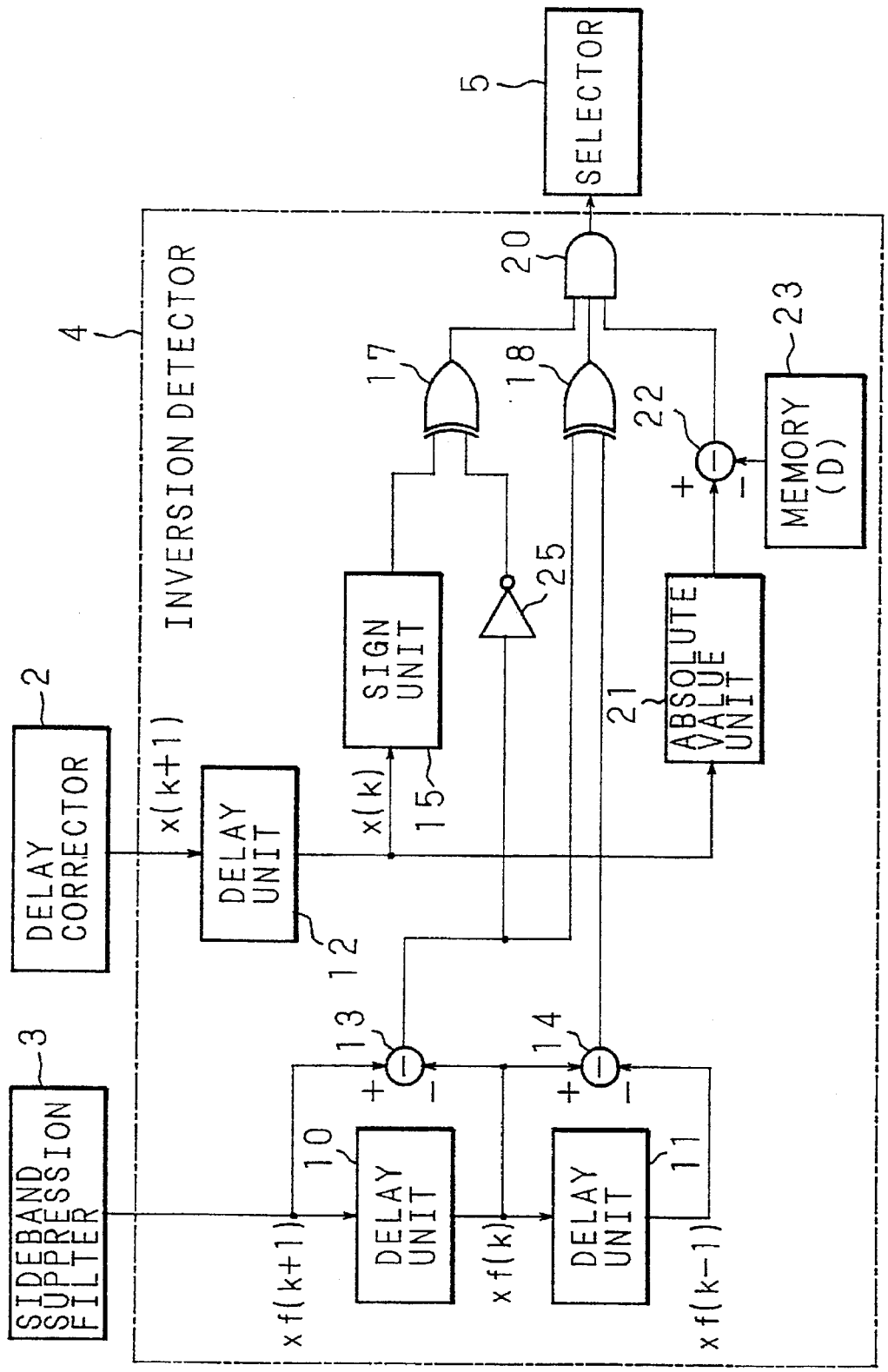
FIG. 12 is a block circuit diagram illustrative of the constitution of inversion prevention devices of the embodiments 9 and 22.

The overall constitution of the inversion prevention device in the ninth embodiment is the same as that of the first embodiment (FIG. 3) and the operation is also similar to that of the first embodiment, and therefore the description thereof will be omitted. FIG. 12 shows the block circuit diagram of the inversion detector 4 in the ninth embodiment. In FIG. 12, identical numerals as those in FIG. 4 denote similar components. The constitution shown in FIG. 12 is such that the output of the subtractor 14 is inputted to the XOR gate 17 via the inverter 25 which inverts the input signal in the constitution shown in FIG. 7 (fourth embodiment).

Now the operation will be described below. The XOR gate 18 sends 1 to the AND gate 20 when {xf(k)–xf(k–1)} and {xf(k+1)–xf(k)} have different signs, and sends 0 when they have the same sign. The XOR gate 17 sends 1 to the AND gate 20 when x(k) and inverted {xf(k+1)–xf(k)} have different signs, and sends 0 when they have the same sign. Further, the subtractor 22 sends 1 to the AND gate 20 when |x(k)|<D and sends 0 otherwise. Thus the output of the AND gate 20 becomes 1 when only such a waveform is detected that has a maximum or minimum value at xf(k) as shown in FIGS. 20A, 20B at the time k which satisfies |x(k)|<D and the output of the XOR gate 17 is 1. Thus the AND gate 20 outputs 1 to the selector 5 in the case of waveform as shown in FIGS. 21A, 21B and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 10

Figure 13:
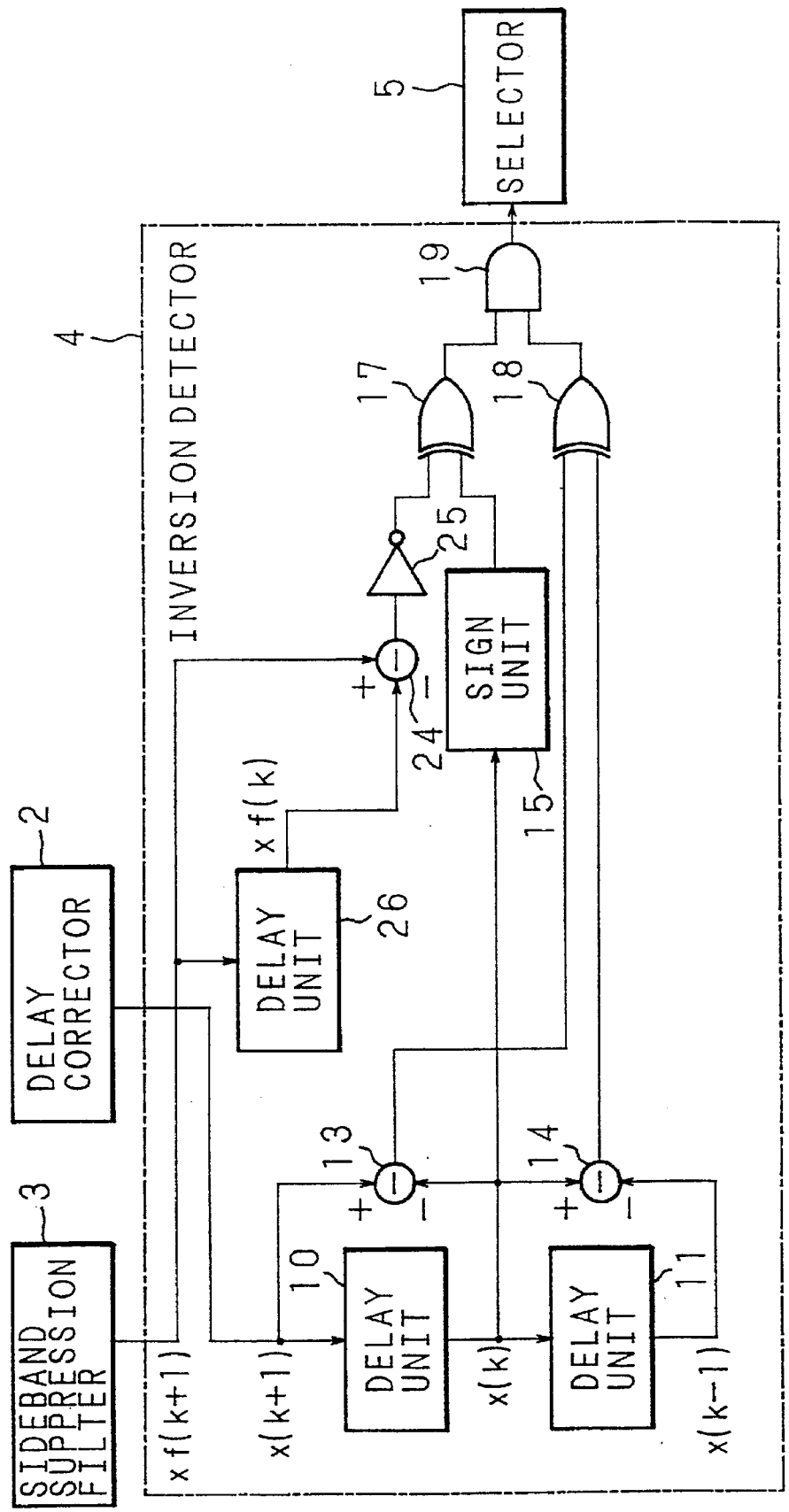
FIG. 13 is a block circuit diagram illustrative of the constitution of inversion prevention devices of the embodiment 10 and 23.

The overall constitution of the inversion prevention device in the tenth embodiment is the same as that of the first embodiment (FIG. 3) and the operation is also similar to that of the first embodiment, and therefore the description thereof will be omitted. FIG. 13 shows the block circuit diagram of the inversion detector 4 in the tenth embodiment. In FIG. 13, identical numerals as those in FIG. 4 denote similar components. The constitution shown in FIG. 13 is such that subtraction of the input and output signals of the delay unit 26 is carried out in the subtractor 24 and the sign of the result of subtraction is inputted to the XOR gate 17 via the inverter 25, in the constitution shown in FIG. 9 (the embodiment 6).

Now the operation will be described below. The XOR gate 18 sends 1 to the AND gate 19 when {x(k)–x(k–1)} and {x(k+1)–x(k)} have different signs, and sends 0 when they have the same sign. Namely, the value 1 is outputted when only such a waveform is detected that has a maximum or minimum value at x(k) as shown in FIGS. 23A, 23B. The XOR gate 17 sends 1 to the AND gate 19 when x(k) and inverted {xf(k+1)–xf(k)} have different signs, and sends 0 when they have the same sign. Consequently, the AND gate 19 sends 1 to the selector 5 when the waveform as shown in FIGS. 21A, 21B is detected, and sends 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 11

Figure 14:
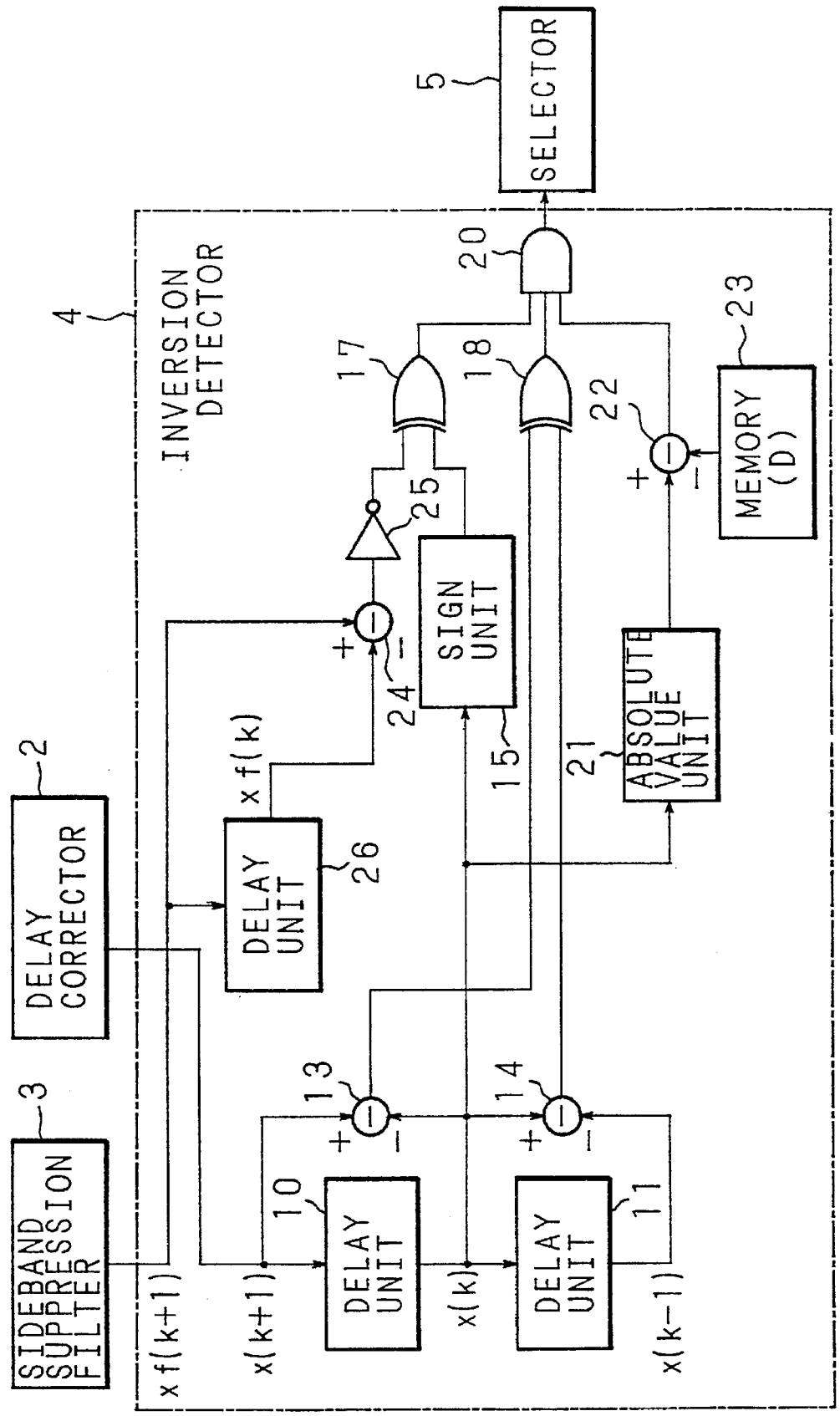
FIG. 14 is a block circuit diagram illustrative of the constitution of inversion prevention devices of the embodiments 11 and 24.

The overall constitution of the inversion prevention device in the embodiment 11 is the same as that of the first embodiment (FIG. 3) and the operation is also similar to that of the first embodiment, and therefore the description thereof will be omitted. FIG. 14 shows the block circuit diagram of the inversion detector 4 in the embodiment 11. In FIG. 14, identical numerals as those in FIG. 4 denote similar components. The constitution shown in FIG. 14 is such that subtraction of the input and output signals of the delay unit 26 is calculated in the subtractor 24, and the sign of the result of subtraction is inputted to the XOR gate 17 via the inverter 25, in the constitution shown in FIG. 10 (the embodiment 7).

Now the operation will be described below. The XOR gate 18 sends 1 to the AND gate 20 when {x(k)–x(k–1)} and {x(k+1)–x(k)} have different signs and sends 0 when they have the same sign. The XOR gate 17 sends 1 to the AND gate 20 when x(k) and inverted {xf(k+1)–xf(k)} have different signs, and sends 0 when they have the same sign. Further, the subtractor 22 sends 1 to the AND gate 20 when |x(k)|<D and sends 0 otherwise. Thus the output of the AND gate 20 becomes 1 when only such a waveform is detected that has a maximum or minimum value at x(k) as shown in FIGS. 23A, 23B at the time k which satisfies |x(k)|<D and the output of the XOR gate 17 is 1. Consequently, the AND gate 20 outputs 1 to the selector 5 in the case of waveform as shown in FIGS. 21A, 21B and outputs 0 otherwise.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 12

Figure 15:
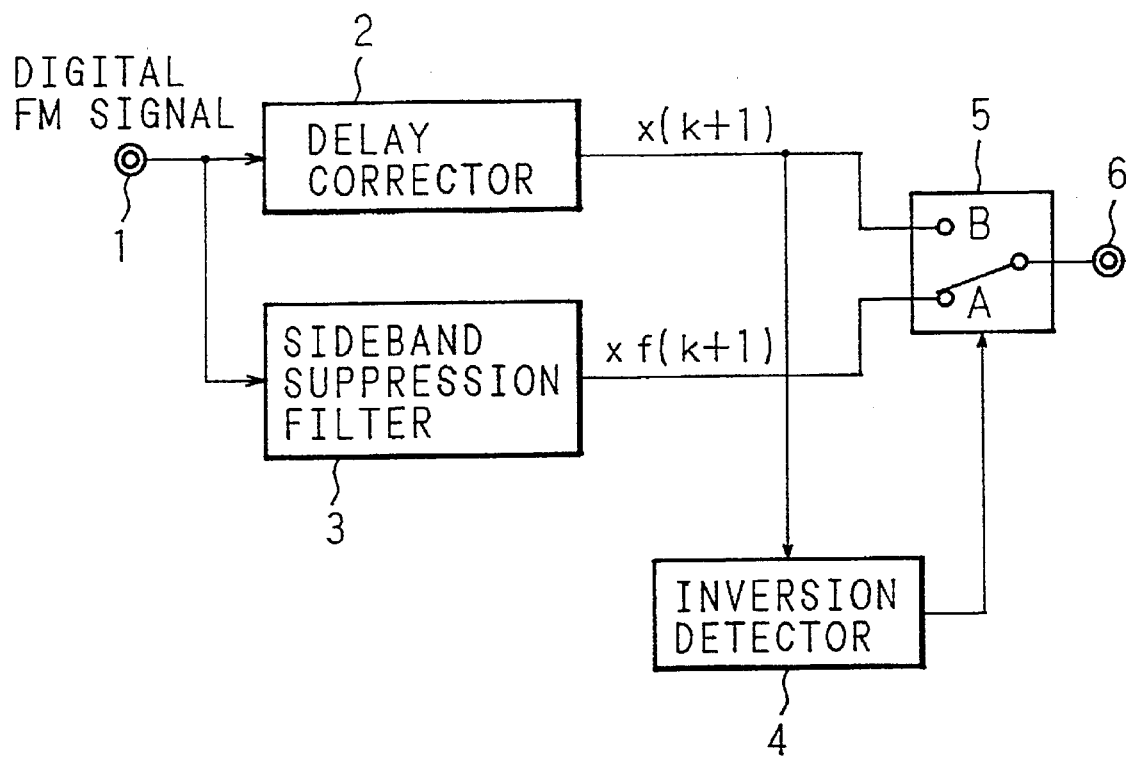
FIG. 15 is a block circuit diagram illustrative of the constitution of inversion prevention devices of the embodiments 12 and 13 of the invention.

FIG. 15 shows the constitution of the inversion prevention device in the embodiment 12, and identical numerals as those in FIG. 3 denote the same or similar components. The difference of this constitution from the constitution shown in FIG. 3 is only that an inversion is detected by the inversion detector 4 from only the output of the delay corrector 2, and the rest of the constitution and operation are equivalent to those of the first embodiment and therefore the description thereof will be omitted.

Figure 16:
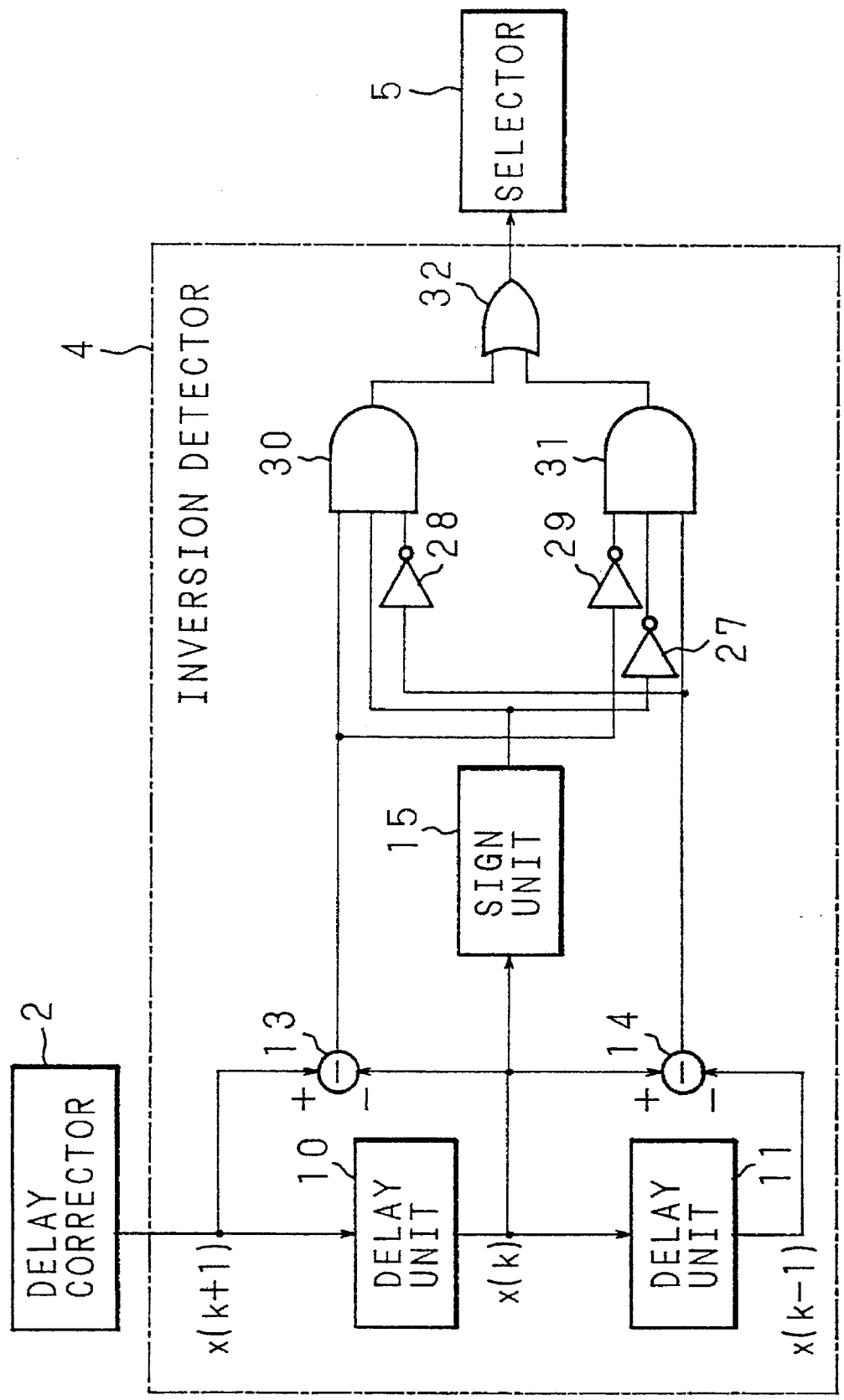
FIG. 16 is a block circuit diagram illustrative of the constitution of inversion prevention devices of the embodiments 12 and 25.

FIG. 16 shows the block circuit diagram of the inversion detector 4 in the embodiment 12. The delay corrector 2 is provided with the delay units 10, 11 which delay the input data by one sampling clock cycle, being connected in series in this order. The output side of the delay unit 10 is connected to the subtractors 13, 14 and the sign unit 15. The output side of the delay unit 11 is connected to the subtractor 14, and the subtractor 13 is connected to the delay corrector 2. The subtractors 13, 14 carry out subtraction of two output signals of the sideband suppression filter 3 having a phase difference of one sampling clock cycle and outputs only the sign the result of subtraction, namely 1 when the result of subtraction is negative and outputs 0 otherwise. The sign unit 15 outputs only the sign of the input signals, namely 1 when the input signal has a negative sign and outputs 0 otherwise. The subtractor 13 is connected directly to a 3-input AND gate 30 and is connected to a 3-input AND gate 31 via an inverter 29. The subtractor 14 is connected to the AND gate 30 via an inverter 28 and is connected directly to the AND gate 31. The sign unit 15 is connected to the AND gate 31 via an inverter 27 and is connected directly to the AND gate 30. The AND gates 30, 31 output 1 only when all the three inputs are 1 and output 0 in other cases. The outputs of the AND gates 30, 31 are connected to an OR gate 32 whose output side is connected to the selector 5.

The operation of the inversion detector 4 will now be described below. There are only two cases wherein the output of the OR gate 32 becomes 1. One is the case wherein the output of the subtractor 14 is 0, the output of the subtractor 13 is 1 and the output of the sign unit 15 is 1 (x(k) has a negative sign). Another is the case wherein the output of the subtractor 14 is 1, the output of the subtractor 13 is 0 and the output of the sign unit 15 is 0 (the sign of x(k) is not negative). In the former case, the waveform has a maximum value x(k) below the zero level as shown in FIG. 21A. In the latter case, the waveform has a minimum value x(k) above the zero level as shown in FIG. 21B. In cases other than these, the OR gate 32 outputs 0.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Embodiment 13

Figure 1:
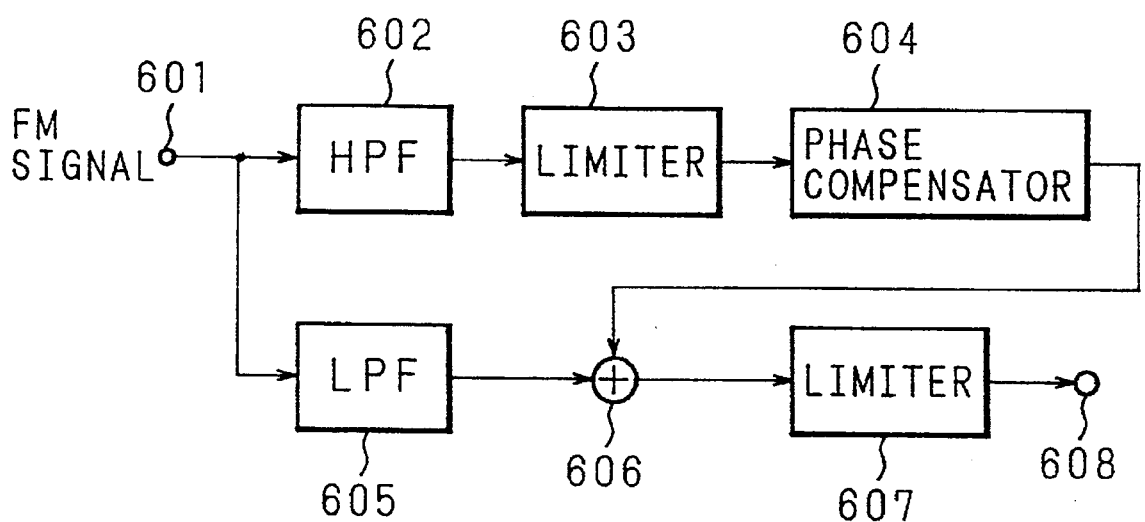
FIG. 1 is a block circuit diagram illustrative of the constitution of an inversion prevention device of a prior art.
Figure 2:
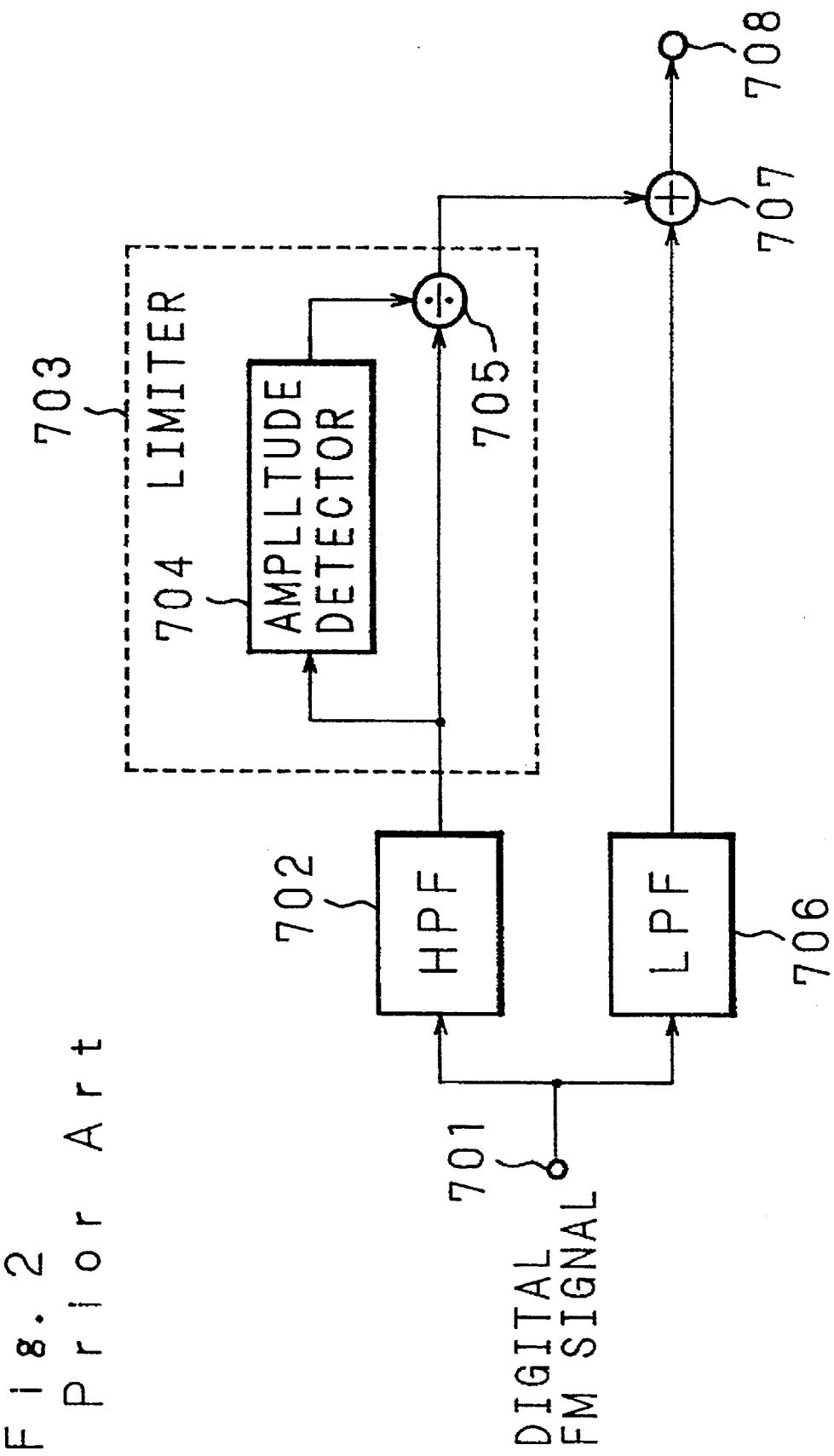
FIG. 2 is a block circuit diagram illustrative of the constitution of a digital inversion prevention device of the prior art.
Figure 17:
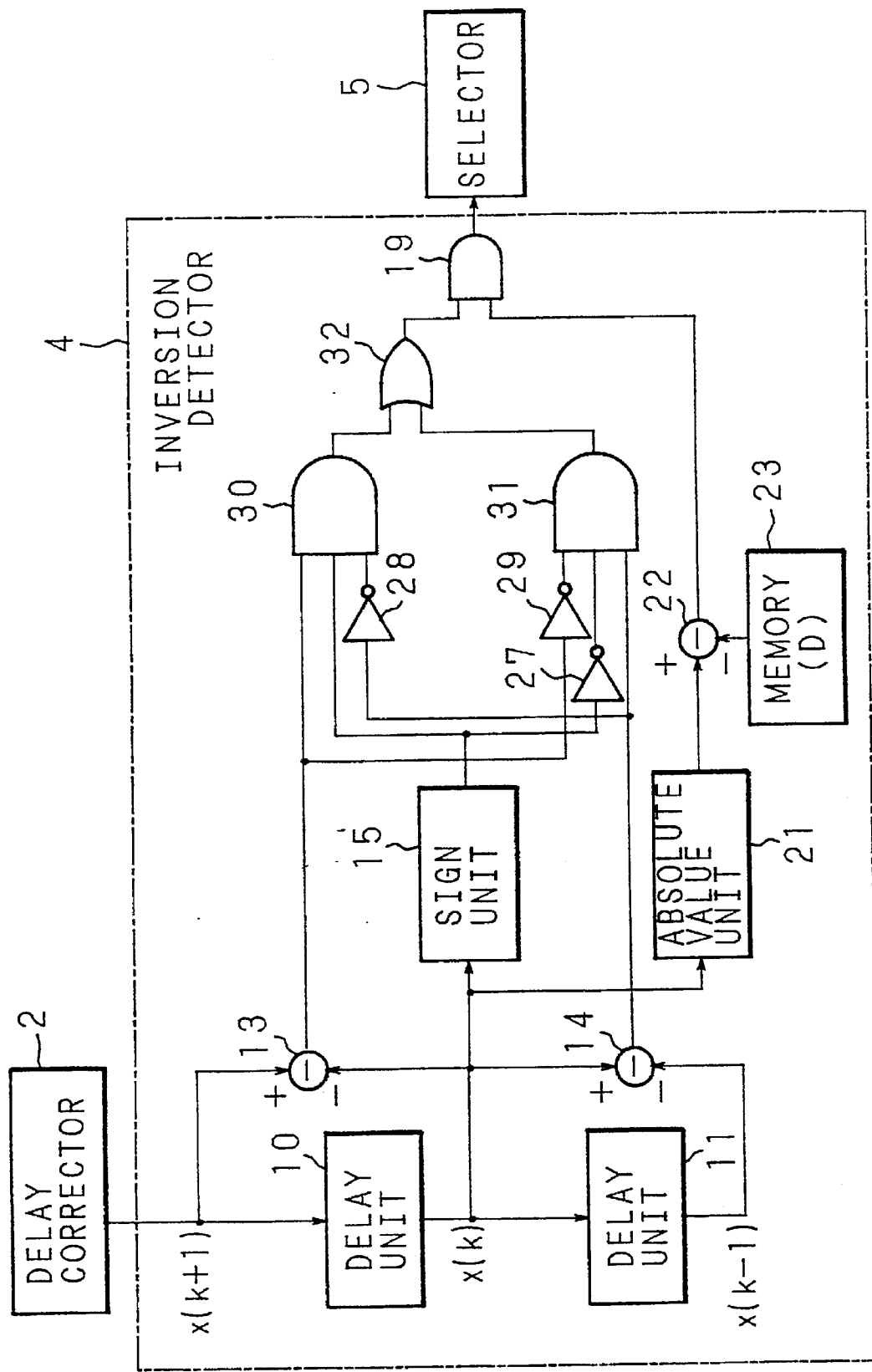
FIG. 17 is a block circuit diagram illustrative of the constitution of inversion prevention devices of the embodiments 13 and 26.

The overall constitution of the inversion prevention device in the embodiment 13 is the same as that of the embodiment 12 (FIG. 1.5) and the operation is also similar to that of the embodiment 12, and therefore the description thereof will be omitted. FIG. 17 shows the block circuit diagram of the inversion detector 4 in the embodiment 13. In FIG. 17, identical numerals as those in FIG. 16 denote similar components. The constitution shown in FIG. 17 is such that the absolute value unit 21 which obtains the absolute value of the output of the delay unit 10, the memory 23 which holds the preset value D, the subtractor 22 which subtracts the output of the memory 23 from the output of the absolute value unit 21 and outputs only the sign of the result of subtraction, namely 1 only when the result of subtraction has negative sign and outputs 0 in other cases and the 2-input AND gate 19 which receives the output of the OR gate 32 and the output of the subtractor 22 as the inputs are added to the constitution shown in FIG. 16.

The operation will now be described below. As in the case of the embodiment 12, there are only two cases wherein the output of the OR gate 32 becomes 1. One is the case wherein the output of the subtractor 14 is 0, the output of the subtractor 13 is 1 and the output of the sign unit 15 is 1, in which case the maximum value x(k) is below zero level as shown in FIG. 21A. Another is the case wherein the output of the subtractor 14 is 1, the output of the subtractor 13 is 0 and the output of the sign unit 15 is 0, in which case the minimum value x(k) is above zero level as shown in 21B. In cases other than these, the OR gate 32 outputs 0. The subtractor 22 outputs 1 when |x(k)|<D and sends 0 otherwise. Thus the output of the AND gate 19 becomes 1 when only such a waveform is detected that has a maximum or minimum value at x(k) as shown in FIG. 21A, 21B at the time k which satisfies |x(k)|<D, and at the same the positional relationship thereof with the zero level is as shown in FIG. 21 and the AND gate 19 outputs 0 in other cases.

An inversion can be detected by the above operation. And an inversion can be prevented by sending the waveform shown in FIG. 22A in the case of FIG. 21A to the output terminal 6 shown in FIG. 3 and sending the waveform shown in FIG. 22B in the case of FIG. 21B to the output terminal 6.

Now the inversion prevention device of the invention will be described in the embodiments 14 through 26 where quantized digital FM signals are inputted and either the input digital FM signal or a preset specified value is selected according to the output of the inversion detector. In this case the inversion detector can be made either in such a constitution that a point where zero cross is missing (inversion) is detected by means of the input digital FM signals and the output signal of time sideband suppression filter, or in such a constitution that an inversion is detected only by means of the input digital FM signals. Examples of the former constitution will be described in the embodiments 14 through 24, and examples of the latter constitution will be described in the embodiment 25 and the embodiment 26.

Embodiment 14

Figure 24:
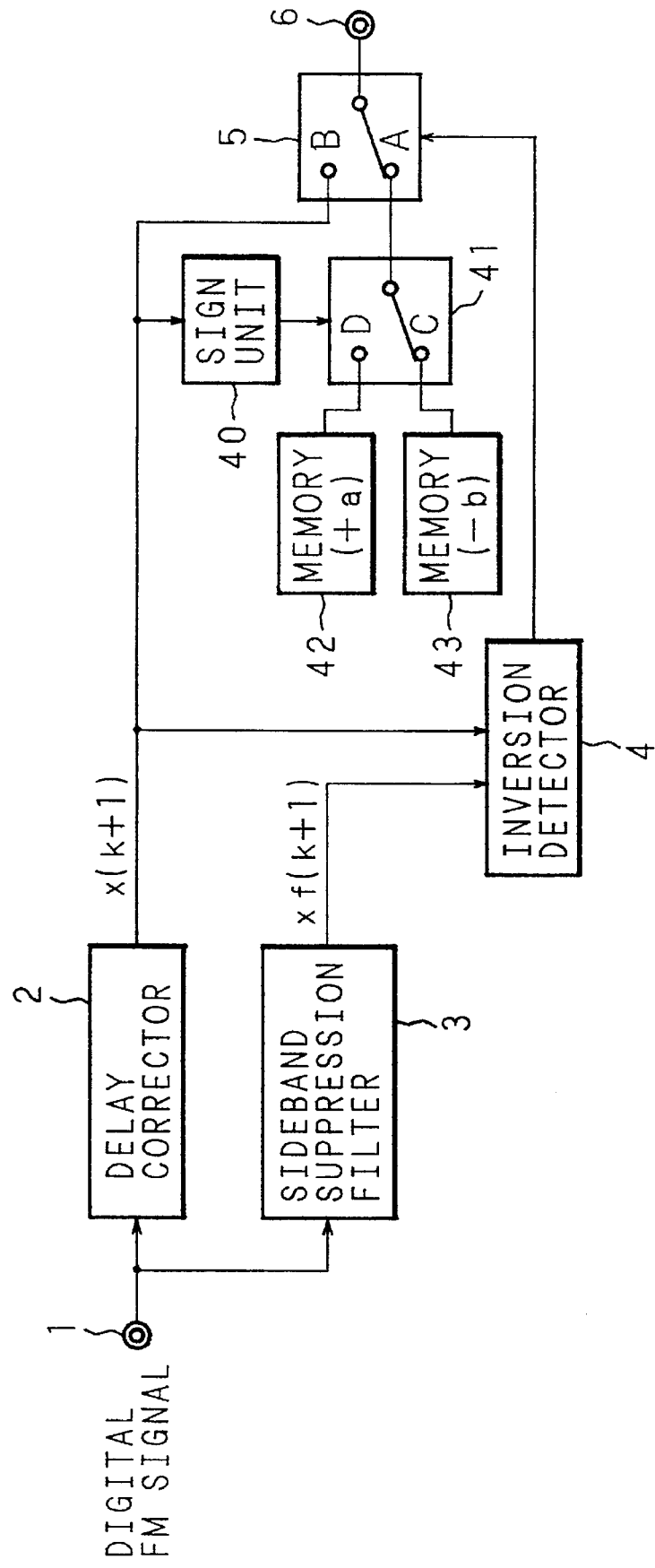
FIG. 24 is a block circuit diagram illustrative of the constitution of inversion prevention devices of the embodiments 14 through 24 of the invention.

FIG. 24 shows the constitution of the inversion prevention device in the embodiment 14. Numeral 1 in the drawing denotes the input terminal for digital FM signals. The digital FM signals are inputted via the input terminal 1 to the sideband suppression fitter 3 which suppresses either both the upper and lower sideband or the lower sideband of the digital FM signals, and to the delay corrector 2 which gives the digital signal the same amount of delay as the delay time of the output signal from the sideband suppression filter 3. The delay corrector 2 outputs the output signal x(k+1) to the inversion detector 4, a sign unit 40 and an input terminal B of the selector 5. On the other hand the sideband suppression filter 3 outputs the output signal xf(k+1) to the inversion detector 4. At this time, outputs of the delay corrector 2 and the sideband suppression filter 3 are signals which are quantized at the same time. The inversion detector 4 checks to see if an inversion has occurred or not based on the outputs from the delay corrector 2 and from the sideband suppression filter 3 and, when an inversion is detected, outputs 1 to the selector 5 and, when an inversion is not detected, outputs 0 to the selector 5. The sign unit 40 outputs only the sign of the output, namely 1 to a selector 41 when the output of the delay corrector 2 is negative and outputs 0 in or her cases. An input terminal D of the selector 41 is connected to a memory 42 which holds a positive value +a which has been set in advance and an input terminal C of the selector 41 is connected to a memory 43 which holds a negative value −b which has been set in advance. The selector 41 selects the terminal. D when the output of the sign unit 40 is 1 and selects the terminal C then it is 0, and outputs the selected value to the input terminal A of the selector 5. The selector 5 selects the terminal A when the output from the inversion detector 4 is 1 and selects the terminal B when it is 0, and outputs the selected signal to the output terminal 6.

Now the operation in FIG. 24 will be described below. The select or 5 normally selects the terminal B. That is, the input signal to the input terminal 1 is outputted to the output terminal 6 after being delayed by the delay corrector 2. However when it is determined by the inversion detector 4 based on the outputs from the delay corrector 2 and the sideband suppression filter 3, that demodulation under this condition will cause an inversion the selector 5 selects the terminal A and the output from the selector 41 is outputted to the output terminal 6.

Figure 26:
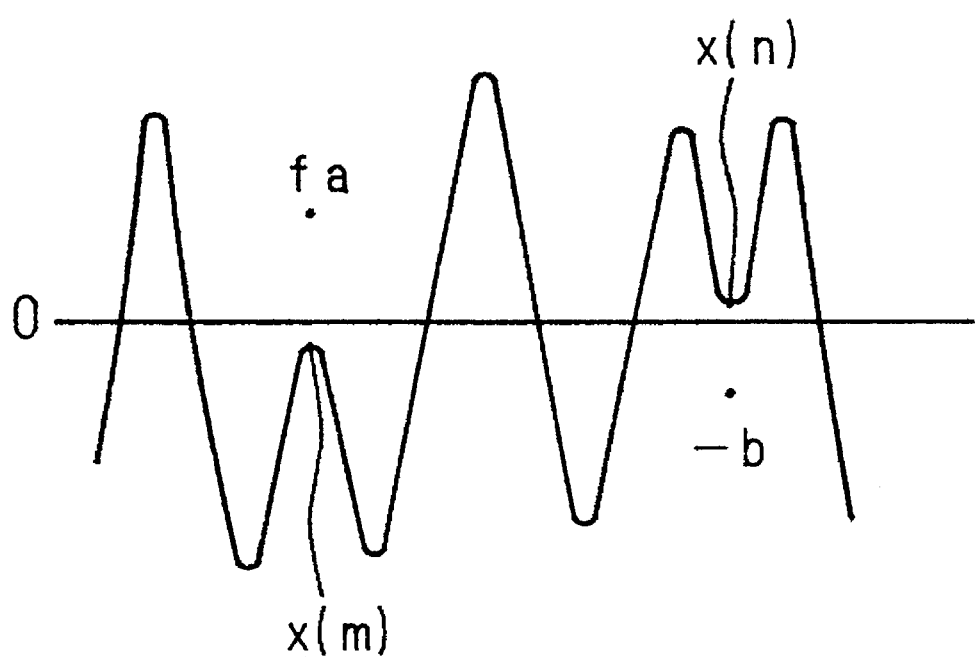
FIG. 26 is a waveform diagram of FM signals explanatory of the operation of the invention.
Figure 27:
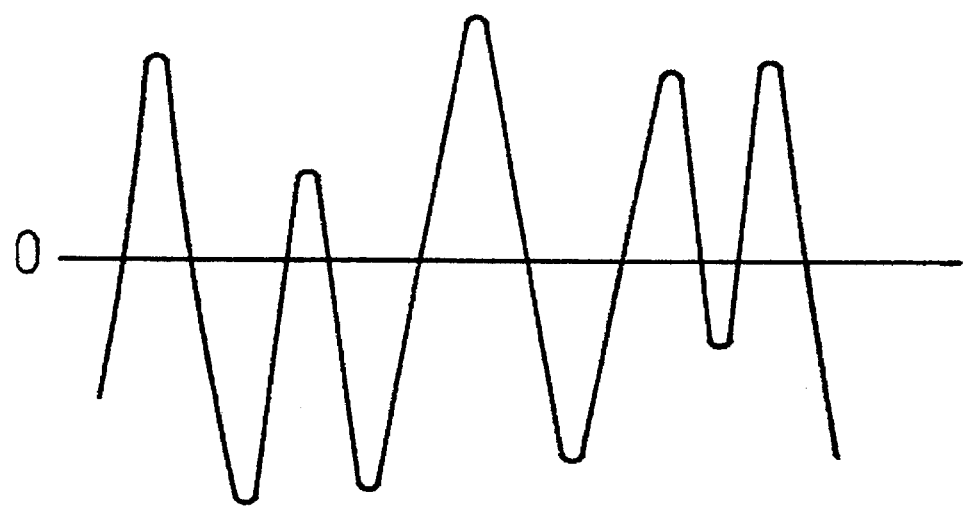
FIG. 27 is a waveform diagram of FM signals explanatory of the operation of the invention.

Suppose that quantized FM signal indicated by solid line in FIG. 26 is inputted to the input terminal 1 then the cross point of the FM signal and the alternate zero level has vanished near the points indicated by x(m) and x(n) and demodulation under this condition will cause an inversion. Therefore although normally the waveform shown in solid line in FIG. 26 is outputted and demodulated when missing of the cross point of the FM signal and the zero level is detected near the points indicated by x(m) and x(n) only this portion is replaced by the preset value and is outputted. Namely the positive value +a which has been stored the memory 42 is outputted when the value is negative as x(m) and the negative value −b which has been stored in the memory 43 is outputted when the value is positive as x(n). As a result when the FM signal shown in FIG. 27 (quantized signals connected by smooth solid curve) is outputted and demodulated a demodulated waveform can be obtained without causing the picture quality to degrade significantly and Free from inversion because the cross point over the zero level is restored.

Figure 28A:
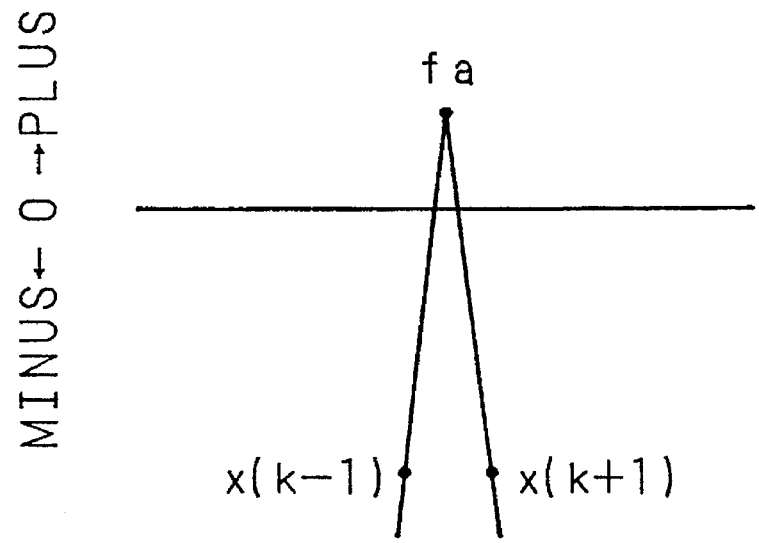
FIGS. 28A and 28B are waveform diagrams of FM signals explanatory of the operation of the invention.
Figure 28B:
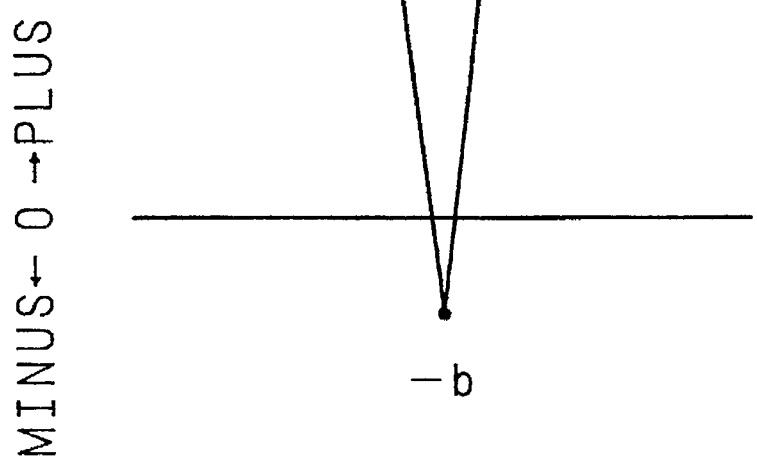

The constitution of the inversion detector 4 in the embodiment 14 is the same as that of FIG. 4 (first embodiment), and therefore the description thereof will be omitted. An inversion can be detected similarly to the case of the first embodiment and an inversion can be prevented by providing the waveform shown in FIG. 28A to the output terminal 6 of FIG. 24 in the case of FIG. 21A and providing the waveform shown in FIG. 28B in the case of FIG. 21B.

Embodiment 15

The overall constitution of the inversion prevention device in the embodiment 15 is the same as that of the embodiment 14 (FIG. 24) and the operation is also similar that of the embodiment 14, and therefore the description thereof will be omitted. The constitution of the inversion detector 4 in the embodiment 15 is the same as that of FIG. 5 (embodiment 2), and therefore the description thereof will be omitted. An inversion can be detected similarly to the case of the second embodiment, and an inversion can be prevented by providing the waveform shown in FIG. 28A to the output terminal 6 of FIG. 24 as the output in the case of FIG. 21A and providing the waveform shown in FIG. 28B in the case of FIG. 21B.

Embodiment 16

The overall constitution of the inversion prevention device in the embodiment 16 is the same as that of the embodiment 14 (FIG. 24) and the operation is also similar to that of the embodiment 14, and therefore the description thereof will be omitted. The constitution of the inversion detector 4 in the embodiment 16 is the same as that of FIG. 6 (embodiment 3) and therefore the description thereof will be omitted. An inversion can be detected similarly to the case of the embodiment 3, and an inversion can be prevented by providing the waveform shown in FIG. 28A to the output terminal 6 of FIG. 24 as the output in the case of FIG. 21A and providing the waveform shown in FIG. 28B in the case of FIG. 21B.

Embodiment 17

The overall constitution of the inversion prevention device in the embodiment 17 is the same as that of the embodiment 14 (FIG. 24) and the operation is also similar to that of the embodiment 14 and therefore the description thereof will be omitted. The constitution of the inversion detector 4 in the embodiment 17 is the same as that of FIG. 7 (embodiment 4), and therefore the description thereof will be omitted. An inversion can be detected similarly to the case of the embodiment 4, and an inversion can be prevented by providing the waveform shown in FIG. 28A to the output terminal 6 of FIG. 24 as the output in the case of FIG. 21A and providing the waveform shown in FIG. 28B in the case of FIG. 21B.

Embodiment 18

The overall constitution of the inversion prevention device in the embodiment 18 is the same as that of the embodiment 14 (FIG. 24) and the operation is also similar to that of the embodiment 14, and therefore the description thereof will be omitted. The constitution of the inversion detector 4 in the embodiment 18 is the same as that of FIG. 8 (embodiment 5), and therefore the description thereof will be omitted. An inversion can be detected similarly to the case of the embodiment 5, and an inversion can be prevented by providing the waveform shown in FIG. 28A to the output terminal 6 of FIG. 24 as the output in the case of FIG. 21A and providing the waveform shown in FIG. 28B in the case of FIG. 21B.

Embodiment 19

The overall constitution of the inversion prevention device in the embodiment 19 is the same as that of the embodiment 14 (FIG. 24) and the operation is also similar to that of the embodiment 14, and therefore the description thereof will be omitted. The constitution of the inversion detector 4 in the embodiment 19 is the same as that of FIG. 9 (embodiment 6), and therefore the description thereof will be omitted. An inversion can be detected similarly to the case of the embodiment 6 and an inversion can be prevented by providing the waveform shown in FIG. 28A to the output terminal 6 of FIG. 24 as the output in the case of FIG. 21A and providing the waveform shown in FIG. 28B in the case of FIG. 21B.

Embodiment 20

The overall constitution of the inversion prevention device in the embodiment 20 is the same as that of the embodiment 14 (FIG. 24) and the operation is also similar to that of the embodiment 14 and therefore the description thereof will be omitted. The constitution of the inversion detector 4 in the embodiment 20 is the same as that of FIG. 10 (embodiment 7) and therefore the description thereof will be omitted. An inversion can be detected similarly to the case of the embodiment 7 and an inversion can be prevented by providing the waveform shown in FIG. 28A to the output terminal 6 of FIG. 24 as the output in the case of FIG. 21A and providing the waveform shown in FIG. 22B in the case of FIG. 21B.

Embodiment 21

The overall constitution of the inversion prevention device in the embodiment 21 is the same as that of the embodiment 14 (FIG. 24) and the operation is also similar to that of the embodiment 14, and therefore the description thereof will be omitted. The constitution of the inversion detector 4 in the embodiment 21 is the same as that of FIG. 11 (embodiment 8), and therefore the description thereof will be omitted. An inversion can be detected similarly to the case of the embodiment 8, and inversion can be prevented by providing the waveform shown in FIG. 28A to the output terminal 6 of FIG. 24 as the output in the case of FIG. 21A and providing the waveform shown in FIG. 28B in the case of FIG. 21B.

Embodiment 22

The overall constitution of the inversion prevention device in the embodiment 22 is the same as that of the embodiment 14 (FIG. 24) and the operation is also similar to that of the embodiment 14, and therefore the description thereof will be omitted. The constitution of the inversion detector 4 in the embodiment 22 is the same as that of FIG. 12 (embodiment 9), and therefore the description thereof will be omitted. An inversion can be detected similarly to the case of the embodiment 9, and an inversion can be prevented by provided by providing the waveform shown in FIG. 28A to the output terminal 6 of FIG. 24 as the output in the case of FIG. 21A and providing the waveform shown in FIG. 28B in the case of FIG. 21B.

Embodiment 23

The overall constitution of the inversion prevention device in the embodiment 23 is the same as that of the embodiment 14 (FIG. 24) and the operation is also similar to that of the embodiment 14, and therefore the description thereof will be omitted. The constitution of the inversion detector 4 in the embodiment 23 is the same as that of FIG. 13 (embodiment 10) and therefore the description thereof will be omitted. An inversion can be detected similarly to the case of the embodiment 10, and an inversion can be prevented by providing the waveform shown in FIG. 28A to the output terminal 6 of FIG. 24 as the output in the case of FIG. 21A and providing the waveform shown in FIG. 28B in the case of FIG. 21(b).

Embodiment 24

The overall constitution of the inversion prevention device in the embodiment 24 is the same as that of the embodiment 14 (FIG. 24) and the operation is also similar to that of the embodiment 14 and therefore the description thereof will be omitted. The constitution of the inversion detector 4 in the embodiment 24 is the same as that of FIG. 14 (embodiment 11), and therefore the description thereof will be omitted. An inversion can be detected similarly to the case of the embodiment 11, and an inversion can be prevented by providing the waveform shown in FIG. 28A to the output terminal 6 of FIG. 24 as the output in the case of FIG. 21A and providing the waveform shown in FIG. 28B in the case of FIG. 21(b).

Embodiment 25

Figure 25:
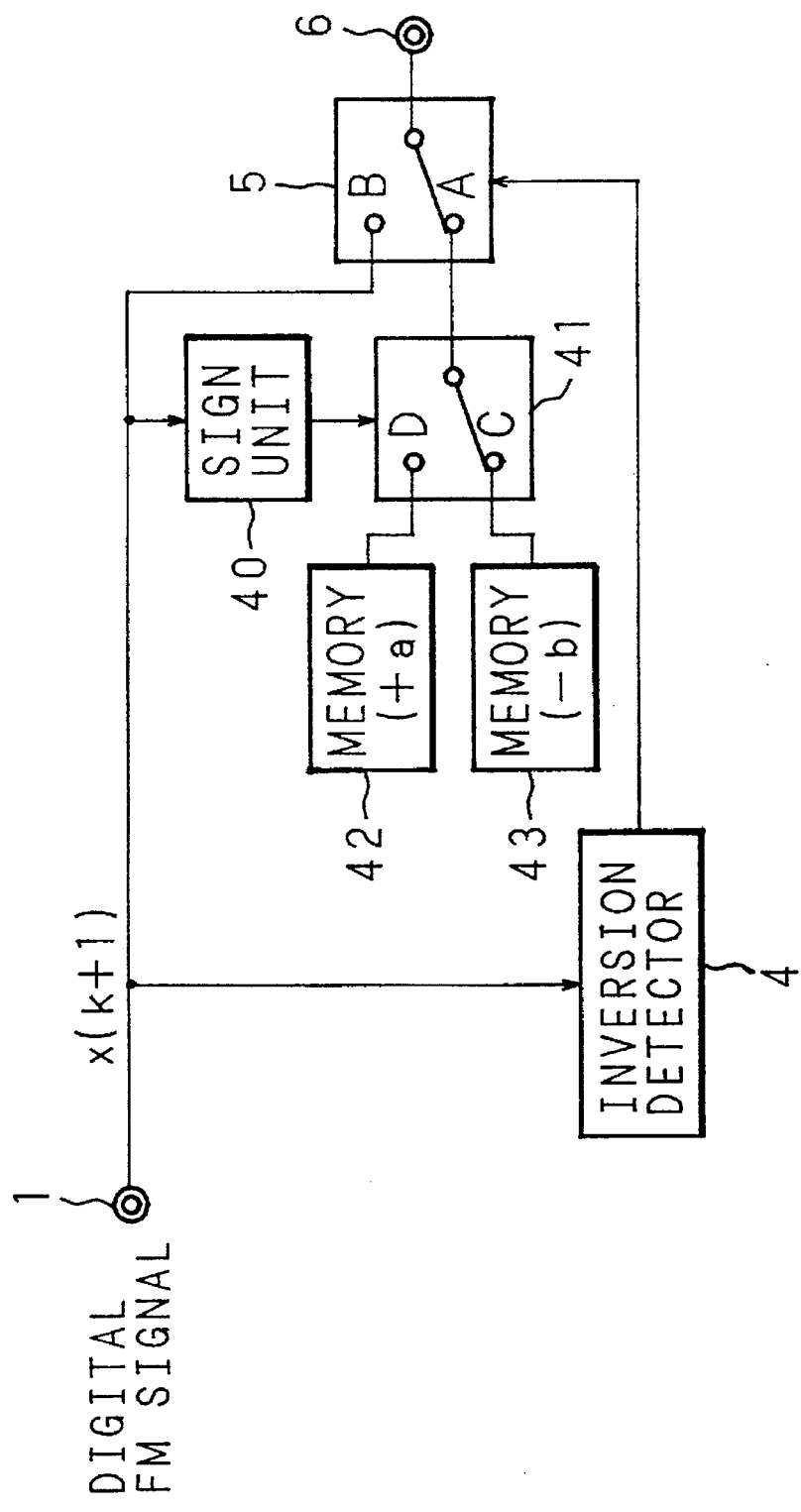
FIG. 25 is a block circuit diagram illustrative of the constitution of inversion prevention devices of the embodiments 25 and 26 of the invention.

FIG. 25 shows the constitution of the inversion prevention device in the embodiment 25, and identical numerals as those in FIG. 24 denote the sane or similar components. The difference from the constitution of FIG. 24 is that the delay corrector 2 and the sideband suppression filter 3 are not necessary that only the input digital FM signals are inputted to the inversion detector 4, and that an inversion is detected only from the input FM signal. The rest of the constitution and the operation are similar to those described in the embodiment 14 and therefore the description thereof will be omitted.

The constitution of the inversion detector 4 in the embodiment 25 is the same as that of FIG. 16 (embodiment 12) and therefore the description thereof will be omitted. An inversion can be detected similarly to the case of the embodiment 12, and an inversion can be prevented by providing the waveform shown in FIG. 28A to the output terminal 6 of FIG. 25 as the output in the case of FIG. 21A and providing the waveform shown in FIG. 28B in the case of FIG. 21B.

Embodiment 26

The overall constitution of the inversion prevention device in the embodiment 15 is the same as that of the embodiment 25 (FIG. 25) and the operation is also similar to that of the embodiment 25, and therefore the description thereof will be omitted. The constitution of the inversion detector 4 in the embodiment 26 is the same as that of FIG. 17 (embodiment 13), and therefore the description thereof will be omitted. An inversion can be detected similarly to the case of the embodiment 13, and an inversion can be prevented by providing the waveform shown in FIG. 28A to the output terminal 6 of FIG. 25 as the output in the case of FIG. 21A and providing the waveform shown in FIG. 28B in the case of FIG. 21B.

In the embodiments 14 through 26 good results can be obtained when the absolute values of +a and −b stored in the memories 42, 43 in advance are set to within ½ of the amplitude of the FM wave.

Now in embodiments 27 through 37 the inversion prevention device of the invention will be described, which has such a constitution that quantized digital FM signals are input ted and either the input digit at FM signals or the output signals of a plurality of sideband suppression filters having different suppression ratios which suppress either both the upper and lower sideband or the lower sideband is selected depending on the output of the inversion detect or which detects an inversion.

Embodiment 27

Figure 29:
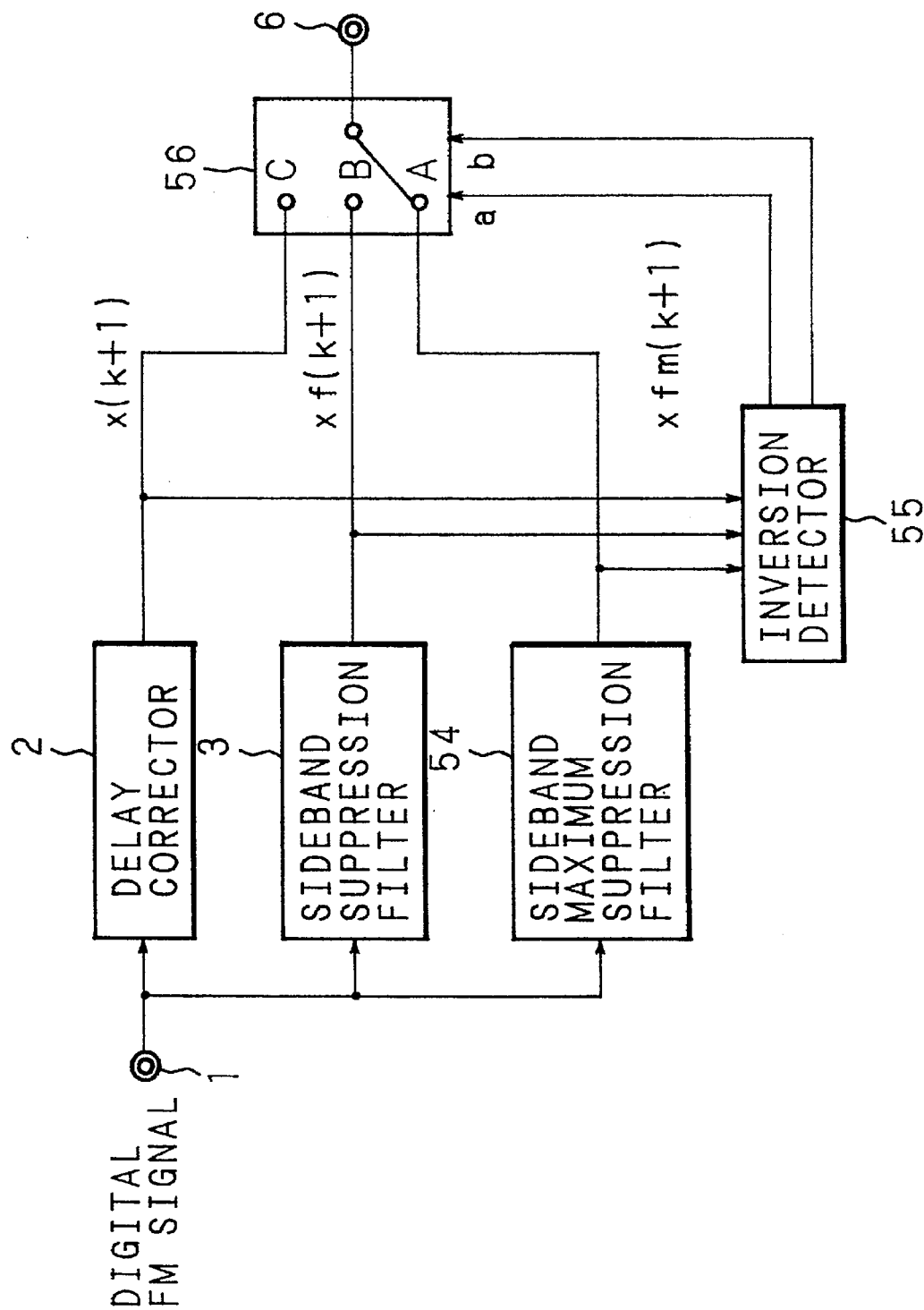
FIG. 29 is a block circuit diagram illustrative of the constitution of inversion prevention devices of the embodiments 27 through 37 of the invention.
Figure 41A:
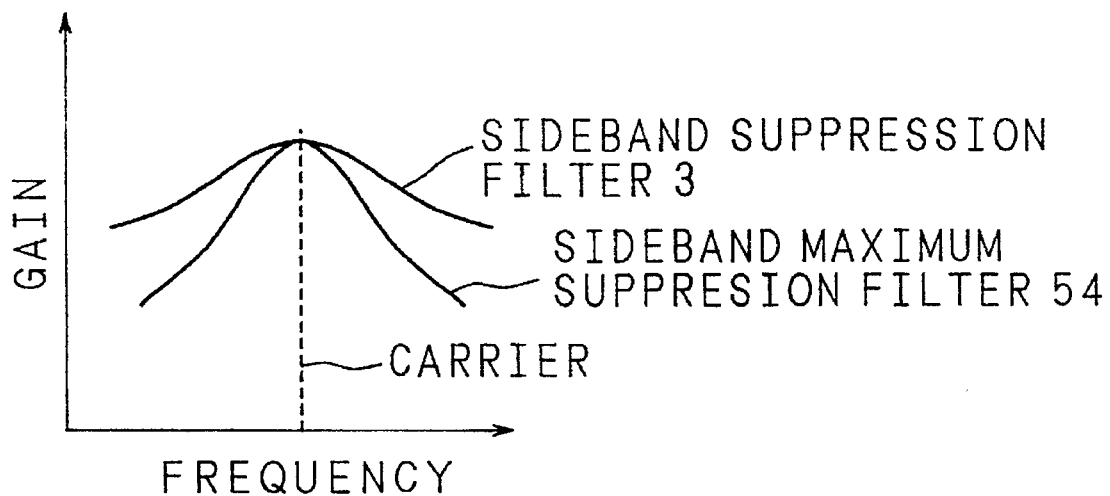
FIGS. 41A, and 41B are characteristic diagrams of a sideband suppression filter and a sideband maximum suppression filter in the embodiments 27 through 37.
Figure 41B:
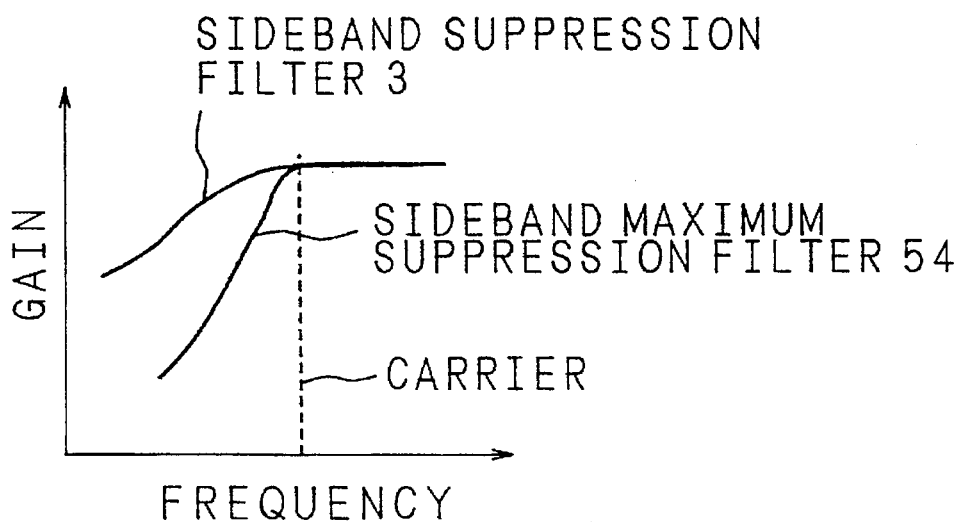

FIG. 29 shows the constitution of the inversion prevent ion device according to the embodiment 27. Numeral 1 in FIG. 29 denotes the input terminal for the digital FM signals. The digital FM signals are inputted via the input terminal 1 to the delay corrector 2 the sideband suppression fitter 3 and a sideband maximum suppression filter 54. The sideband suppression filter 3 and the sideband maximum suppression fitter 54 are band suppression filters which suppress either both the upper and lower sidebands or the lower sideband of the digital FM signals, having different suppression ratios and have characteristics as shown in FIG. 41. FIG. 41A shows a case of suppressing the upper and lower sidebands, and FIG. 41B shows a case of suppressing the lower sideband. The sideband maximum suppression filter 54 has higher suppression ratio than the sideband suppression filter 3, so that all though it is capable of surely preventing an inversion, it causes S/N ratio to deteriorate more than the sideband suppression filter 3 because the lower sideband having the better S/N ratio is suppressed most. The delay corrector 2 causes the digital signal to delay by the same amount as the delay time of the output signal from the sideband suppression filter 3 and the sideband maximum suppression filter 54.

The delay corrector 2 outputs the delayed output signal x(k+1) to an inversion detector 55 and an input terminal C of a selector 56. The sideband suppression filter 3 outputs the output signal xf(k+1) to the inversion detector 55 and an input terminal B of the selector 56. The sideband maximum suppression filter 54 outputs the output signal xfm(k+1) to the inversion detector 55 and an input terminal A of the selector 56. The outputs of the delay corrector 2, sideband suppression filter 3 and the sideband maximum suppression filter 54 in this case are signals which are quantized at the same time. The inversion detector 55 detects art inversion based on the outputs from the delay corrector 2, the sideband suppression filter 3 and the sideband maximum suppression filter 54, and outputs signals a and b which have a value of 0 or 1 to the selector 56 according to the result of detection. The constitution and the operation of the inversion detector 55 will be described latex. The selector 66 selects the terminal A when the outputs of the inversion detector are a=1 and b=1, selects the terminal B when a=1 and b=0, or selects the terminal C when a=0, and outputs the selected signal to the output terminal 6.

Now the operation in FIG. 29 will be described below. The selector 56 normally selects the terminal C. That is the input signal to the input terminal 1 is outputted to the output terminal 6 after being delayed by the delay corrector 2. However when it is determined in the inversion detector 55, that demodulation under this condition will cause an inversion, the selector 56 selects a terminal other than C and the signal which has passed the sideband suppression filter 3 or the sideband maximum suppression fitter 54 is outputted to the output terminal 6. A question arises at this point as to which of the terminal A and the terminal B should be selected namely the output signal of which sideband suppression filter should be selected. To be selected here is the output signal from the sideband suppression filter which is free from inversion and which has a lower suppression ratio for the sideband having better S/N ratio.

Figure 42:
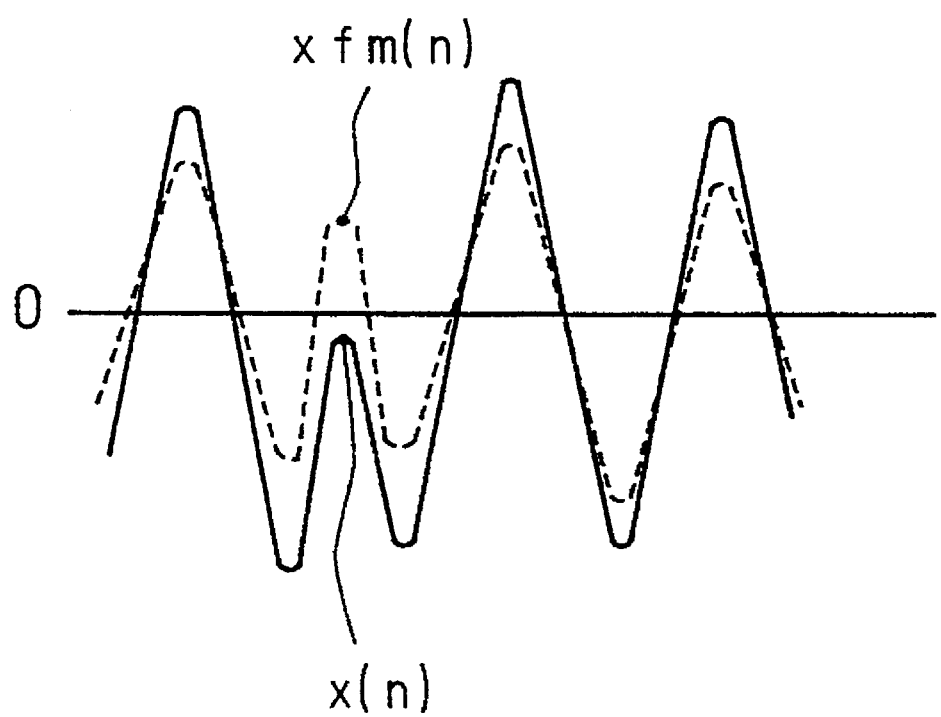
FIG. 42 is a waveform diagram of FM signals explanatory of the operation of the invention.

The procedure of detecting an inversion is as follows. Suppose that quantized FM signals indicated by the solid line in FIG. 42 is inputted to the input terminal 1 then the cross point of the FM signal over the alternate zero level is missing near the point x(n) and it is expected that an inversion will occur if demodulation is carried out under this condition. The output of the sideband maximum suppression filter 54 at this time has time waveform indicated by dashed line in FIG. 42 and crossing over the zero level is restored near xfm(n) which corresponds to x(n), so that an inversion will not be caused if demodulated is carried out under this condition. However, because the lower sideband having better S/N ratio is suppressed, demodulation under this condition will not cause inversion but will cause the demodulation output to have a lower S/N ratio.

Figure 43:
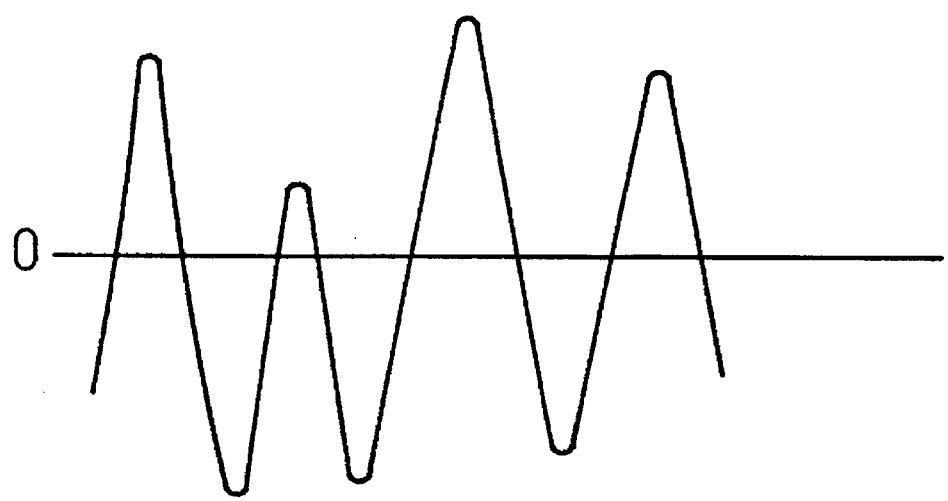
FIG. 43 is a waveform diagram of FM signals explanatory of the operation of the invention.

Therefore, although normally the waveform shown in solid line in FIG. 42 is outputted and demodulated when missing of the cross point over the zero level is detected by the inversion detector 55 near the point x(n), only this portion is replaced by the waveform indicated by the wavy line near xfm(n) and is outputted. However when use of the sideband suppression filter 3 is expected to cause no inversion, the output of the side band suppression filter 3 is selected for the reason of the S/N ratio. When the FM signal shown in FIG. 43 (quantized signals connected by smooth solid curve) is outputted and demodulated, demodulated waveform can be obtained without causing the S/N ratio to deteriorate significantly and free from inversion because the cross point over the zero level is restored.

Figure 30:
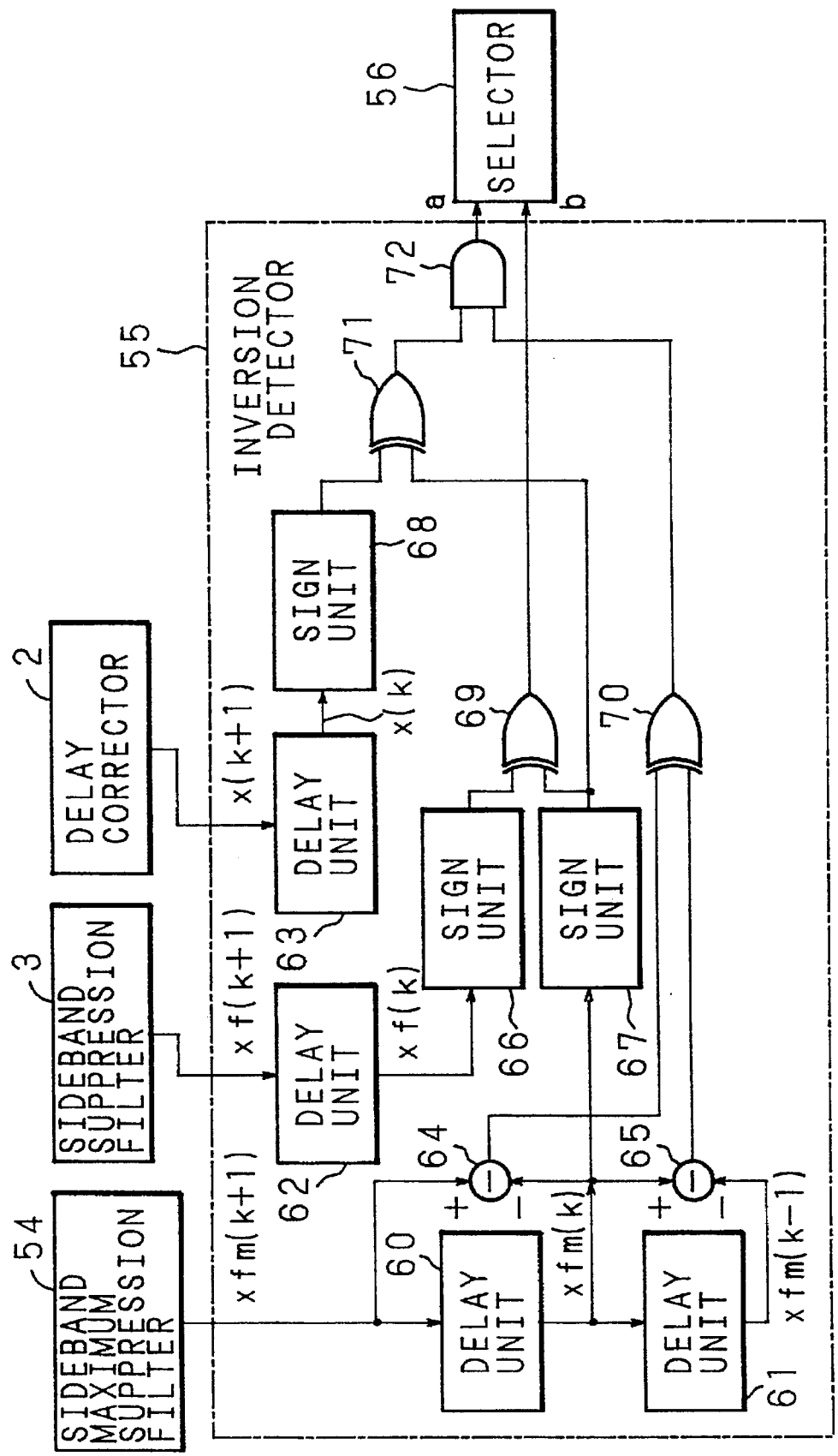
FIG. 30 is a block circuit diagram illustrative of the constitution of inversion prevention devices of the embodiments 27 of the invention.

FIG. 30 shows the block circuit diagram of the inversion detector 55 in the embodiment 27. The sideband maximum suppression filter 54 is provided with delay units 60, 61 which delay the input data by one sampling clock cycle being connected thereto in this order. The output of the delay unit 60 is connected to subtractors 64, 65 and a sign unit 67. The output of the delay unit 61 is connected to the subtractor 65, and the subtractor 64 is connected to the sideband maximum suppression filter 54. The subtractors 64 65 are connected to a XOR gate 70. The subtractors 64, 65 carry out subtraction of the outputs of the sideband maximum suppression filter 54 having a phase difference of one sampling clock cycle and output 1 to the XOR gate 70 when the result of subtraction has a negative sign and outputs 0 in other cases. The sideband suppression filter 3 is provided with a delay unit 62, which delays the input data by one sampling clock cycle, connected thereto and the delay unit 62 is provided with a sign unit 66 connected thereto. The delay corrector 2 is provided with a delay unit 63, which delays the input data by one sampling clock cycle, connected thereto, and the delay unit 63 is provided with a sign unit 68 connected thereto.

The sign unit 66 is connected to a XOR gate 69. The sign unit 67 is connected to the XOR gates 69, 71. The sign unit 68 is connected the XOR gate 71. The sign unit 66 outputs 1 to the XOR gate 69 when the input has a negative sign and outputs 0 in other cases. The sign unit 67 outputs only the sign of the input signal namely 1 to the XOR gates 69, 71 when the input has a negative sign and outputs 0 in other cases The sign unit 68 outputs only the sign of the input signal namely 1 to the XOR gate 71 when the input has a negative sign and outputs 0 in other cases. The outputs of the XOR gates 70, 71 are connected to the input side of a 2-input AND gate 72, and the output side of the AND gate 72 is connected to the selector 56. The output side of the XOR gate 69 is connected to the selector 56.

Figure 44A:
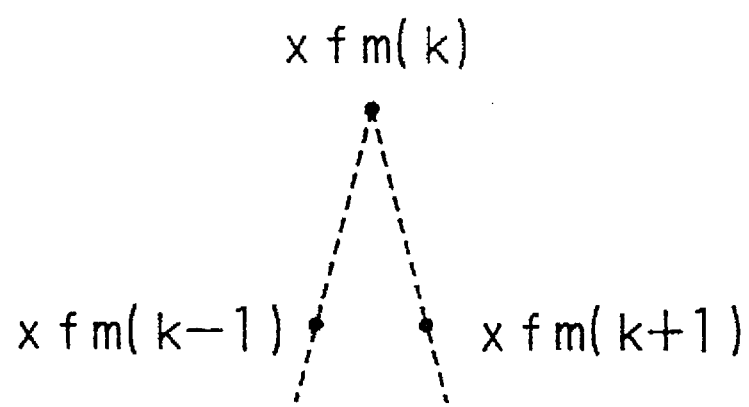
FIGS. 44A and 44B are waveform diagrams of FM signals explanatory of the operation of the invention.
Figure 44B:
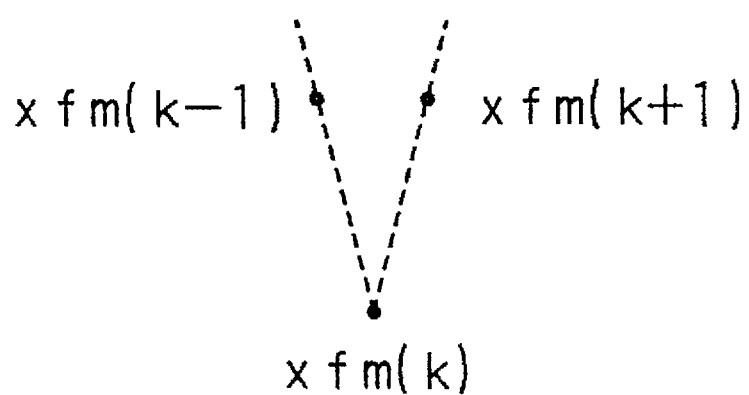
Figure 45A:
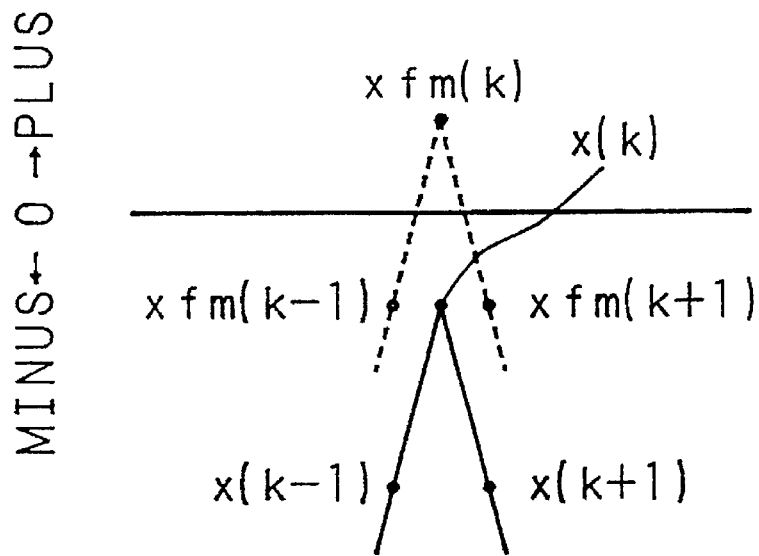
FIGS. 45A and 45B are waveform diagrams of FM signals explanatory of the operation of the invention.
Figure 45B:
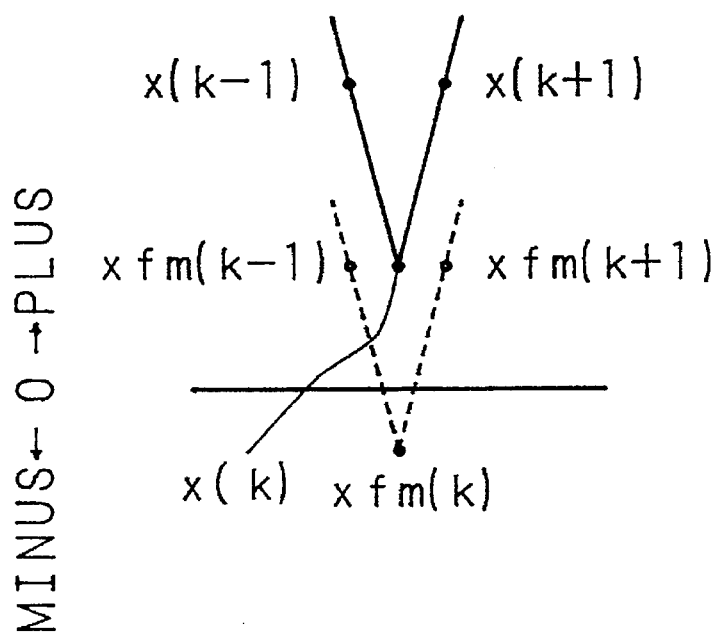

Now the operation will be described below. The XOR gate 70 outputs 1 to the AND gate 72 when {xfm(k)–xfm(k–1)} and (xfm(k+1)–xfm(k)} have different signs and sends 0 when they have the same sign. Namely value 1 is outputted when only such a waveform is detected that has a maximum or minimum value at xfm(k) as shown in FIG. 44A, 44B. The XOR gate 71 sends 1 to the AND gate 72 when x(k) and xfm(k) have different signs and sends 0 when they have the same sign. Consequently, the output a of the AND gate 72 becomes 1 when the waveform is as shown in FIG. 45A, 45B namely an inversion has occurred at x(k), and becomes 0 otherwise. The selector 56 selects the terminal C as far as a=0.

As to the question of which of the terminals A and B, namely the output of which sideband suppression filter to be selected when an inversion has occurred (a=1) at x(k), the output b of the XOR gate 69 becomes 1 then xf(k) and xfm(k) have different signs and becomes 0 when they have the same sign. That is, the selector 56 selects the terminal B in the case of FIG. 48A wherein an inversion of xf(k) does not occur and a=1 and b=0. And the selector 56 selects the terminal A in the case of FIG. 48B wherein only the output xfm(k) of the sideband maximum suppression filter 54 does not experience an inversion and a=1 and b=1.

Figure 46A:
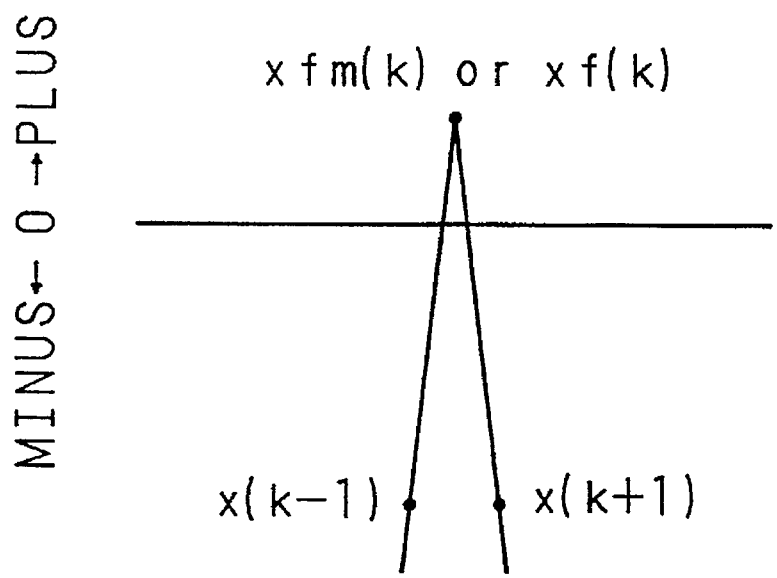
FIGS. 46A and 46B are waveform diagrams of FM signals explanatory of the operation of the invention.
Figure 46B:
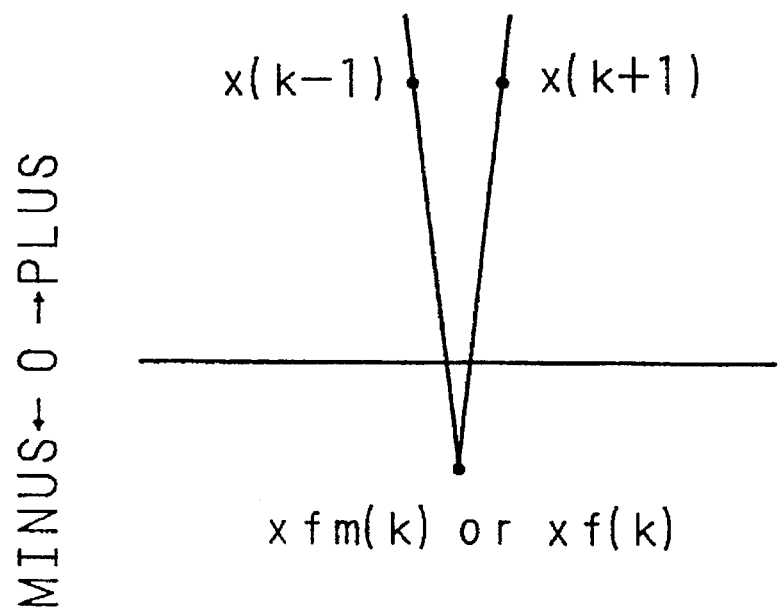

An inversion can be detected in the above operations and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 28

Figure 31:
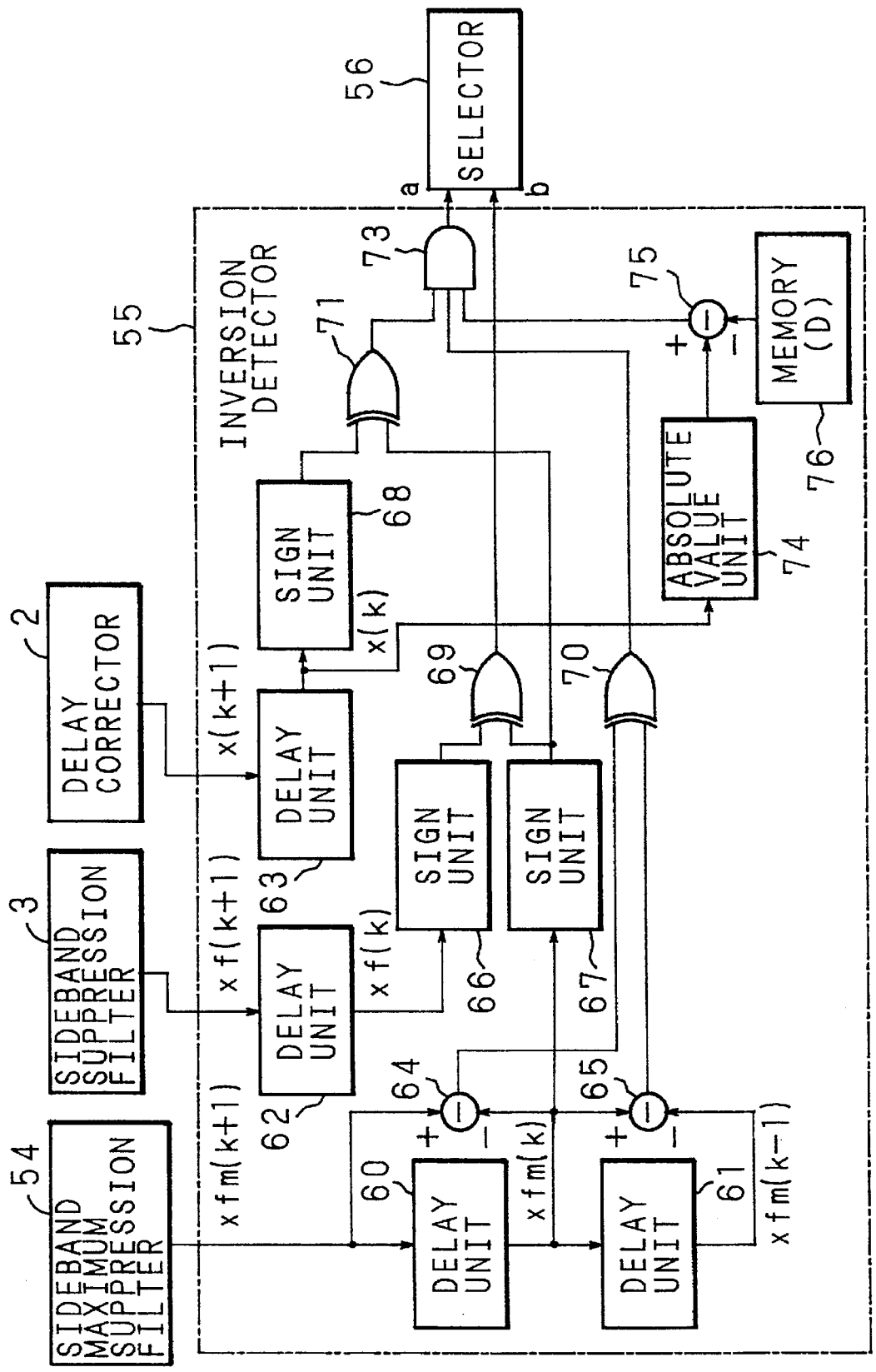
FIG. 31 is a block circuit diagram illustrative of the constitution of inversion prevention devices of the embodiments 28 of the invention.

The overall constitution of the inversion prevention device in the embodiment 28 is the same as that of the embodiment 27 (FIG. 29) and the operation is at so similar to that described in the embodiment 27 and therefore the description thereof will be omitted. FIG. 31 shows the block circuit diagram of the inversion detector 55 in the embodiment 28. In FIG. 31 identical numerals as those in FIG. 30 denote similar components.

The output side of the delay unit 63 is connected to an absolute value unit 74 which gives the absolute value of the input signal and a subtractor 75 in this order. The subtractor 75 is connected to a memory 76 which holds a preset value D. The subtractor 75 subtracts the output of the memory 76 from the output of the absolute value unit 74 and sends only the sign of the result of subtraction namely 1 to a 3-input AND gate 73 when the result of subtraction has a negative sign and sends 0 otherwise. The AND gate 73 receives the outputs of the XOR gates 70, 71 as inputs. The AND gate 73 sends a=1 to the selector 56 only when three inputs thereto are all 1 and sends 0 otherwise.

Now the operation will be described below. The XOR gate 70 outputs 1 to the AND gate 73 when {xfm(k)–xfm(k–1)} and {xfm(k+1)–xfm(k)} have different signs and sends 0 when they have the same sign. Namely, the value 1 is outputted to the AND gate 73 when only such a waveform is detected that has a maximum or minimum value at xfm(k) as shown in FIG. 44A 44B. The XOR gate 71 sends 1 to the AND gate 73 when x(k) and xfm(k) have different signs and sends 0 when they have the same sign. The subtractor 75 outputs 1 to the AND gate 73 when |x(k)|<D and sends 0 otherwise. Thus the output a of the AND gate 73 becomes 1 when such a waveform as shown in FIG. 45A, 45B at the time k which satisfies |x(k)|<D namely when an inversion has occurred at x(k), and the outputs 0 in other cases. The selector 56 selects the terminal C as far as a=0.

The output b of the XOR gate 69 is 1 when xf(k) and xfm(k) have different signs and is 0 when they have the same sign. That is, the selector 56 selects the terminal B in the case of FIG. 48A wherein the inversion of xf(k) does not occur and a=1 and b=0. On the other hand the selector 56 selects the terminal A in the case of FIG. 48B wherein an inversion of does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 29

Figure 32:
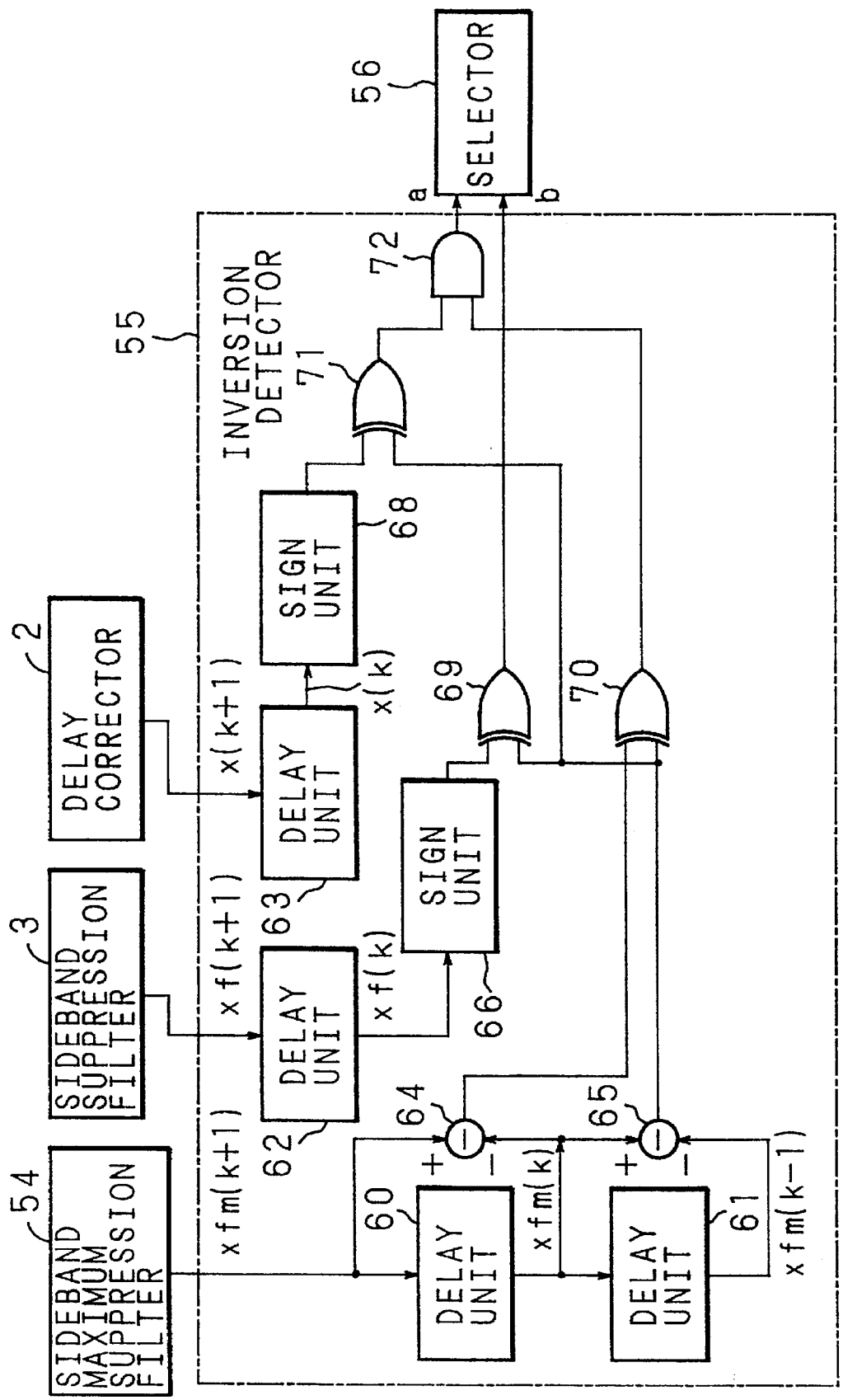
FIG. 32 is a block circuit diagram illustrative of the constitution of inversion prevention devices of the embodiments 29 of the invention.

The overall constitution of the inversion prevention device in the embodiment 29 is the same as that of the embodiment 27 (FIG. 29) and the operation is also similar to that described in the embodiment 27, and therefore the description thereof will be omitted. FIG. 32 shows the block circuit diagram of the inversion detector 55 in the embodiment 29. In FIG. 32 identical numerals as those in FIG. 30 denote the same components. The constitution shown in FIG. 32 is such that the sign unit 67 is eliminated from the constitution shown in FIG. 30 and the output of the subtractor 65 is inputted to the XOR gates 69, 70, 71.

Now the operation will be described below. The XOR gate 70 outputs 1 to the AND gate 72 when {xfm(k)–xfm(k–1)} and {xfm(k+1)–xfm(k)} have different signs and sends 0 when they have the same sign. Namely the value 1 is outputted when only such a waveform is detected that has a maximum or minimum value at xfm(k) as shown in FIG. 44A 44B. The XOR gate 71 sends 1 to the AND gate 72 when x(k) and {xfm(k)–xfm(k–1)} have different signs, and sends 0 when they have the same sign. Thus the output a of the AND gate 72 becomes 1 when such a waveform as shown in FIG. 45A, 45B namely when an inversion has occurred at x(k) and the outputs 0 in other cases. The selector 56 selects the terminal C as far as a=0.

The output h of the XOR gate 69 is 1 when xf(k) and {xfm(k)–xfm(k–1)} have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion of does not occur only for the output. xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 30

Figure 33:
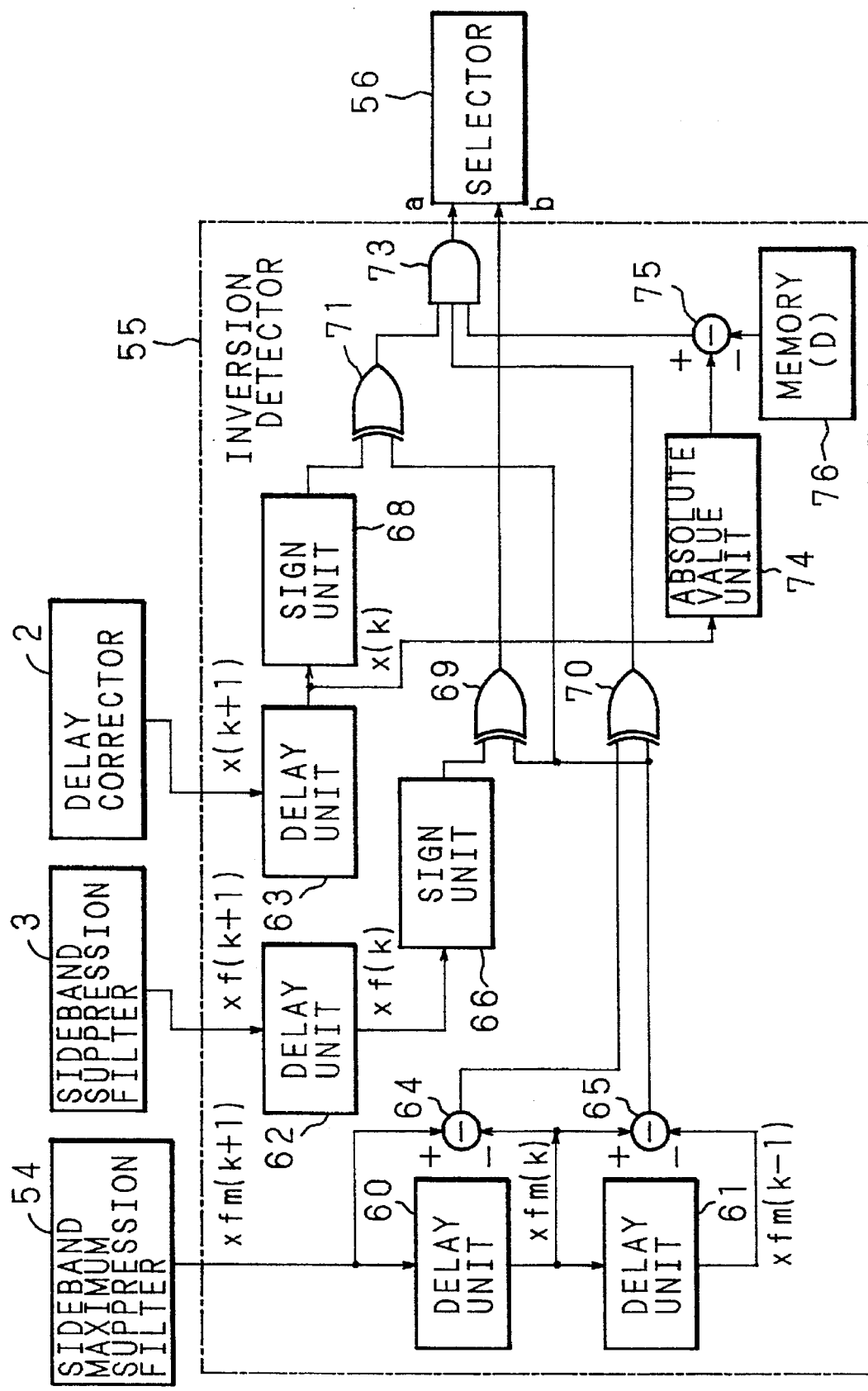
FIG. 33 is a block circuit diagram illustrative of the constitution of inversion prevention devices of the embodiments 30 of the invention.

The overall constitution of the inversion prevention device in the embodiment 30 is the same as that of the embodiment 27 (FIG. 29) and the operation is also similar to that described in the embodiment 27, and therefore the description thereof will be omitted. FIG. 33 shows the block circuit diagram of the inversion detector 55 in the embodiment 30. In FIG. 33, identical numerals as those in FIG. 30 denote similar components. The constitution shown in FIG. 33 is such that the sign unit 67 is eliminated from the constitution shown in FIG. 30 and the output of the subtractor 65 is inputted to the XOR gates 69, 70 and 71. This constitution is also provided with the absolute circuit 74, the subtractor 75, the memory 76 and the 3-input AND gate 73 similar to the embodiment 28.

Now the operation will be described below. The XOR gate 70 outputs 1 to the AND gate 73 when {xfm(k)−xfm(k−1)} and {xfm(k+1)−xfm(k)} have different signs and sends 0 when they have the same sign. Namely the value 1 is outputted to the AND gate 73 when only such a waveform is detected that has a maximum or minimum values at xfm(k) as shown in FIGS. 44A, 44B. The XOR gate 71 sends 1 to the AND gate 73 when x(k) and {xfm(k)−xfm(k−1)} have different signs, and sends 0 when they have the same sign. The subtractor 75 outputs 1 to the AND gate 73 when |x(k)|<D and sends 0 otherwise. Thus the output a of the AND gate 73 becomes 1 when such a waveform as shown in FIGS. 45A, 45B at the time k which satisfies |x(k)|<D, namely when an inversion has occurred at x(k), anti the outputs 0 in other cases. The selector 56 selects the terminal C as far as a=0.

The output b of the XOR gate 69 is 1 when xf(k) and {xfm(k)−xfm(k−1)} have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion of does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 31

Figure 34:
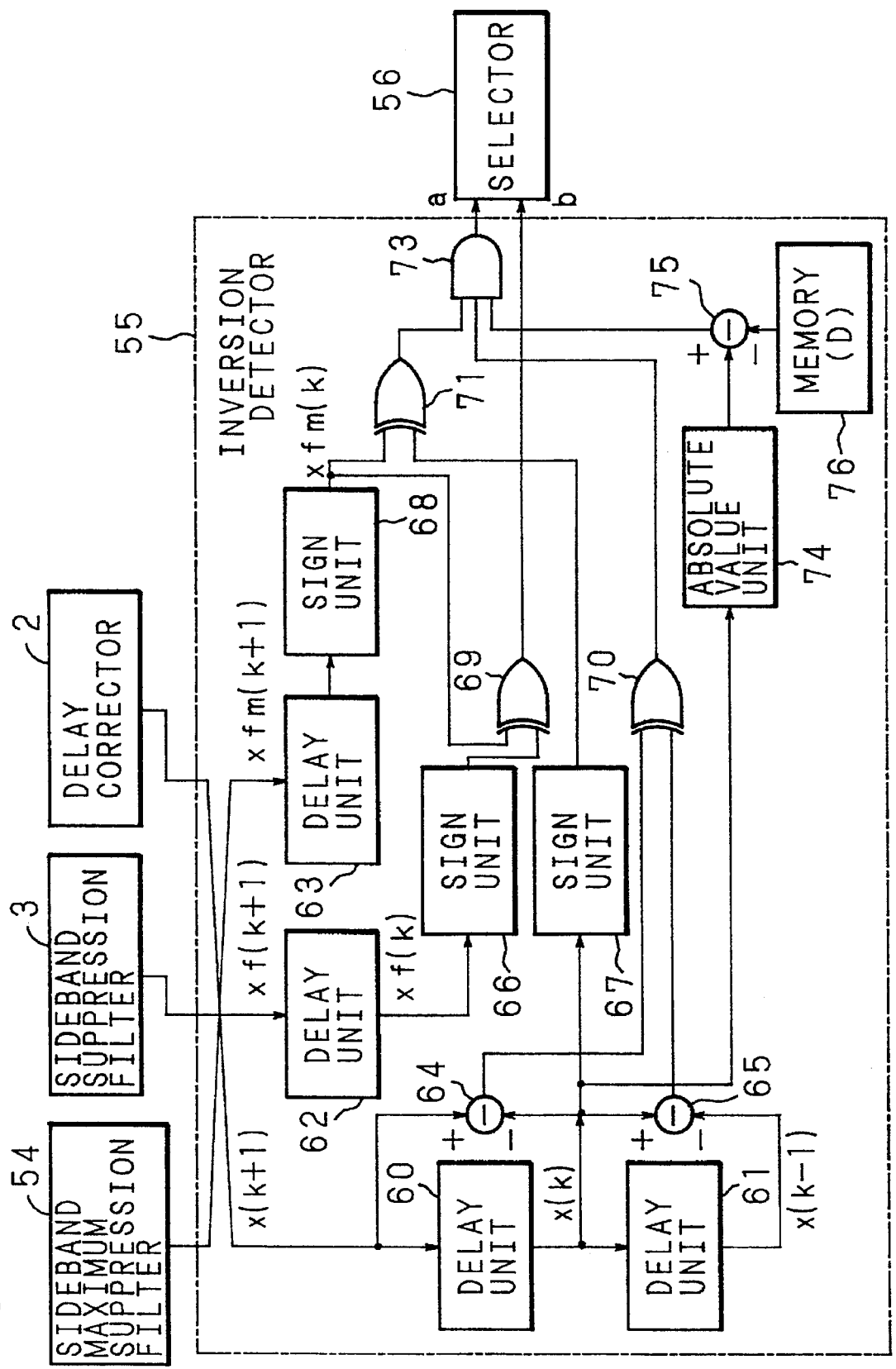
FIG. 34 is a block circuit diagram illustrative of the constitution of inversion prevention devices of the embodiments 31 of the invention.

The overall constitution of the inversion prevention device in the embodiment 31 is the same as that of the embodiment 27 (FIG. 29) and the operation is also similar to that described in the embodiment 27, and therefore the description thereof will be omitted. FIG. 34 shows the block circuit diagram of the inversion detector 55 in the embodiment 31. In FIG. 34, identical numerals as those in FIG. 30 denote similar components. The constitution shown in FIG. 34 is such that a maximum point and a minimum point are detected by means of the output of the delay corrector 2 in the constitution shown in FIG. 31 (embodiment 28).

Figure 47A:
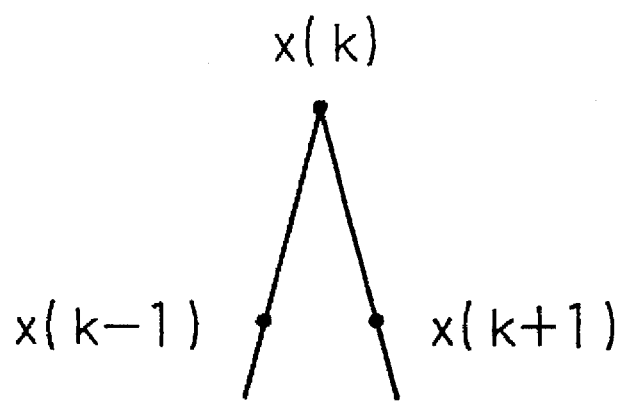
FIGS. 47A and 47B are waveform diagrams of FM signals explanatory of the operation of the invention.
Figure 47B:
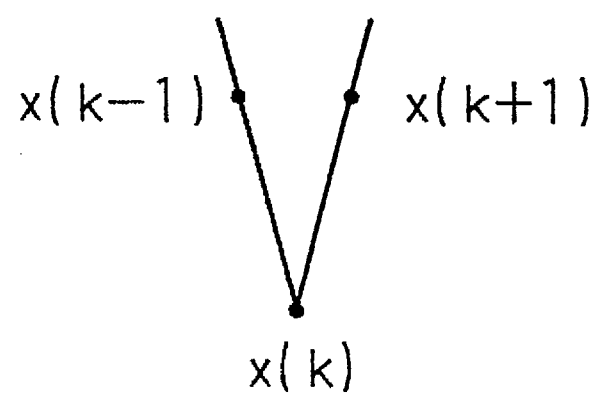

Now the operation will be described below. The XOR gate 70 outputs 1 to the AND gate 73 when {x(k)−x(k−1)} and {x(k+1)−x(k)} have different signs, and sends 0 when they have the same sign. Namely, the value 1 is outputted to the AND gate 73 when only such a waveform is detected that has a maximum or minimum value at x(k) as shown in FIGS. 47A, 47B. The XOR gate 71 sends 1 to the AND gate 73 when x(k) and xfm(k) have different signs, and sends 0 when they have the same sign. The subtractor 75 outputs 1 to the AND gate 73 when |x(k)|<D and sends 0 otherwise. Thus the output a of the AND gate 73 becomes 1 when such a waveform as shown in FIGS. 45A, 45B at the time k which satisfies |x(k)|<D, namely when an inversion has occurred at x(k), and the output is 0 in other cases. The selector 56 selects the terminal C as far as a=0.

The output b of the XOR gate 69 is 1 when xf(k) and xfm(k) have different signs and is 0 when they have the same sign. That is, the selector 56 selects the terminal B in the case of FIG. 48A wherein the inversion of xf(k) does not occur and a=1 and b=0. On the or her hand, the selector 56 selects the terminal A in the case of FIG. 48B wherein an inversion does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 32

Figure 35:
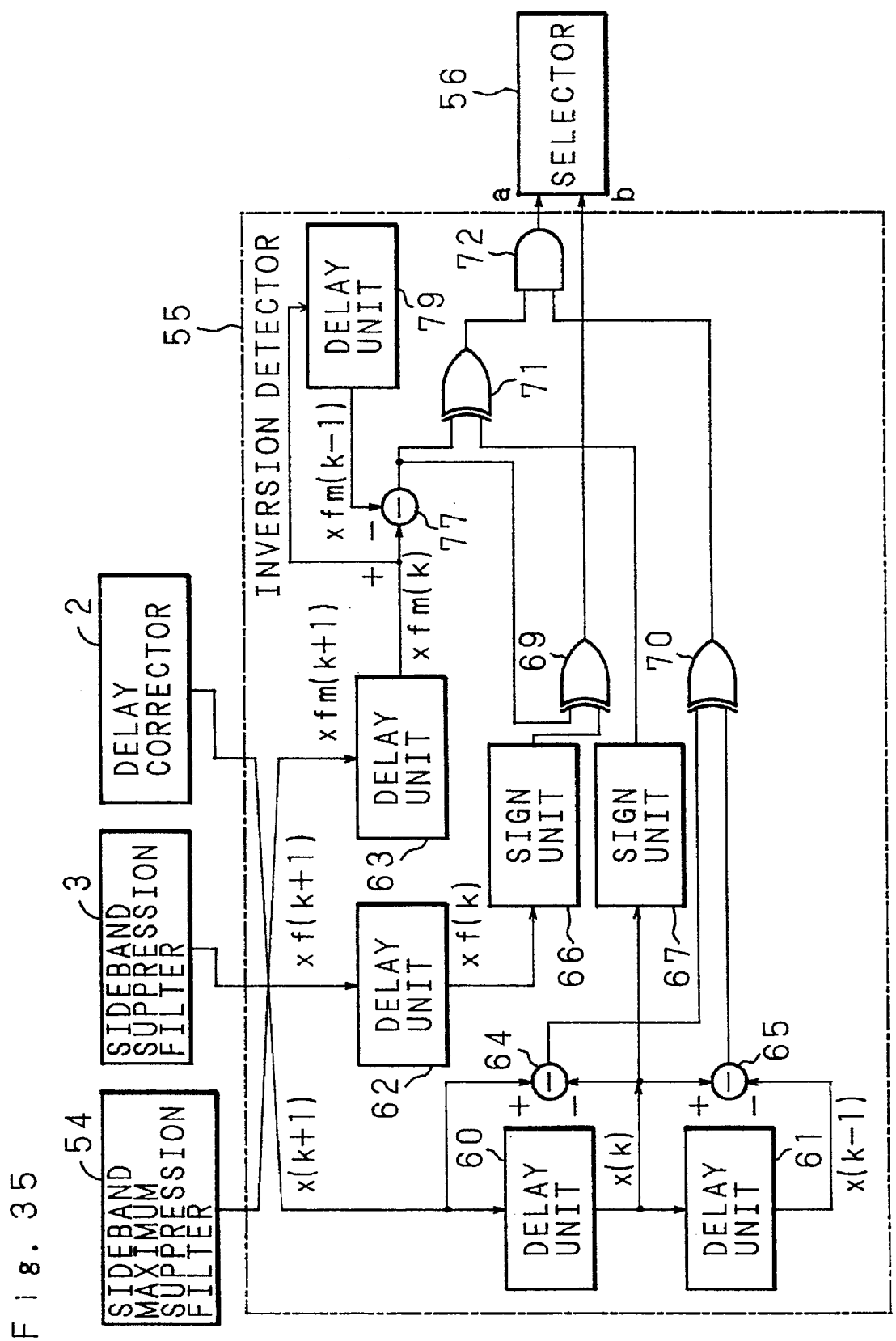
FIG. 35 is a block circuit diagram illustrative of the constitution of inversion prevention devices of the embodiments 32 of the invention.

The overall constitution of the inversion prevention device in the embodiment 32 is the same as that of the embodiment 27 (FIG. 29) and the operation is also similar to that described in the embodiment 27, and therefore the description thereof will be omitted. FIG. 35 shows the block circuit diagram of the inversion detector 55 in the embodiment 32. In FIG. 35, identical minerals as those in FIG. 30 denote similar components. The constitution shown in FIG. 35 is such that maximum point and the minimum point are detected by means of the output of the delay corrector 2 in the constitution shown in FIG. 32 (embodiment 29). Also the output side of the delay unit 63 is connected to a subtractor 77 and a delay unit 79, while the subtractor 77 carries out subtraction, of the input and output signals of the delay unit 79 and outputs only the sign of the result of subtraction, namely 1 to the XOR gates 69, 71 when the result of subtraction has negative sign and outputs 0 in other cases.

Now the operation will be described below. The XOR gate 70 outputs 1 to the AND gate 72 when {x(k)−x(k−1)} and {x(k+1)−x(k)} have different signs, and sends 0 when they have the same sign. Namely, the value 1 is outputted when only such a waveform is detected that has a maximum or minimum values at x(k) as shown in FIGS. 47A, 47B. The XOR gate 71 sends 1 to the AND gate 72 when x(k) and {xfm(k)−xfm(k−1)} have different signs, and sends 0 when they have the same sign. Thus the output a of the AND gate 72 becomes 1 when such a waveform as shown in FIGS. 45A, 45B, namely when inversion has occurred at x(k), and the output is 0 in other cases. The selector 56 selects the terminal C as far as a=0.

The output b of the XOR gate 69 is 1 when xf(k) and {xfm(k)−xfm(k−1)} have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 33

Figure 36:
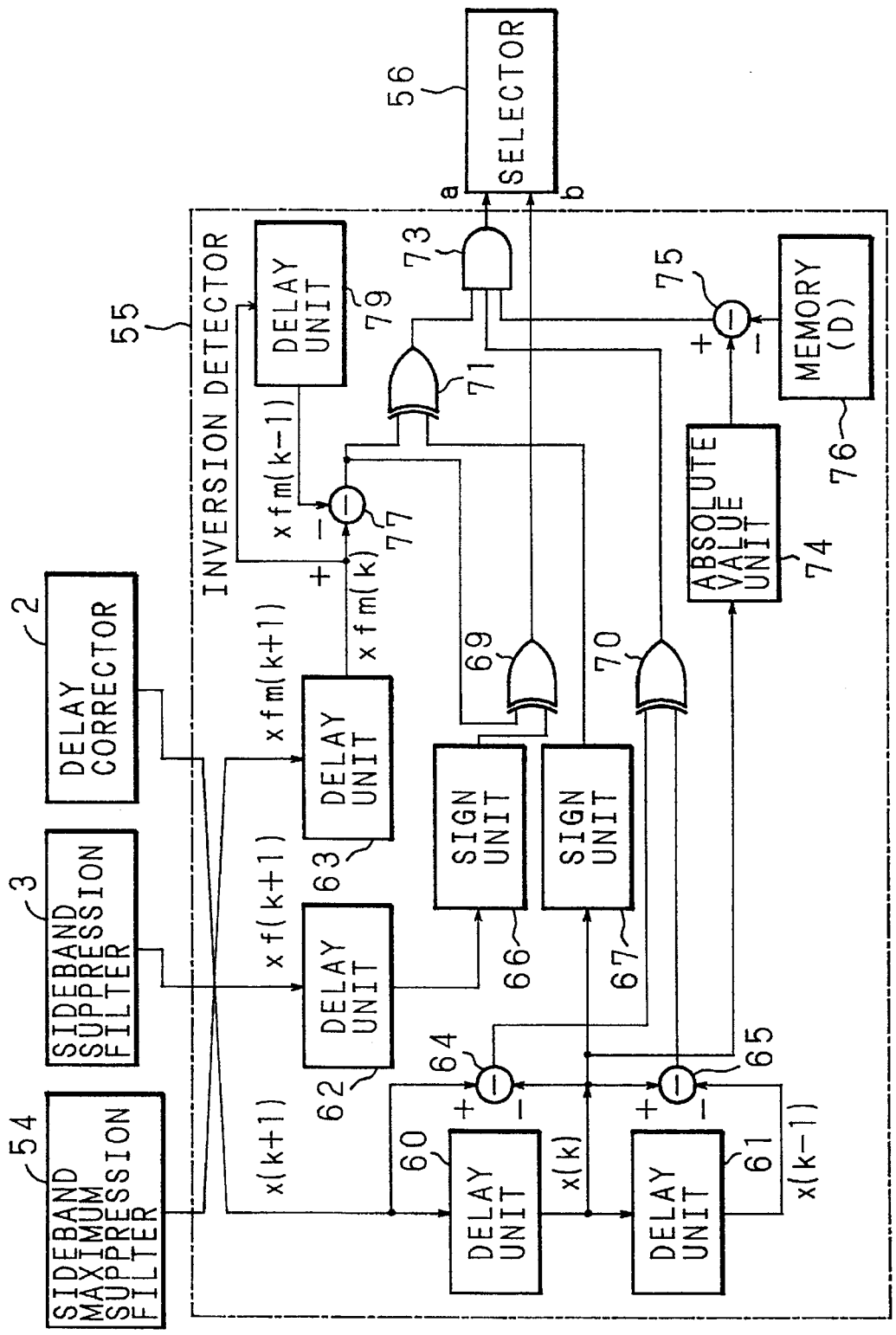
FIG. 36 is a block circuit diagram a illustrative of the constitution of inversion prevention devices of the embodiments 33 of the invention.

The overall constitution of the inversion prevention device in the embodiment 33 is the same as that of the embodiment 27 (FIG. 29) and the operation is also similar to that described in the embodiment 27, and therefore the description thereof will be omitted. FIG. 36 shows the block circuit diagram of the inversion detector 55 in the embodiment 33. In FIG. 36, identical numerals as those in FIG. 30 denote similar components. The constitution shown in FIG. 36 is such that a maximum point and a minimum point are detected by means of the output of the delay corrector 2 in the constitution shown in FIG. 33 (embodiment 30). Also the output of the delay unit 63 is connected to the subtractor 77 and the delay unit 79, while the subtractor 77 carries out subtraction of the input and output signals and outputs only the sign of the result of subtraction, namely 1 to the XOR gates 69, 71 when the result of subtraction has a negative sign and outputs 0 in other cases.

Now the operation will be described below. The XOR gate 70 outputs 1 to the AND gate 73 when $\{x(k)-x(k-1)\}$ and $\{x(k+1)-x(k)\}$ have different signs and sends 0 when they have the same sign. Namely, the value 1 is outputted when only such a waveform is detected that has a maximum or minimum values at x(k) as shown in FIGS. 47A, 47B. The XOR gate 71 sends 1 to the AND gate 73 when x(k) and $\{xfm(k)-xfm(k-1)\}$ have different signs, and sends 0 when they have the same sign. The subtractor 75 outputs 1 to the AND gate 73 when $|x(k)|<D$ and sends 0 otherwise. Thus the output a of the AND gate 73 becomes 1 when such a waveform as shown in FIGS. 45A, 45B at the time k which satisfies $|x(k)|<D$, namely when inversion has occurred at x(k) and the output is 0 in other cases. The selector 56 selects the terminal C as far as a=0.

The output b of the XOR gate 69 is 1 when xf(k) and $\{xfm(k)-xfm(k-1)\}$ have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 34

Figure 37:
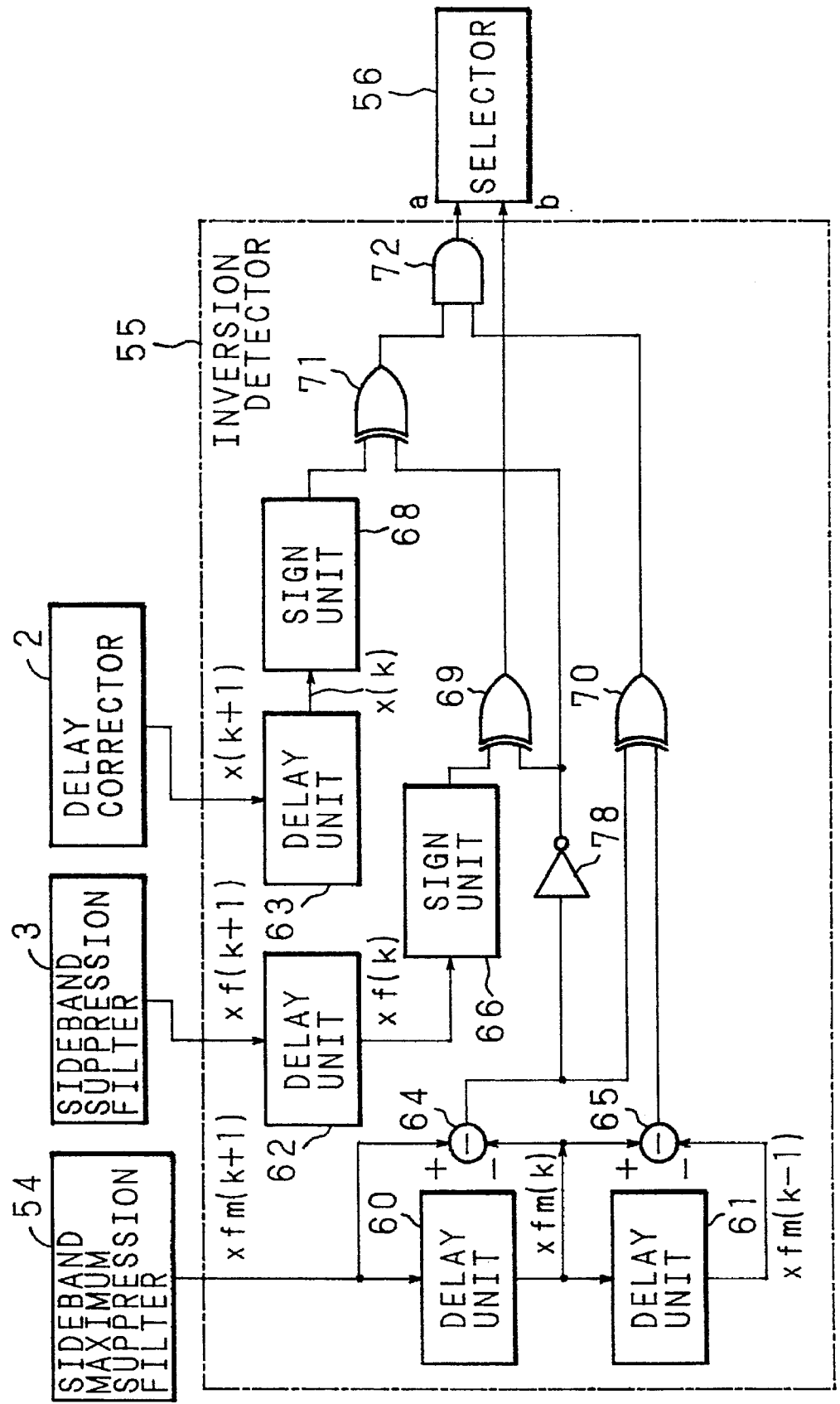
FIG. 37 is a block circuit diagram illustrative of the constitution of inversion prevention devices of the embodiments 34 of the invention.

The overall constitution of the inversion prevention device in the embodiment 34 is the same as that of the embodiment 27 (FIG. 29) and the operation is also similar to that described in the embodiment 27, and therefore the description thereof will be omitted. FIG. 37 shows the block circuit diagram of the inversion detector 55 in the embodiment 34. In FIG. 37, identical numerals as those in FIG. 30 denote similar components. The constitution shown in FIG. 37 is such that the output of the subtractor 64 is inputted to the XOR gates 69, 71 via an inverter 78 which inverts the input signal in the constitution shown in FIG. 32 (embodiment 29).

Now the operation will be described below. The XOR gate 70 outputs 1 to the AND gate 72 when $\{xfm(k)-xfm(k-1)\}$ and $\{xfm(k+1)-xfm(k)\}$ have different signs, and sends 0 when they have the same sign. Namely, the value 1 is outputted when only such a waveform is detected that has a maximum or minimum value at xfm(k) as shown in FIGS. 44A, 44B. The XOR gate 71 sends 1 to the AND gate 72 when x(k) and inverted $\{xfm(k+1)-fm(k)\}$ have different signs, and sends 0 when they have the same sign. Thus the output a of the AND gate 73 becomes 1 when such a waveform as shown in FIGS. 45A, 45B, namely when an inversion has occurred at x(k), and the output is 0 in other cases. The selector 56 selects the terminal C as far as a=0.

The output b of the XOR gate 69 is 1 when xf(k) and inverted $\{xfm(k+1)-xfm(k)\}$ have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 35

Figure 38:
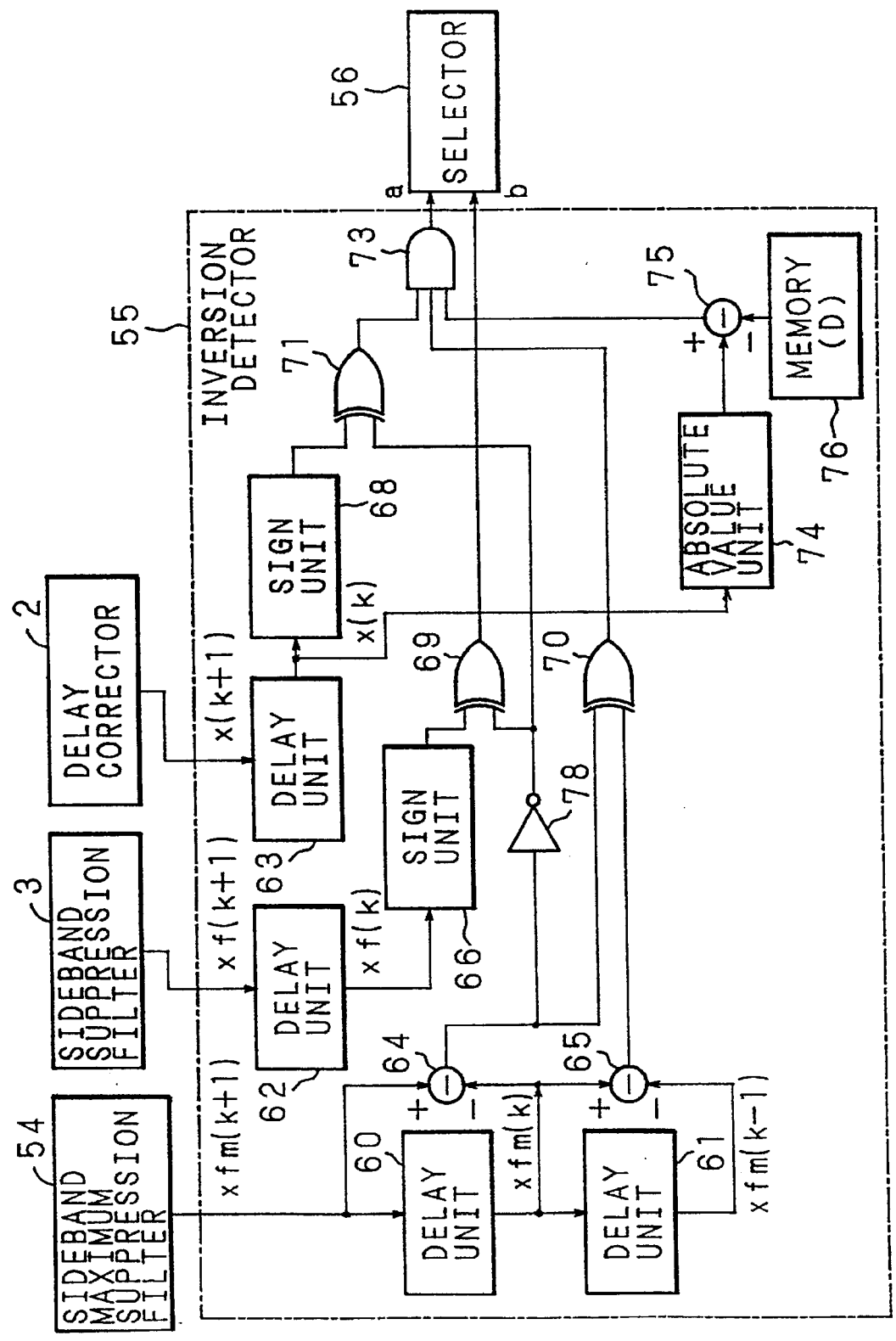
FIG. 38 is a block circuit diagram illustrative of the constitution of inversion prevention devices of the embodiments 35 of the invention.

The overall constitution of the inversion prevention device in the embodiment 35 is the same as that of the embodiment 27 (FIG. 29) and the operation is also similar to that described in the embodiment 27, and therefore the description thereof will be omitted. FIG. 38 shows the block circuit diagram of the inversion detector 55 in the embodiment 35. In FIG. 38, identical numerals as those in FIG. 30 denote similar components. The constitution shown in FIG. 38 is such that the output of the subtractor 64 is inputted to the XOR gates 69, 71 via the inverter 78 which inverts the input signal in the constitution shown in FIG. 33 (embodiment 30).

Now the operation will be described below. The XOR gate 70 outputs 1 to the AND gate 73 when $\{xfm(k)-xfm(k-1)\}$ and $\{xfm(k+1)-xfm(k)\}$ have different signs and sends 0 when they have the same sign. Namely, the value 1 is outputted to the AND gate 73 when only such a waveform is detected that has a maximum or minimum value at xfm(k) as shown in FIGS. 44A(a), 44B. The XOR gate 71 sends 1 to the AND gate 73 when x(k) and inverted $\{xfm(k+1)-xfm(k)\}$ have different signs, and sends 0 when they have the same sign. The subtractor 75 outputs 1 to the AND gate 73 when $|x(k)|<D$ and sends 0 otherwise. Thus the output a of the AND gate 73 becomes 1 when such a waveform as shown in FIGS. 45A, 45B, at the time k which satisfies $|x(k)|<D$, namely when an inversion has occurred at x(k), and the output is 0 in other cases. The selector 56 selects the terminal C as far as a=0.

The output b of the XOR gate 69 is 1 when xf(k) and inverted $\{xfm(k+1)-xfm(k)\}$ have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 36

Figure 39:
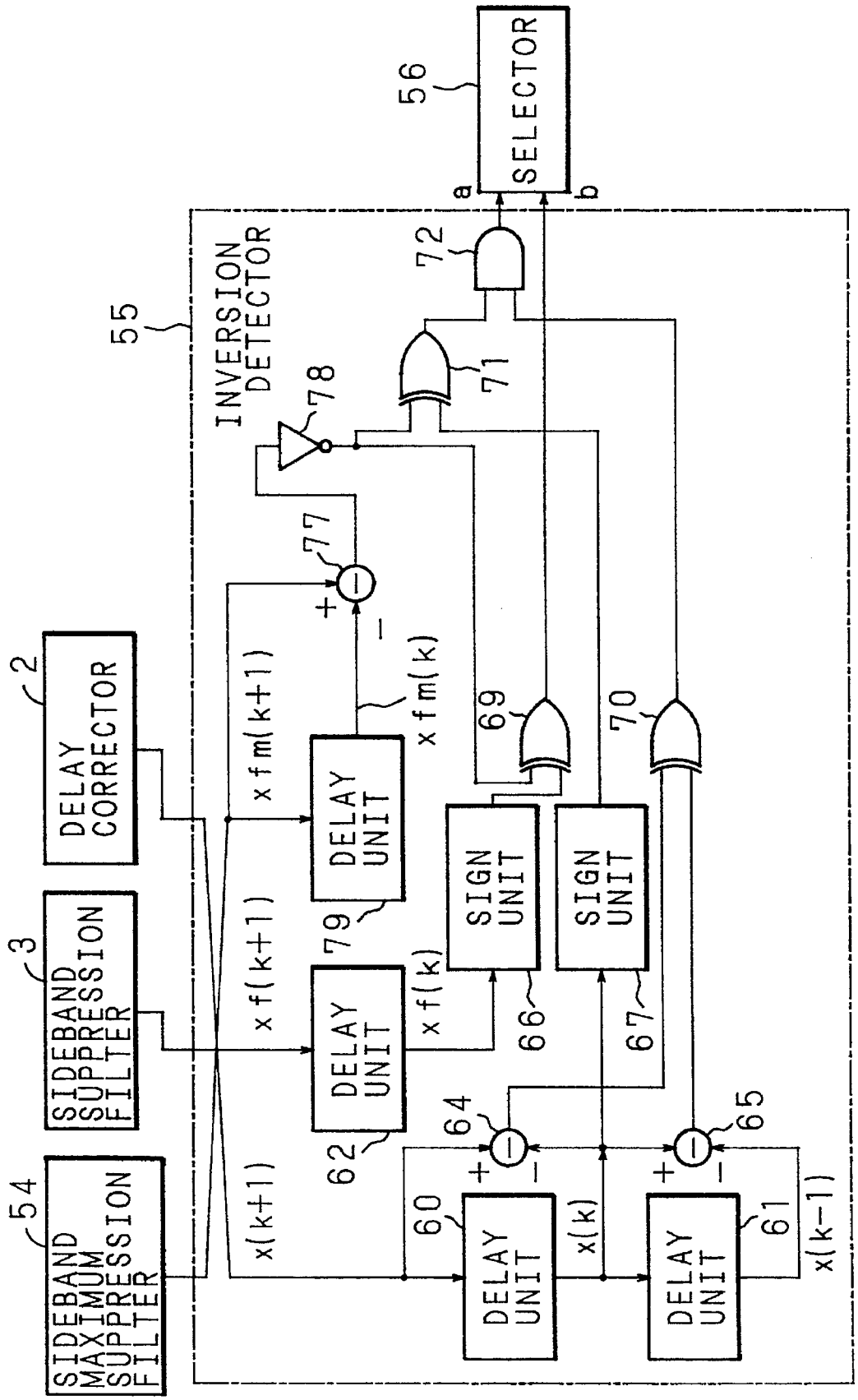
FIG. 39 is a block circuit diagram illustrative of the constitution of inversion prevention devices of the embodiments 36 of the invention.

The overall constitution of the inversion prevention device in the embodiment 36 is the same as that of the embodiment 27 (FIG. 29) and the operation is also similar to that described in the embodiment 27, and therefore the description thereof will be omitted. FIG. 39 shows the block circuit diagram of the inversion detector 55 in the embodiment 36. In FIG. 39, identical numerals as those in FIG. 30 denote similar components. The constitution shown in FIG. 39 is such that the input and output signals of the delay unit 79 are subtracted in the subtractor 77, and the sign of the result of subtraction is inputted to the XOR gates 69, 71 via the inverter 78, in the constitution shown in FIG. 35 (embodiment 32).

Figure 48A:
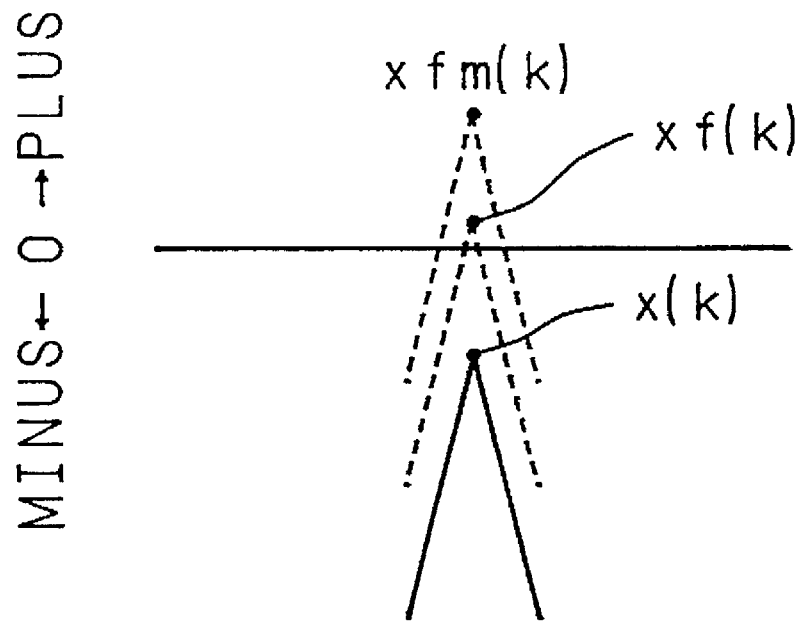
FIGS. 48A and 48B are waveform diagrams of FM signals explanatory of the operation of the invention.
Figure 48B:
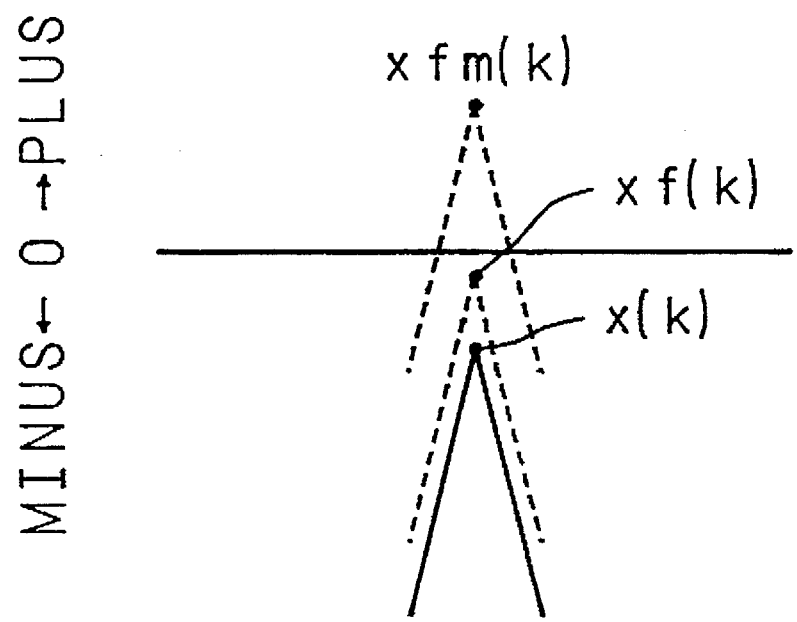

Now the operation will be described below. The XOR gate 70 outputs 1 to the AND gate 72 when {x(k)–x(k–1)} and {x(k+1)–x(k)} have different signs and sends 0 when they have the same sign. Namely, the value 1 is outputted to the AND gate 72 when only such a waveform is detected that has a maximum or minimum value at x(k) as shown in FIGS. 48A, 48B. The XOR gate 71 sends 1 to the AND gate 72 when x(k) and inverted {xfm(k+1)–xfm(k)} have different signs, and sends 0 when they have the same sign. Thus the output a of the AND gate 72 becomes 1 when such a waveform as shown in FIGS. 45A, 45B, namely when an inversion has occurred at x(k), and the output is 0 in other cases. The selector 56 selects the terminal C as far as a=0.

The output b of the XOR gate 69 is 1 when xf(k) and inverted {xfm(k+1)–xfm(k)} have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion of does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Embodiment 37

Figure 40:
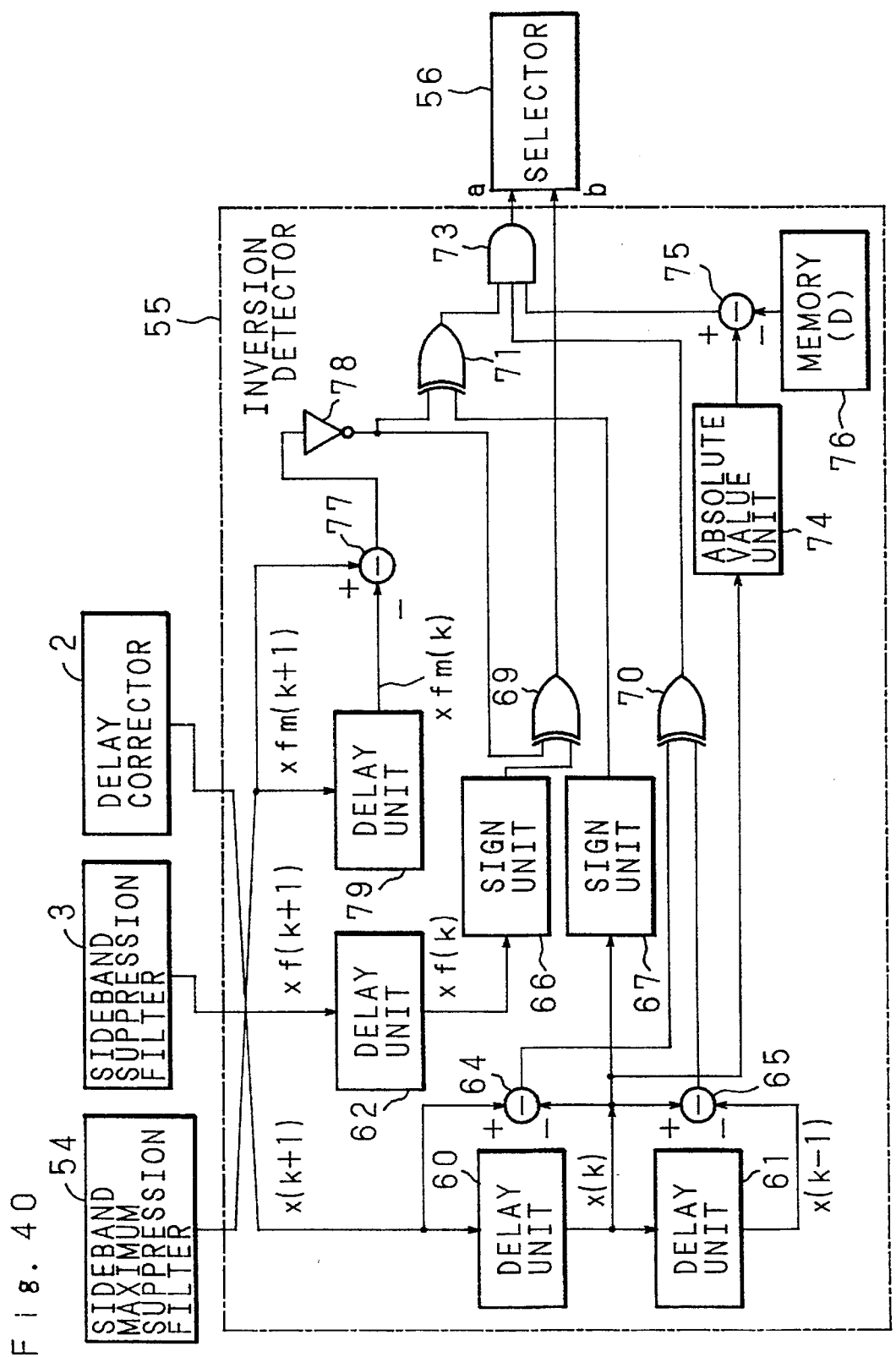
FIG. 40 is a block circuit diagram illustrative of the constitution of inversion prevention devices of the embodiments 37 of the invention.

The overall constitution of the inversion prevention device in the embodiment 37 is the same as that of the embodiment 27 (FIG. 29) and the operation is also similar to that described in the embodiment 27, and therefore the description thereof will be omitted. FIG. 40 shows the block circuit diagram of the inversion detector 55 in the embodiment 37. In FIG. 40, identical numerals as those in FIG. 30 denote similar components. The constitution shown in FIG. 40 is such that subtraction of the input and output signals of the delay unit 79 is carried out in the subtractor 77 and the sign of the result of subtraction is inputted to the XOR gates 69, 71 via the inverter 78 in the constitution shown in FIG. 36 (embodiment 33).

Now the operation will be described below. The XOR gate 70 outputs 1 to the AND gate 73 when {x(k)–x(k–1)} and {x(k+1)–x(k)} have different signs, and sends 0 when they have the same sign. Namely, the value 1 is outputted to the AND gate 73 when only such a waveform is detected that has a maximum or minimum value at x(k) as shown in FIGS. 47A, 47B. The XOR gate 71 sends 1 to the AND gate 73 when x(k) and inverted {xfm(k+1)–xfm(k)} have different signs, and sends 0 when they have the same sign. The subtractor 75 outputs 1 to the AND gate 73 when |x(k)|<D and sends 0 otherwise. Thus the output a of the AND gate 73 becomes 1 when such a waveform as shown in FIGS. 45A, 45B at the time k which satisfies |x(k)|<D, namely when inversion has occurred at x(k), and the output is 0 in other cases. The selector 56 selects the terminal C as far as a=0.

The output b of the XOR gate 69 is 1 when xf(k) and inverted {xfm(k+1)–xfm(k)} have different signs and is 0 when they have the same sign. That is, the selector 56 selects the terminal B in the case of FIG. 48A wherein the inversion of xf(k) does not occur and a=1 and b=0. On the other hand, the selector 56 selects the terminal A in the case of FIG. 48B wherein an inversion does not occur only for the output xfm(k) of the sideband maximum suppression filter 54 and a=1 and b=1.

An inversion can be detected in the above operations, and an inversion can be prevented by providing the waveform shown in FIG. 46A to the output terminal 6 of FIG. 29 as the output in the case of FIG. 45A and providing the waveform shown in FIG. 46B in the case of FIG. 45B.

Although two kinds of sideband suppression filters (one of which is a sideband maximum suppression filter) having different ratios of suppression as a plurality of sideband suppression filters to suppress the upper and lower sidebands or the lower sideband in the embodiments 27 through 37, similarly satisfactory results can also be obtained by using three or more kinds of sideband suppression filters.

Also in the embodiments 27, 28, 29, 30, 34, 35 the output signal of the sideband maximum suppression filter is used to detect a maximum point and a minimum point of the output signal from the sideband suppression filter, although similarly satisfactory results can also be obtained by using the output signal of the sideband suppression filter excluding the sideband maximum suppression filter to detect a maximum point and a minimum point.

Now in embodiments 38 through 48, the inversion prevention device of the invention in such a constitution will be described that quantized digital FM signals are inputted and either the input digital FM signal, the output signal of one low-sideband emphasis filter or of a plurality of sideband emphasizing filters having different ratios of suppressing the upper sideband or emphasizing the lower sideband or the output signal of one sideband suppression filter which suppresses both upper and lower sidebands or the lower sideband or of a plurality of sideband suppression filters having different suppression ratios depending on the output of the inversion detector.

Embodiment 38

Figure 49:
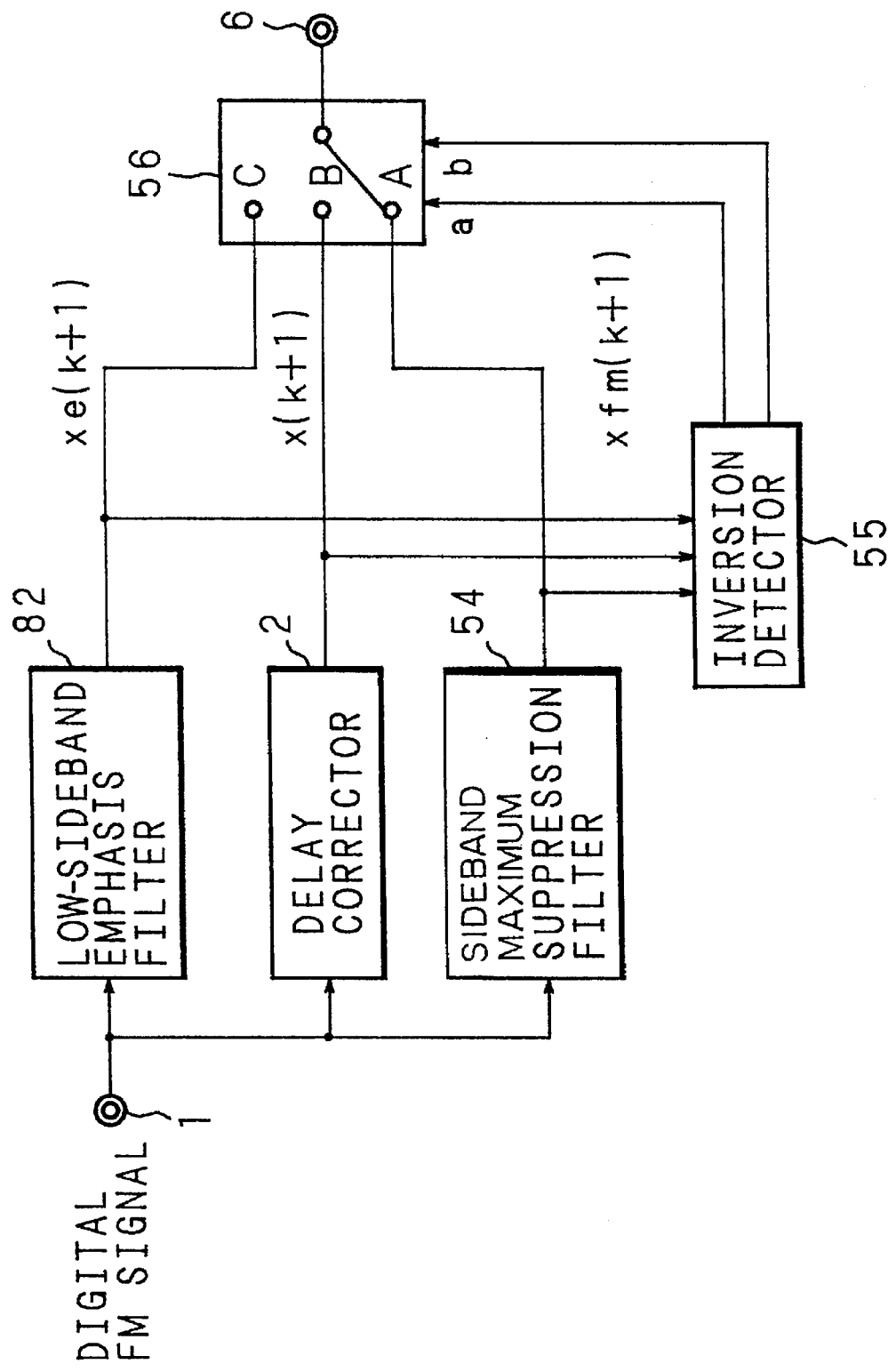
FIG. 49 is a block circuit diagram illustrative of the constitution of inversion prevention devices of the embodiments 38 through 48 of the invention.
Figure 61A:
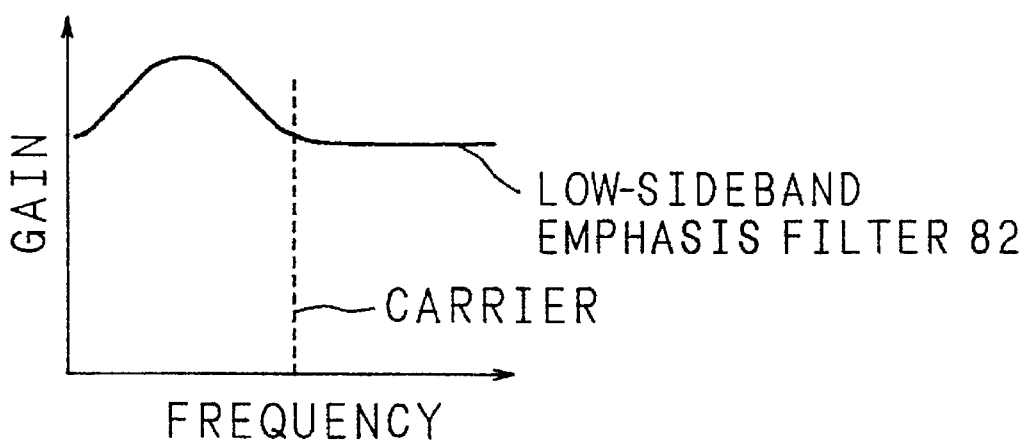
FIGS. 61A, 61B, and 61C are characteristic diagrams of a low-sideband emphasis filter in the embodiments 38 through 48.
Figure 61B:
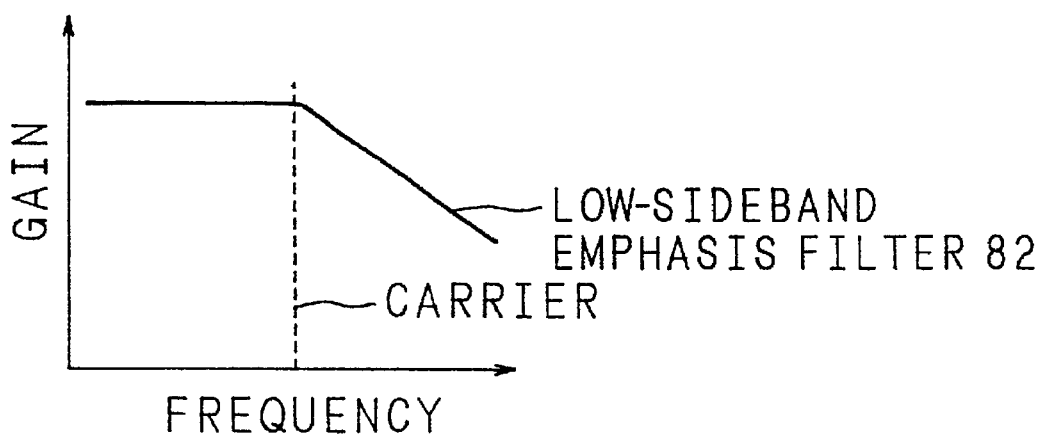
Figure 61C:
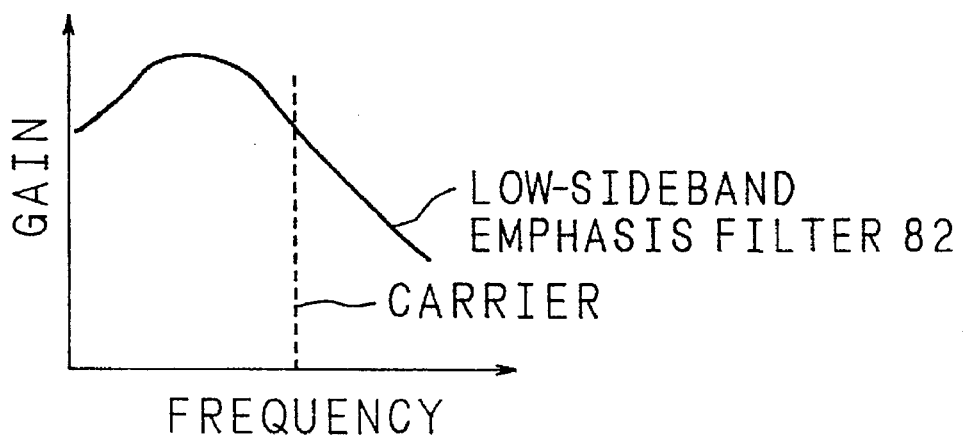
Figure 62A:
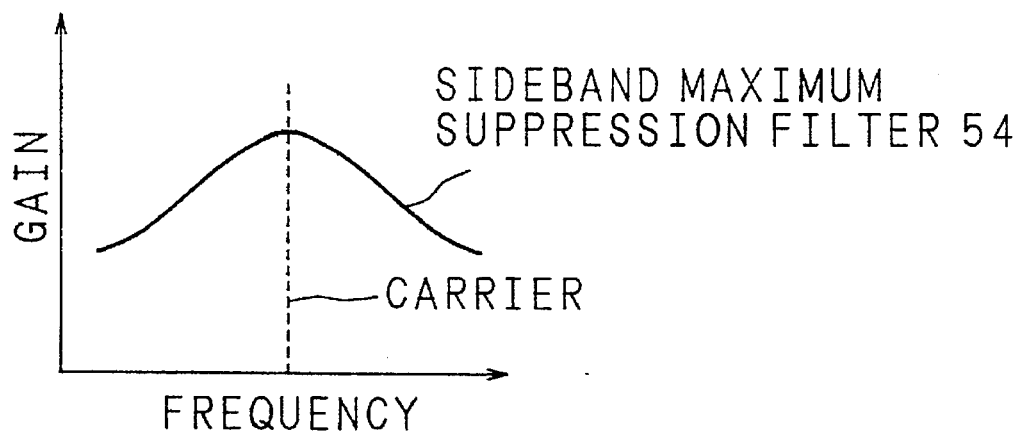
FIGS. 62A and 62B are characteristic diagrams of a sideband maximum suppression filter in the embodiments 38 through 48.
Figure 62B:
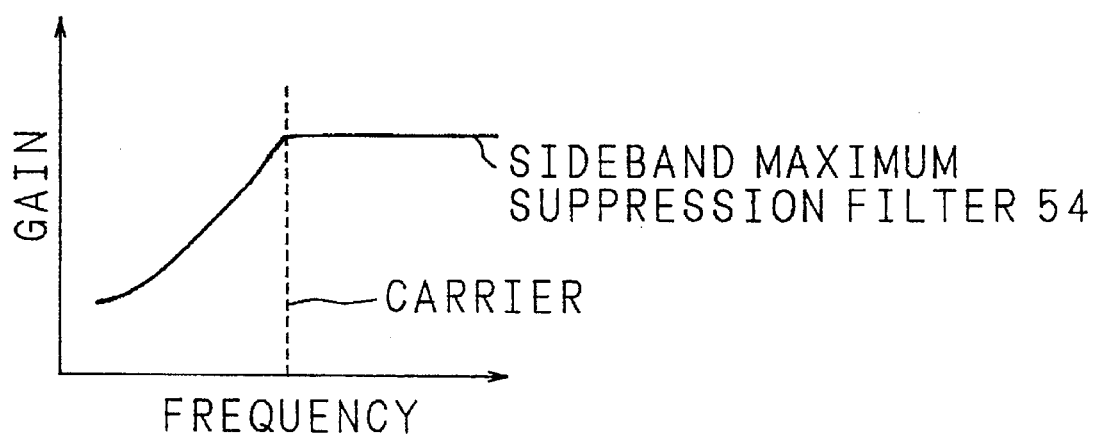

FIG. 49 shows the constitution of an inversion prevention device according to the embodiment 38. Numeral 1 in FIG. 49 denotes the input terminal for the digital FM signals. The digital FM signals are inputted via the input terminal 1 to a low-sideband emphasis filter 82, the delay corrector 2 and the sideband maximum suppression filter 54. The low-sideband emphasis filter 82 emphasizes the lower sideband or suppresses the upper sideband of the digital FM signal, and has such characteristics as shown in FIG. 61. FIG. 61A shows a case of emphasizing the lower sideband. FIG. 61B shows a case of suppressing the upper sideband and FIG. 61C shows a case of emphasizing the lower sideband and suppressing the upper sideband. The sideband maximum suppression filter 54 suppresses either both the upper and the lower sidebands or the lower sideband of the digital FM signal, and has such characteristics as shown in FIG. 62. FIG. 62A shows a case of suppressing the upper and lower sidebands, and FIG. 62B shows a case of suppressing the lower sideband. The delay corrector 2 causes the digital signal to delay by the same amount as the delay time of the output signals from the low-sideband emphasis filter 82 and the sideband maximum suppression filter 54.

The delay corrector 2 outputs the delayed output signal x(k+1) to the inversion detector 55 and the input terminal B of the selector 56. The sideband emphasizing filter 82 outputs the output signal xe(k+1) to the inversion detector 55 and the input terminal C of the selector 56. The sideband maximum suppression filter 54 outputs the output signal xfm(k+1) to the inversion detector 55 and the input terminal A of the selector 56. The outputs of the delay corrector 2, the low-sideband emphasis filter 82 and the sideband maximum suppression filter 54 in this case are signals which are quantized at the same time. Because the lower sideband having better S/N ratio is emphasized in the output of the low-sideband emphasis filter 82, demodulation of this signal gives the best S/N ratio although an inversion is likely to occur. And suppression ratio is high in the output signal of the sideband maximum suppression filter 54 and enables it to surely suppress an inversion, although the S/N ratio deteriorates significantly because the lower sideband having good S/N ratio is suppressed most. The output of the delay corrector 2 has intermediate characteristics between the above two extremes.

The inversion detector 55 detects an inversion based on the outputs from the low-sideband emphasis filter 82, the delay corrector 2 and the sideband maximum suppression filter 54 and outputs signals a and b which have a value of 0 or 1 to the selector 56 according to the result of detection. The constitution and the operation of the inversion detector 55 will be described in detail later. The selector 56 selects the terminal A when the output of the inversion detector 55 is a=1 and b=1, selects the terminal B when a=1 and b=0, or selects the terminal C when a=0, and outputs the selected signal to the output terminal 6.

Now the operation in FIG. 49 will be described below. The selector 56 normally selects the terminal C. That is, a signal inputted to the input terminal 1 is outputted to the output terminal 6 via the low-sideband emphasis filter 82 which gives the best S/N ratio. However, only when it is determined, in the inversion detector 55, that demodulation under this condition will cause an inversion the selector 56 selects a terminal other than C. Either the terminal A or the terminal B is selected so that an output signal free from inversion and a better S/N ratio can be obtained.

The procedure of detecting inversion is as follows. Suppose that the waveform of the output signal from the low-sideband emphasis filter 82 is as indicated by the solid line in FIG. 63, then the cross point of the FM signal over the alternate zero level is missing near the point xe(n) and it is expected that an inversion will occur if demodulation is carried out under this condition. The output of the sideband maximum suppression filter 54 at this time has the waveform indicated by dashed line in FIG. 63 and crossing over the zero level is restored near xfm(n) which corresponds to xe(n), so that an inversion will not be caused if demodulated under this condition. However, because the lower sideband having a better S/N ratio is suppressed demodulation under this condition will cause the demodulation output to have a lower S/N ratio although it will not cause an inversion.

Figure 63:
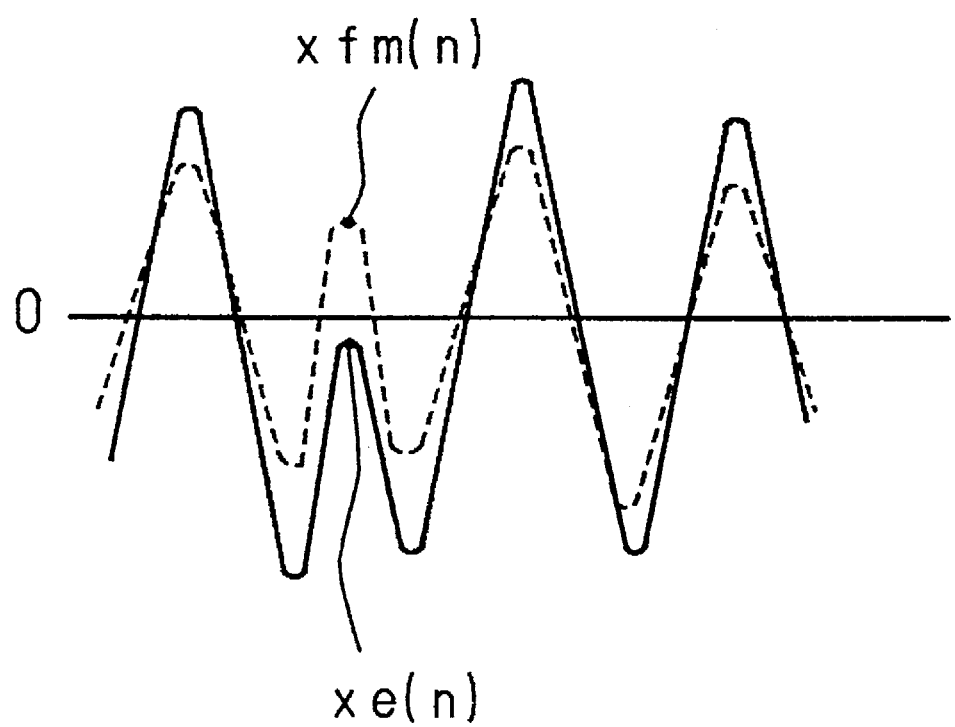
FIG. 63 is a waveform diagram of FM signals explanatory of the operation of the invention.
Figure 64:
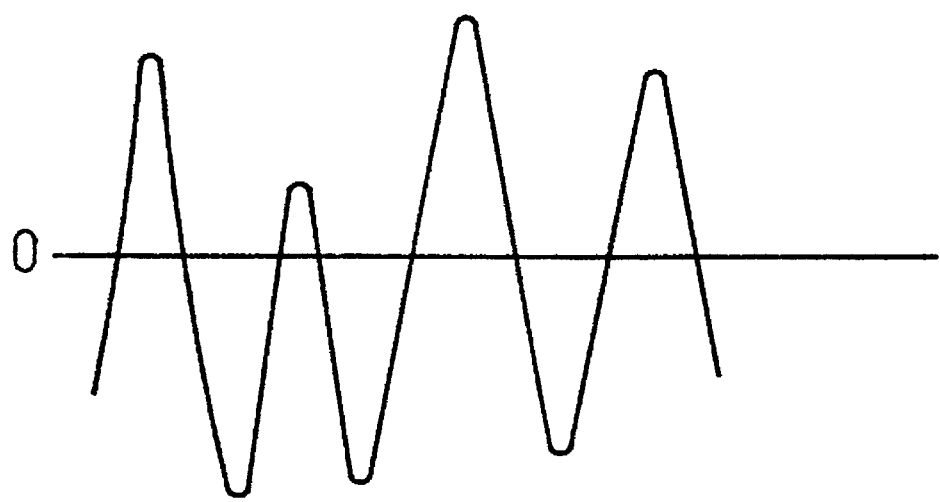
FIG. 64 is a waveform diagram of FM signals explanatory of the operation of the invention.

Therefore, although normally the waveform shown in solid line in FIG. 63 is outputted and demodulated, when missing of the cross point over the zero level is detected by the inversion detector 55 near the point xe(n), only this portion is replaced by the waveform indicated by the wavy line near xfm(n) and is outputted. However, when use of the output from the delay corrector 2 is expected to prevent an inversion the output of the delay corrector 2 is selected for the reason of the S/N ratio. When the FM signal shown in FIG. 64 (quantized signals connected by smooth solid line) is outputted and demodulated, the demodulated waveform can be obtained with a extremely good S/N ratio free from inversion because the cross point over the zero level is restored.

Figure 50:
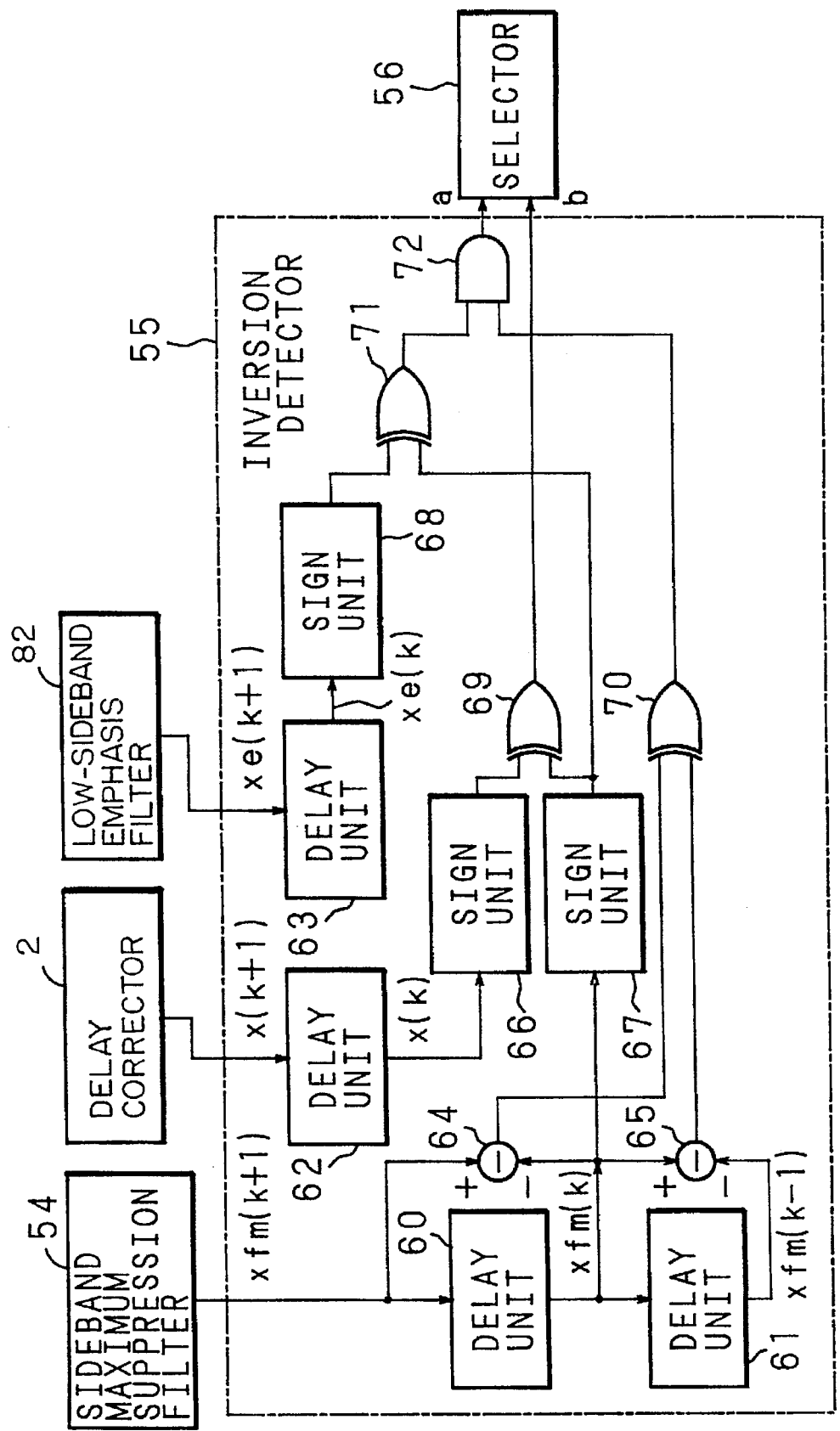
FIG. 50 is a block circuit diagram illustrative of the constitution of inversion prevention devices of the embodiments 38 of the invention.

FIG. 50 shows the block circuit diagram of the inversion detector 55 in the embodiment 38. The constitution shown in FIG. 50 is identical with that of the inversion detector 55 of FIG. 30 (embodiment 27) except that the output signal of the delay corrector 2 is inputted to the delay unit 62 and the output signal of the low-sideband emphasis filter 82 is inputted to the delay unit 63, and therefore the description thereof will be omitted.

Now the operation will be described below. The operation of the inversion detector 55 in the embodiment 38 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 27, and the description thereof will therefore be omitted.

Figure 65A:
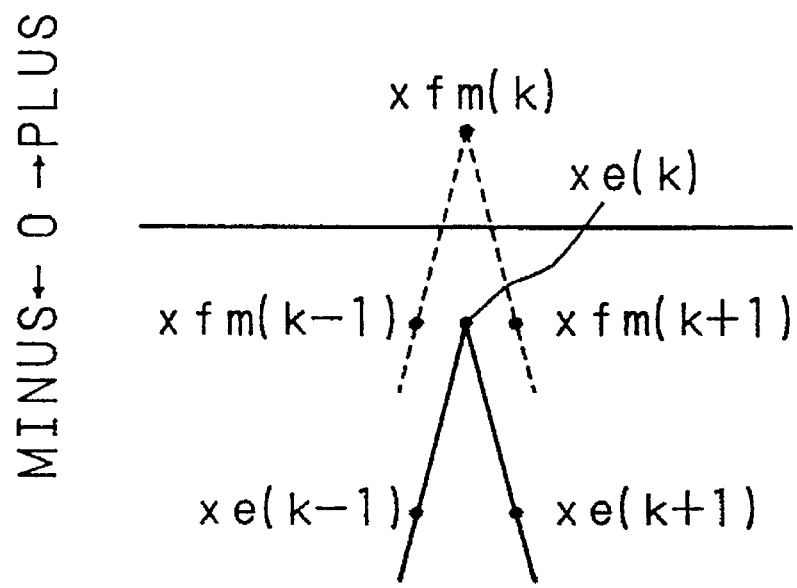
FIGS. 65A and 65B are waveform diagrams of FM signals explanatory of the operation of the invention.
Figure 65B:
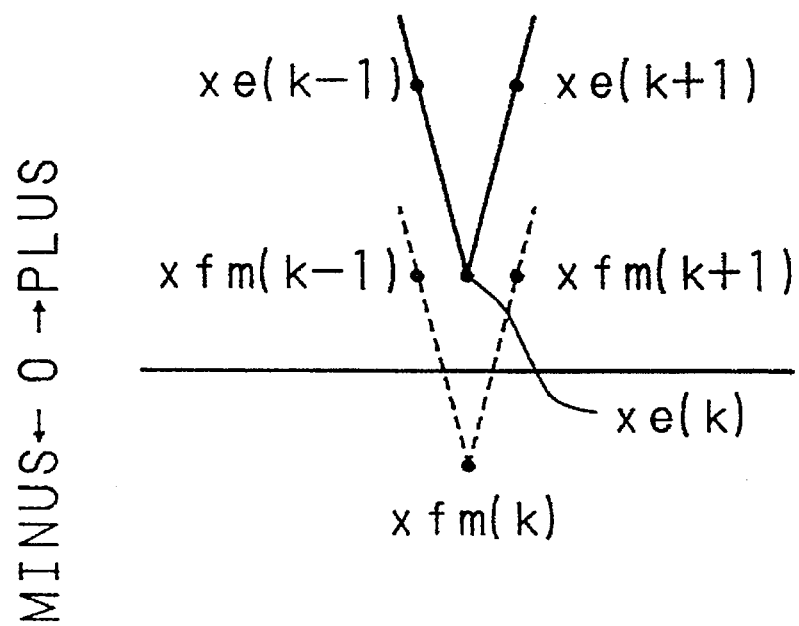
Figure 68A:
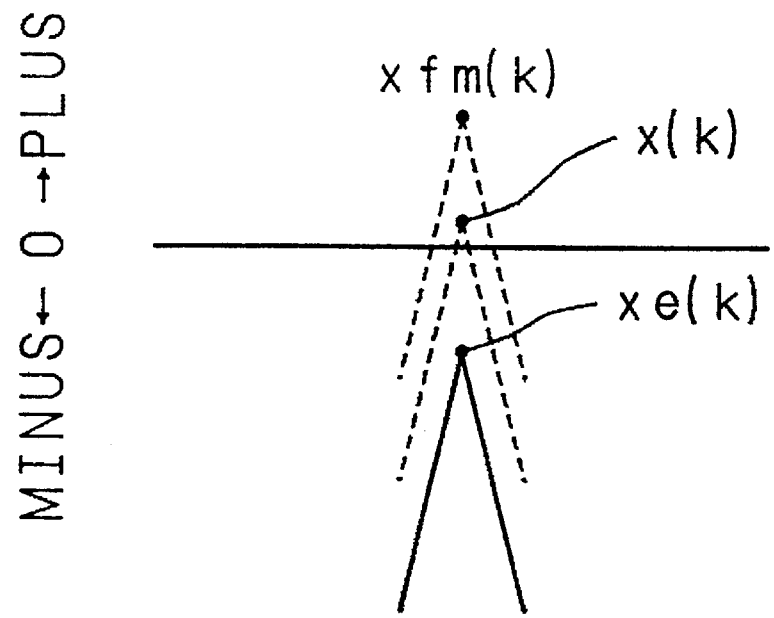
FIGS. 68A and 68B are waveform diagrams of FM signals explanatory of the operation of the invention.
Figure 68B:
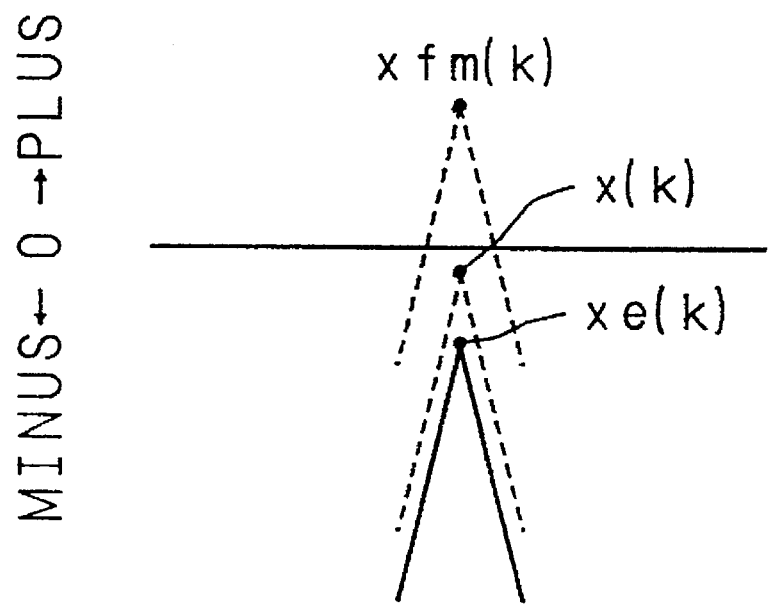

The output a of the AND gate 72 is 1 in the case of waveform as shown in FIGS. 65A, 65B namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and xfm(k) have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

Figure 66A:
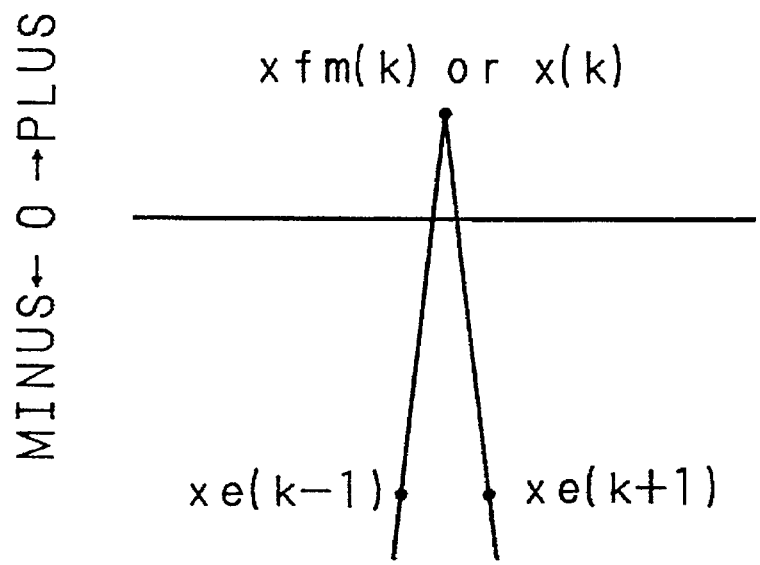
FIGS. 66A and 66B are waveform diagrams of FM signals explanatory of the operation of the invention.
Figure 66B:
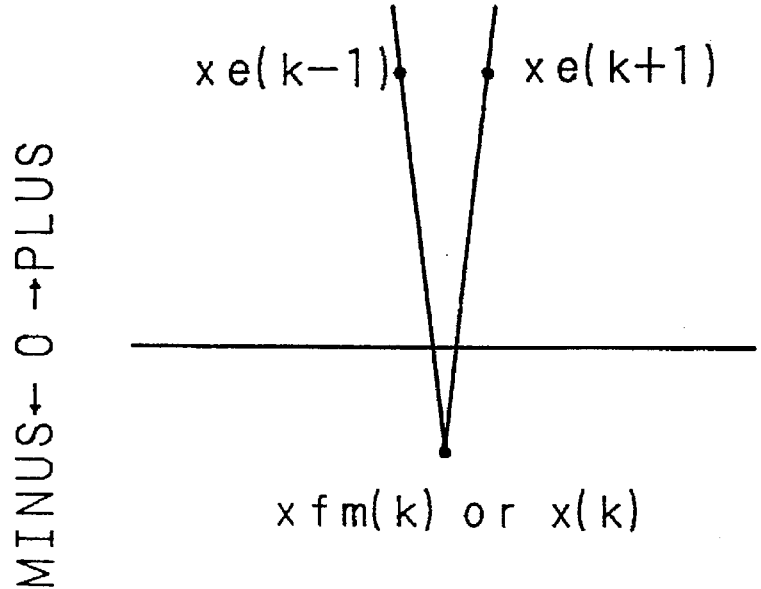

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 39

Figure 51:
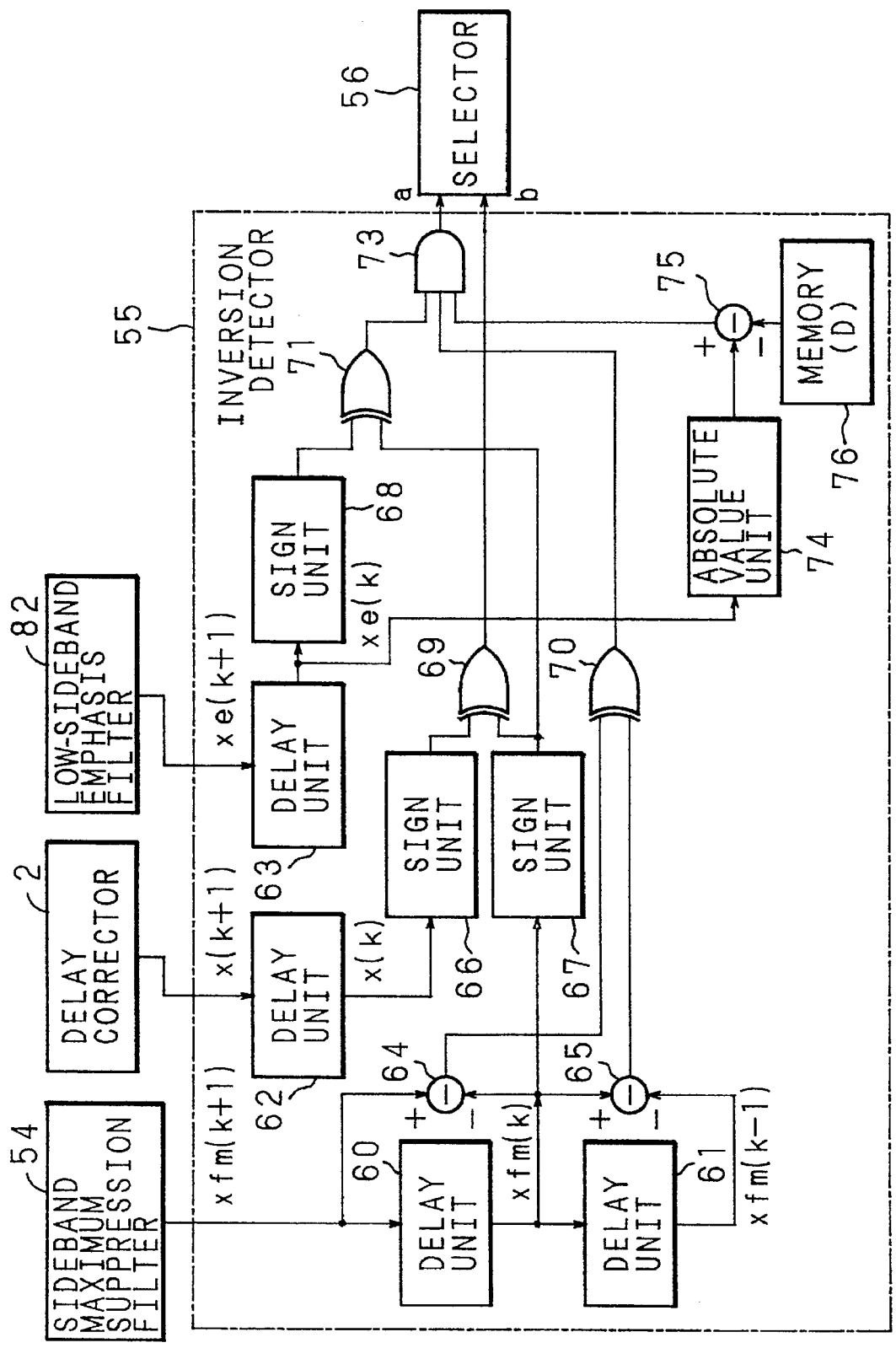
FIG. 51 is a block circuit diagram illustrative of the constitution of inversion prevention devices of the embodiments 39 of the invention.

The overall constitution of the inversion prevention device in the embodiment 39 is the same as that of the embodiment 38 (FIG. 49) and the operation is also similar to that of the embodiment 38, and therefore the description thereof will be omitted. FIG. 51 shows the block circuit diagram of the inversion detector 55 in the embodiment 39. The constitution of the inversion detector 55 of the embodiment 39 shown in FIG. 51 is identical with that of the inversion detector 55 shown in FIG. 31 (embodiment 28) except that the output signal of the delay corrector 2 is inputted to the delay unit 62 and the output signal of the low-sideband emphasis filter 82 is inputted to the delay unit 63, and therefore the description thereof will be omitted.

Now the operation will be described below. The operation of the inversion detector 55 in the embodiment 39 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 28, and the description thereof will therefore be omitted.

The output a of the AND gate 73 is 1 in the case of waveform as shown in FIG. 65A, 65B at the time k which satisfies $|x(k)|<D$, namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and xfm(k) have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 40

Figure 52:
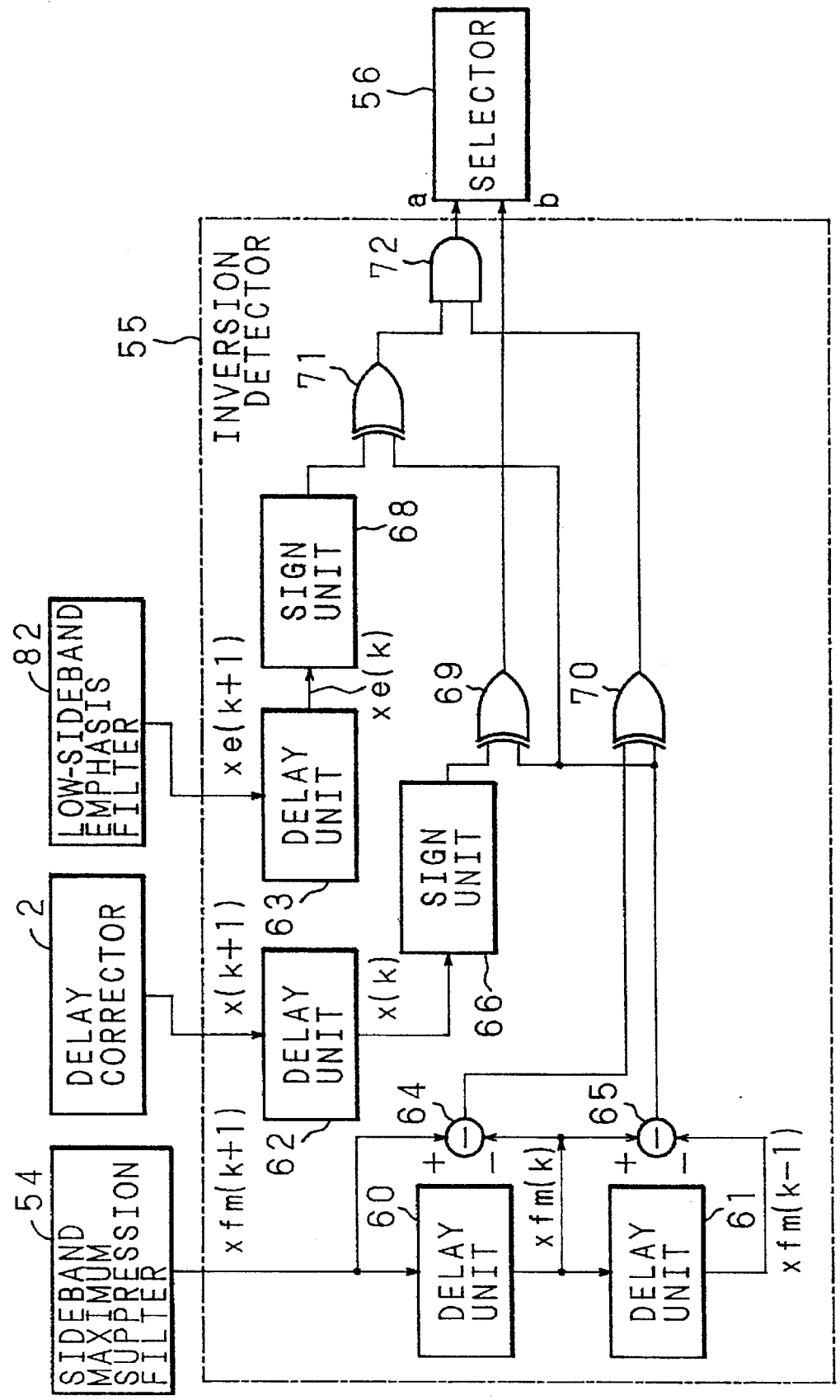
FIG. 52 is a block circuit diagram illustrative of the constitution of inversion prevention devices of the embodiments 40 of the invention.

The overall constitution of the inversion prevention device in the embodiment 40 is the same as that of the embodiment 38 (FIG. 49) and the operation is also similar to that of the embodiment 38, and therefore the description thereof will be omitted. FIG. 52 shows the block circuit diagram of the inversion detector 55 in the embodiment 40. The constitution of the inversion detector 55 of the embodiment 40 shown in FIG. 52 is identical with that of the inversion detector 55 shown in FIG. 32 (embodiment 29) except that the output signal of the delay corrector 2 is inputted to the delay unit 62 and the output signal of the low-sideband emphasis filter 82 is inputted to the delay unit 63, and therefore the description thereof will be omitted.

Now the operation will be described below. The operation of the inversion detector 55 in the embodiment 40 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 29, and the description thereof will therefore be omitted.

The output a of the AND gate 72 is 1 in the case of waveform as shown in FIG. 65A, 65B namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and {xfm(k)–xfm(k–1)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 41

Figure 53:
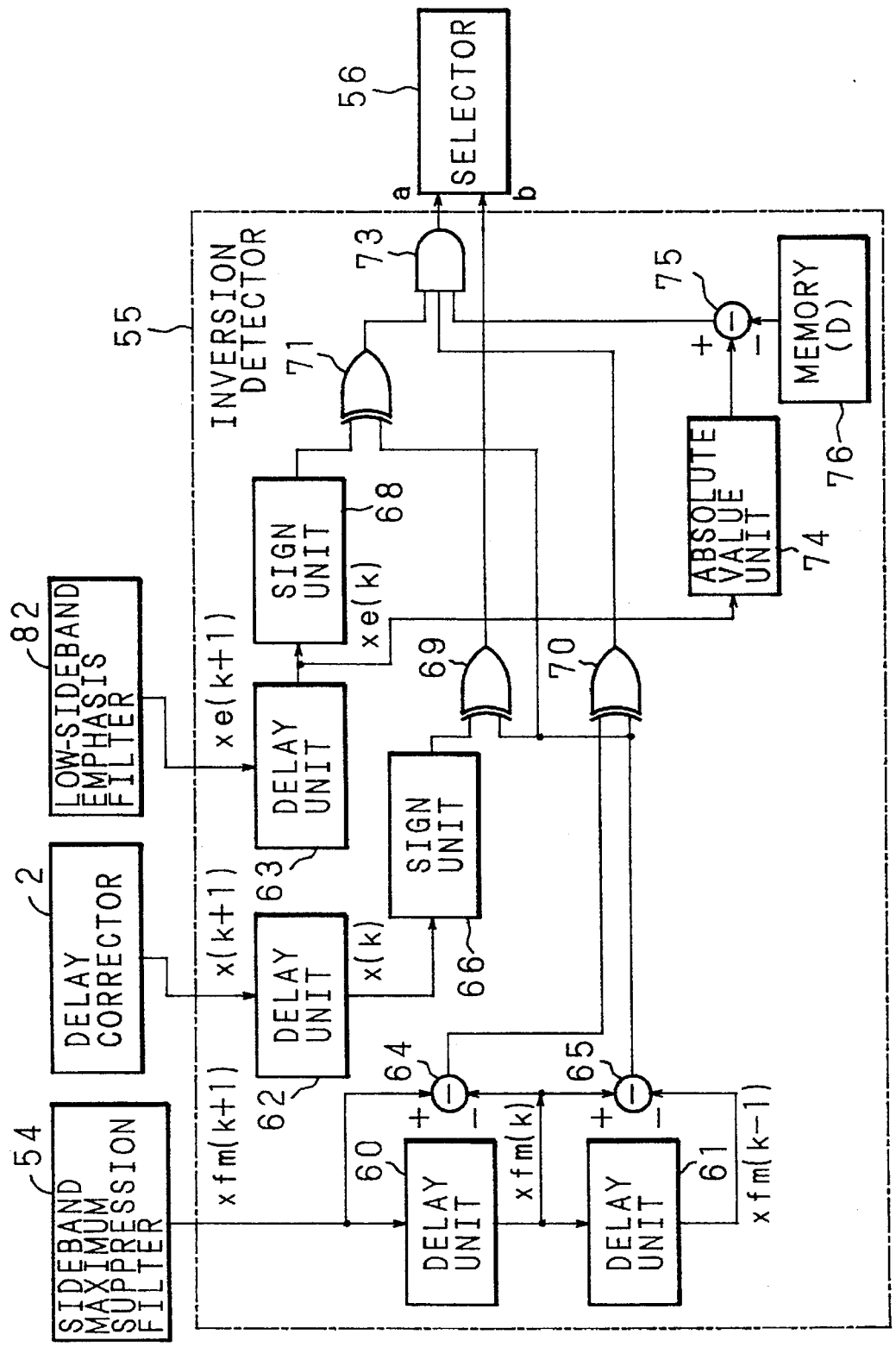
FIG. 53 is a block circuit diagram illustrative of the constitution of inversion prevention devices of the embodiments 41 of the invention.

The overall constitution of the inversion prevention device in the embodiment 41 is the same as that of the embodiment 38 (FIG. 49) and the operation is also similar to that of the embodiment 38, and therefore the description thereof will be omitted. FIG. 53 shows the block circuit diagram of the inversion detector 55 in the embodiment 41. The constitution of the inversion detector 55 of the embodiment 41 shown in FIG. 53 is identical with that of the inversion detector 55 shown in FIG. 33 (embodiment 30) except that the output signal of the delay corrector 2 is inputted to the delay unit 62 and the output signal of the low-sideband emphasis filter 82 is inputted to the delay unit 63, and therefore the description thereof will be omitted.

Now the operation will be described below. The operation of the inversion detector 55 in the embodiment 41 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 30, and the description thereof will therefore be omitted.

The output a of the AND gate 73 is 1 in the case of waveform as shown in FIG. 65A, 65B at the time k which satisfies |x(k)|<D, namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and {xfm(k)–xfm(k–1)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 42

Figure 54:
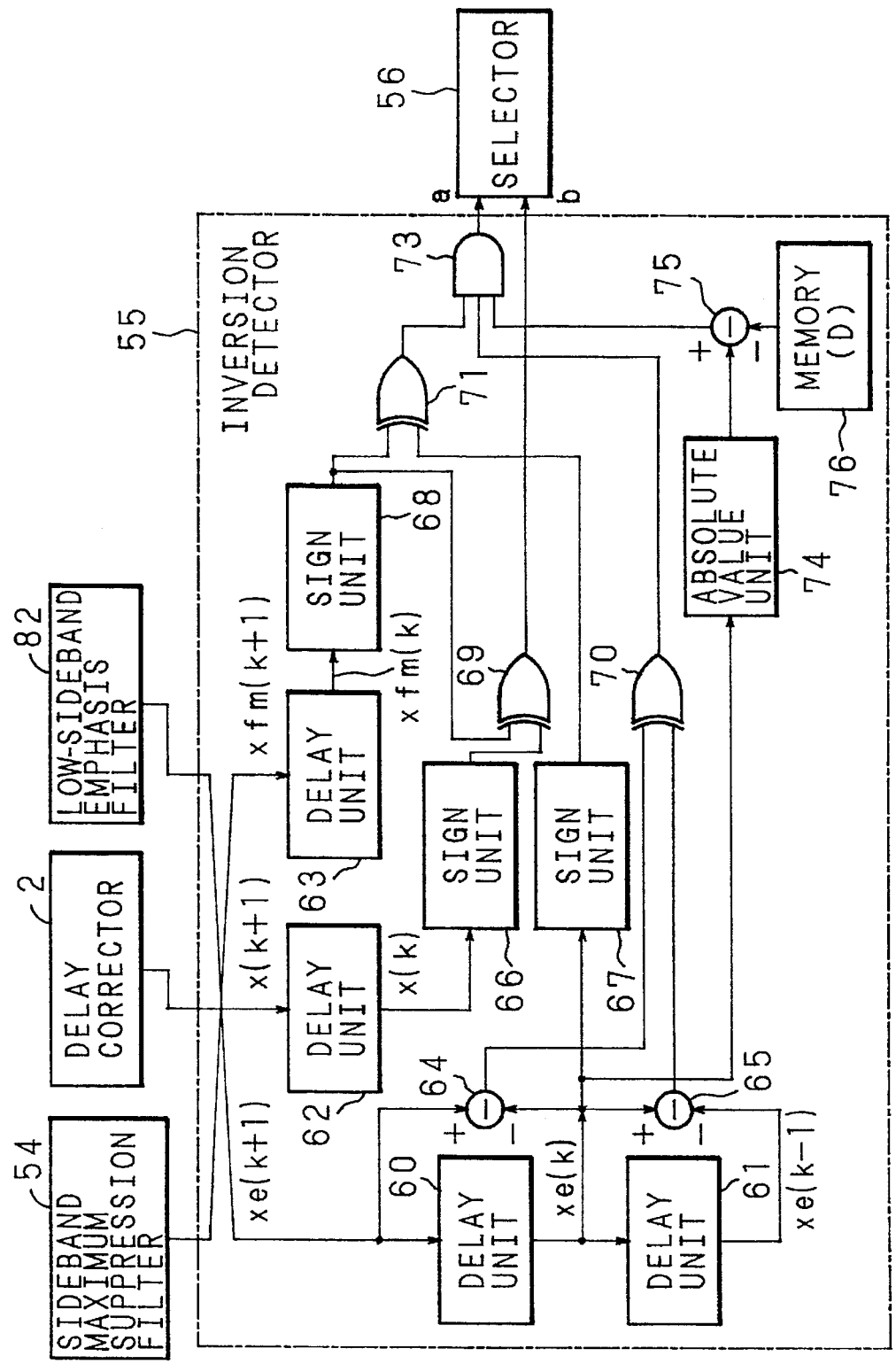
FIG. 54 is a block circuit diagram illustrative of the constitution of inversion prevention devices of the embodiments 42 of the invention.

The overall constitution of the inversion prevention device in the embodiment 42 is the same as that of the embodiment 38 (FIG. 49) and the operation is also similar to that of the embodiment 38, and therefore the description thereof will be omitted. FIG. 54 shows the block circuit diagram of the inversion detector 55 in the embodiment 42. The constitution of the inversion detector 55 of the embodiment 42 shown in FIG. 54 is identical with that of the inversion detector 55 shown in FIG. 34 (embodiment 31) except that the output signal of the delay corrector 2 is inputted to the delay unit 62 and the output signal of the low-sideband emphasis filter 82 is inputted to the delay unit 60 and the subtracter 64, and therefore the description thereof will be omitted.

Now the operation will be described below. The operation of the inversion detector 55 in the embodiment 42 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 31, and the description thereof will therefore be omitted.

Figure 67A:
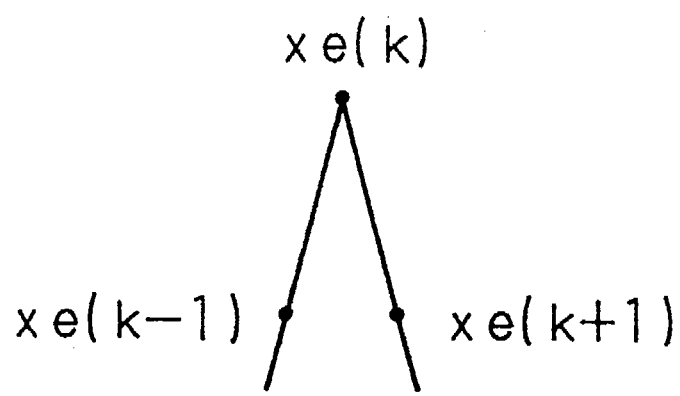
FIGS. 67A and 67B are waveform diagrams of FM signals explanatory of the operation of the invention.
Figure 67B:
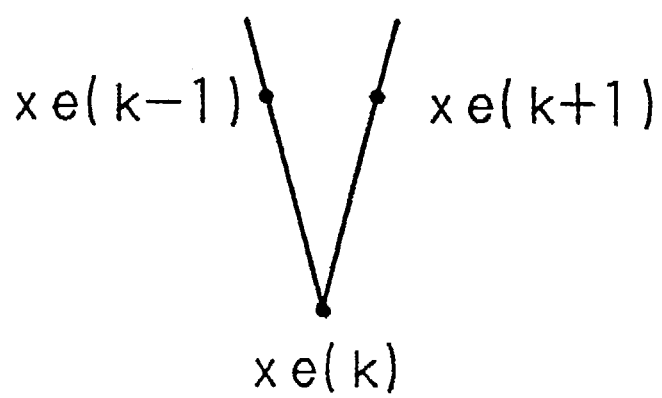

The XOR gate 70 outputs 1 when only such a waveform is detected that has a maximum or minimum value at x(k) as shown in FIG. 67A, 67B. The output a of the AND gate 73 is 1 in the case of waveform as shown in FIG. 65A, 65B at the time k which satisfies |x(k)|<D, namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and {xfm(k)–xfm(k–1)} have different signs and is 0 when they have the same sign. Thus inversion of x(k) does not occur anti a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 43

Figure 55:
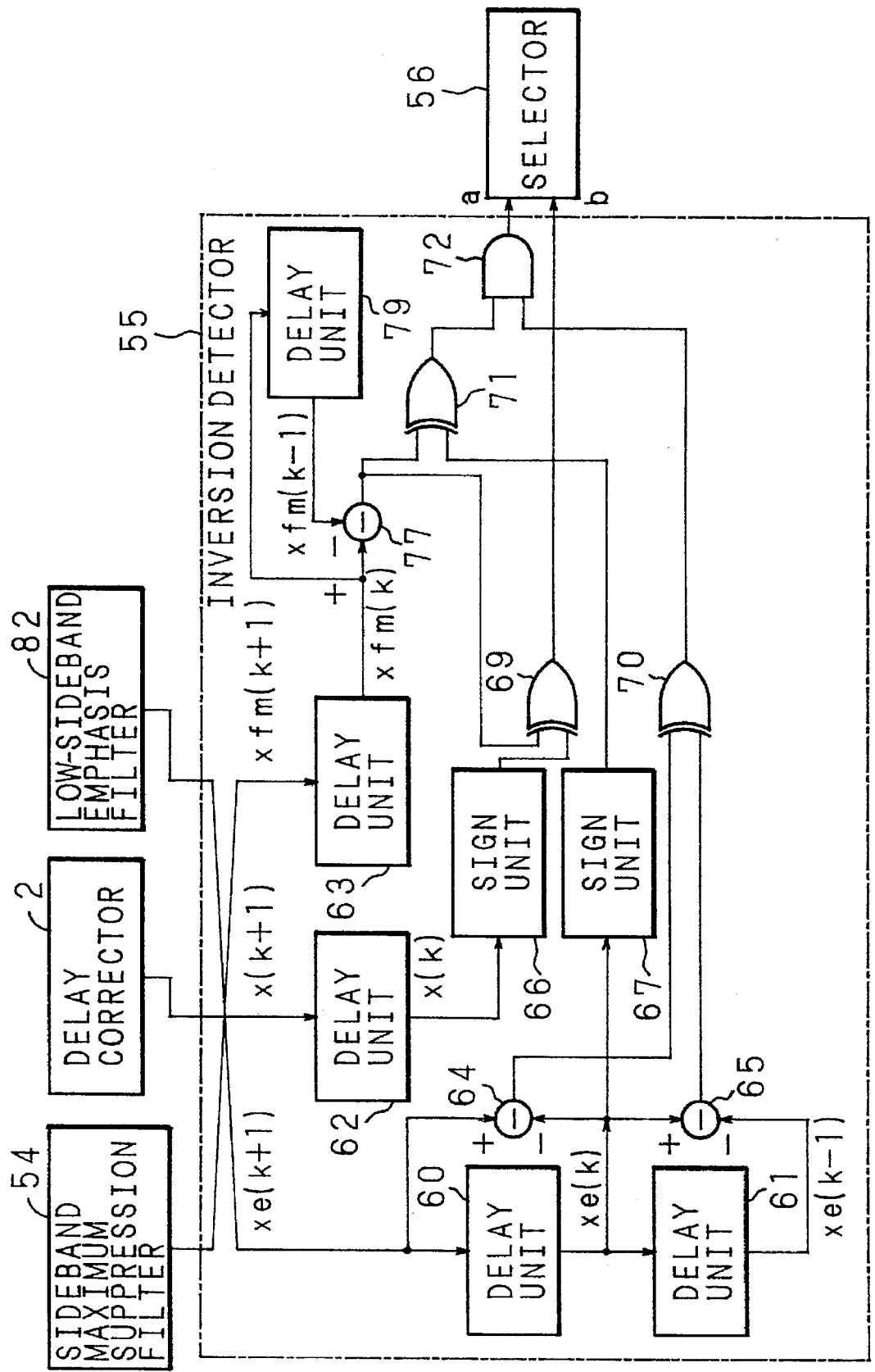
FIG. 55 is a block circuit diagram illustrative of the constitution of inversion prevention devices of the embodiments 43 of the invention.

The overall constitution of the inversion prevention device in the embodiment 43 is the same as that of the embodiment 38 (FIG. 49) and the operation is also similar to that of the embodiment 38, and therefore the description thereof will be omitted. FIG. 55 shows the block circuit diagram of the inversion detector 55 in the embodiment 43. The constitution of the inversion detector 55 of the embodiment 43 shown in FIG. 55 is identical with that of the inversion detector 55 shown in FIG. 35 (embodiment 32) except that the output signal of the delay corrector 2 is inputted to the delay unit 62 and the output signal of the low-sideband emphasis filter 82 is inputted to the delay unit 63, and therefore the description thereof will be omitted.

Now the operation will be described below. The operation of the inversion detector 55 in the embodiment 43 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 32, and the description thereof will therefore be omitted.

The output a of the AND gate 72 is 1 in the case of waveform as shown in FIG. 65A, 65B namely when an inversion has occurred at xe(k) and is 0 in other cases, and the selector 56 selects the terminal C as far as a=0. In case an inversion has occurred at xe(k) (a=1), the output b of the XOR gate 69 is 1 when x(k) and {xfm(k)–xfm(k–1)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 44

Figure 56:
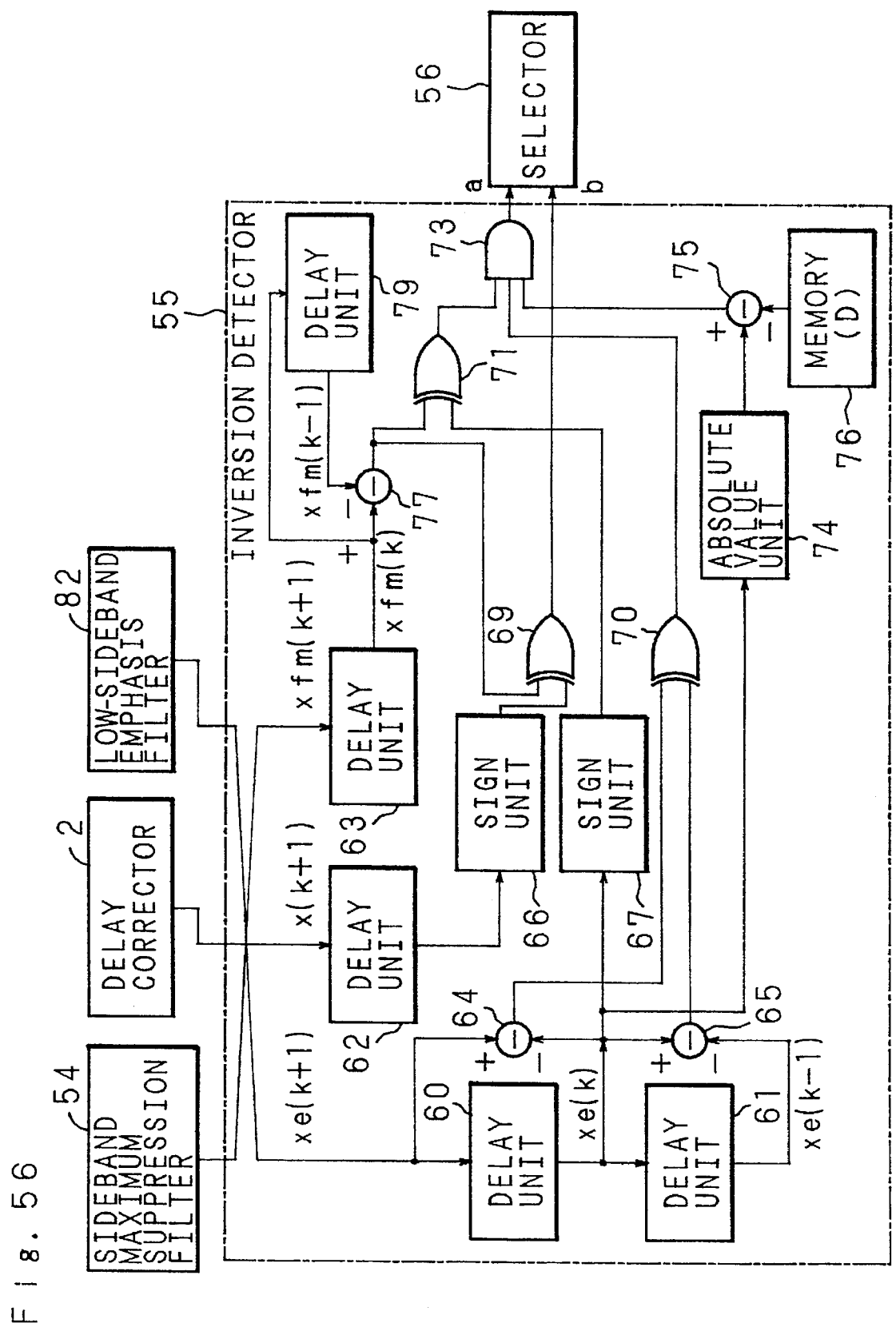
FIG. 56 is a block circuit diagram illustrative of the constitution of inversion prevention devices of the embodiments 44 of the invention.

The overall constitution of the inversion prevention device in the embodiment 44 is the same as that of the embodiment 38 (FIG. 49) and the operation is also similar to that of the embodiment 38, and the therefore description thereof will be omitted. FIG. 56 shows the block circuit diagram of the inversion detector 55 in the embodiment 44. The constitution of the inversion detector 55 of the embodiment 44 shown in FIG. 56 is identical with that of the inversion detector 55 shown in FIG. 36 (embodiment 33) except that the output signal of the delay corrector 2 is inputted to the delay unit 62 and the output signal of the low-sideband emphasis filter 82 is inputted to the delay unit 60 and the subtracter 64, and therefore the description thereof will be omitted.

Now the operation will be described below. The operation of the inversion detector 55 in the embodiment 44 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 33, and the description thereof will therefore be omitted.

The output a of the AND gate 73 is 1 in the case of waveform as shown in FIG. 65A, 65B at the time k which satisfies |x(k)|<D, namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and {xfm(k)–xfm(k–1)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

Figure 58:
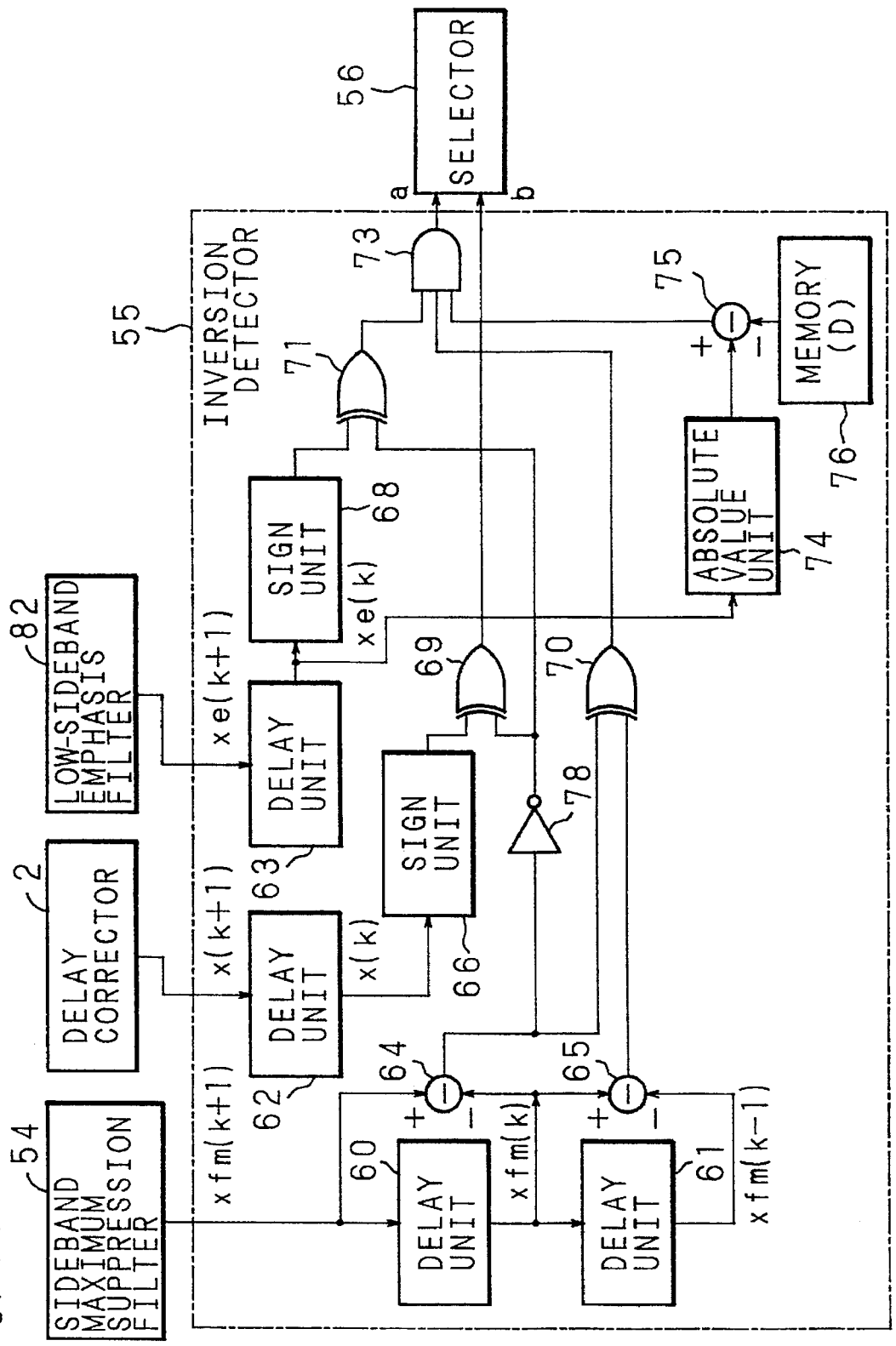
FIG. 58 is a block circuit diagram illustrative of the constitution of inversion prevention devices of the embodiments 46 of the invention.

An inversion can be detected in the above operations, and inversion can be prevented by providing the waveform shown in FIG. 66A to the output terminal 6 of FIG. 58 as the output in the case of FIG. 65A and providing the waveform shown in FIG. 66B in the case of FIG. 65B.

Embodiment 45

Figure 57:
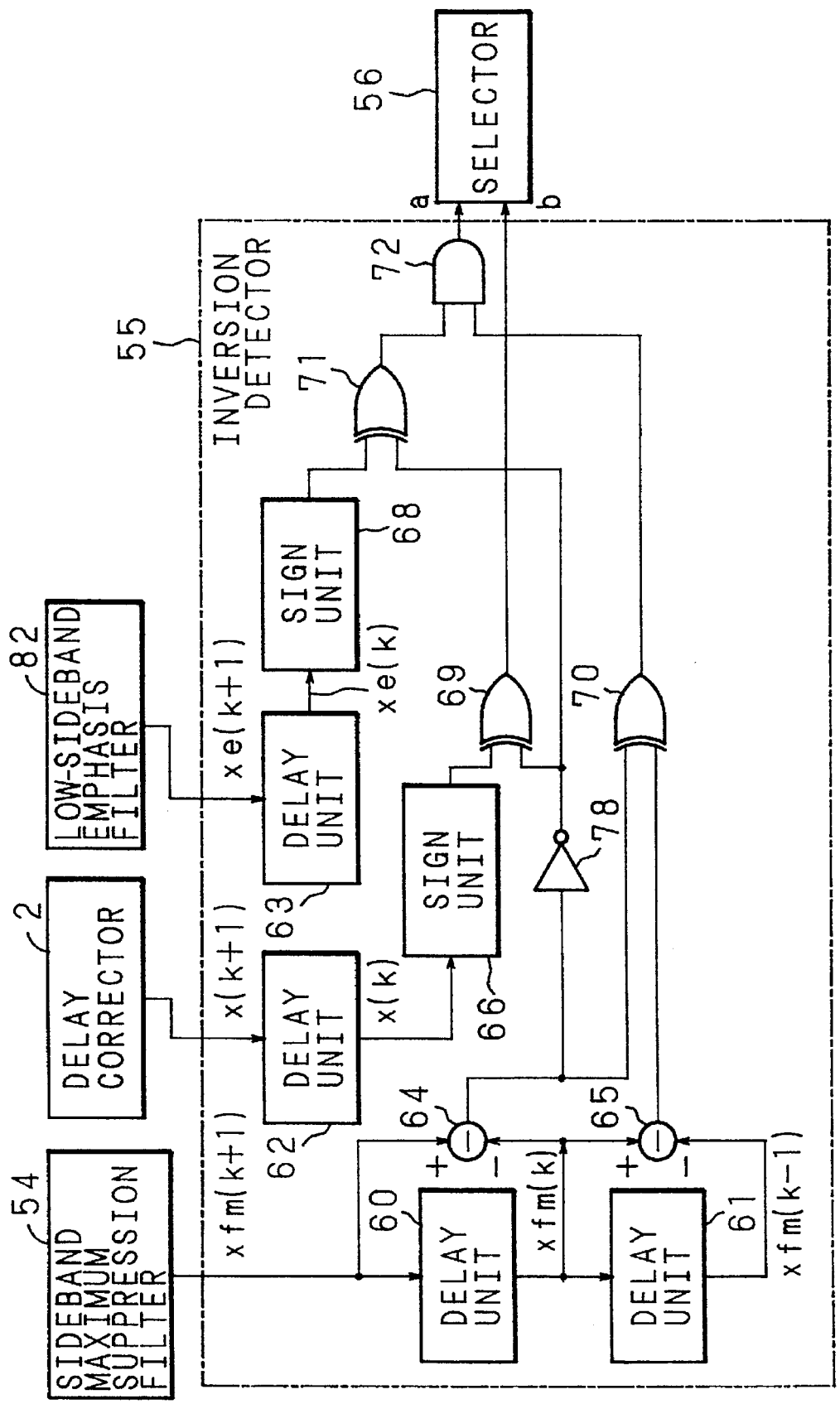
FIG. 57 is a block circuit diagram illustrative of the constitution of inversion prevention devices of the embodiments 45 of the invention.

The overall constitution of the inversion prevention device in the embodiment 45 is the same as that of the embodiment 38 (FIG. 49) and the operation is also similar to that of the embodiment 38, and therefore the description thereof will be omitted. FIG. 57 shows the block circuit diagram of the inversion detector 55 in the embodiment 45. The constitution of the inversion detector 55 of the embodiment 45 shown in FIG. 57 is identical with that of the inversion detector 55 shown in FIG. 37 (embodiment 34) except that the output signal of the delay corrector 2 is inputted to the delay unit 62 and the output signal of the low-sideband emphasis filter 82 is inputted to the delay unit 63, and therefore the description thereof will be omitted.

Now the operation will be described below. The operation of the inversion detector 55 in the embodiment 45 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 34, and the description thereof will therefore be omitted.

The output a of the AND gate 73 is 1 in the case of waveform as shown in FIG. 65A, 65B namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and inverted {xfm(k+1)–xfm (k1)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 46

The overall constitution of the inversion prevention device in the embodiment 46 is the same as that of the embodiment 38 (FIG. 49) and the operation is also similar to that of the embodiment 38, and therefore the description thereof will be omitted. FIG. 58 shows the block circuit diagram of the inversion detector 55 in the embodiment 46. The constitution of the inversion detector 56 of the embodiment 46 shown in FIG. 58 is identical with that of the inversion detector 55 shown in FIG. 38 (embodiment 35) except that the output signal of the delay corrector 2 is inputted to the delay unit 62 and the output signal of the low-sideband emphasis filter 82 is inputted to the delay unit 63, and therefore the description thereof will be omitted.

Now the operation will be described below. The operation of the inversion detector 55 in the embodiment 46 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 35, and the description thereof will therefore be omitted.

The output a of the AND gate 73 is 1 in the case of waveform as shown in FIG. 65A, 65B at the time k which satisfies |x(k)|<D, namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and inverted {xfm(k+1)−xfm(k)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 47

Figure 59:
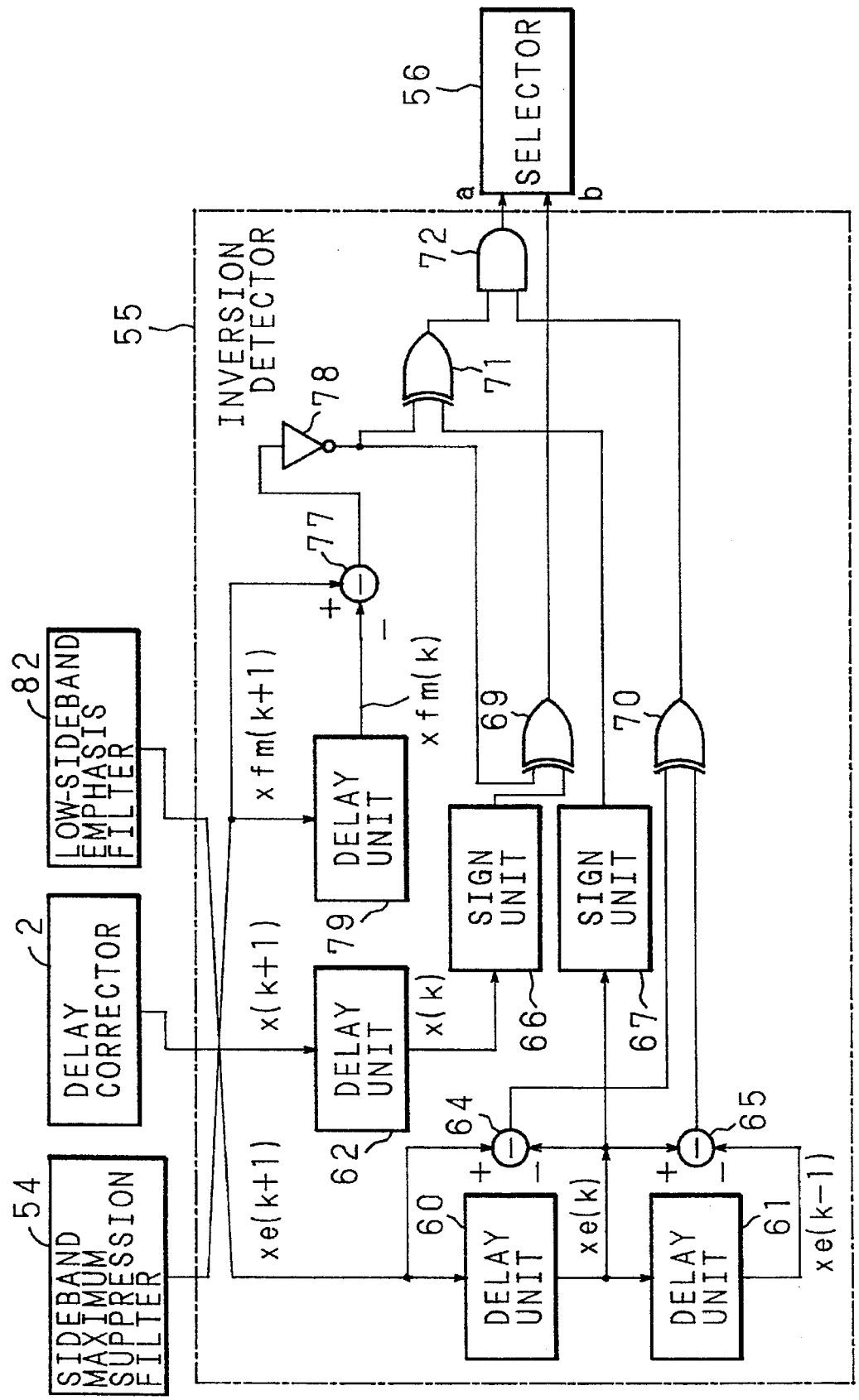
FIG. 59 is a block circuit diagram illustrative of the constitution of inversion prevention devices of the embodiments 47 of the invention.

The overall constitution of the inversion prevention device in the embodiment 47 is the same as that of the embodiment 38 (FIG. 49) and the operation is also similar to that of the embodiment 38, and therefore the description thereof will be omitted. FIG. 59 shows the block circuit diagram of the inversion detector 55 in the embodiment 47. The constitution of the inversion detector 55 of the embodiment 47 shown in FIG. 59 is identical with that of the inversion detector 55 shown in FIG. 39 (embodiment 36) except that the output signal of the delay corrector 2 is inputted to the delay unit 62 and the output signal of the low-sideband emphasis filter 82 is inputted to the delay unit 60 and the subtracter 64, and therefore the description thereof will be omitted.

Now the operation will be described below. The operation of the inversion detector 55 in the embodiment 47 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 36, and the description thereof will therefore be omitted.

The output a of the AND gate 72 is 1 in the case of waveform as shown in FIG. 65A, 65B namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and inverted {xfm(k+1)−xfm(k1)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

Embodiment 48

Figure 60:
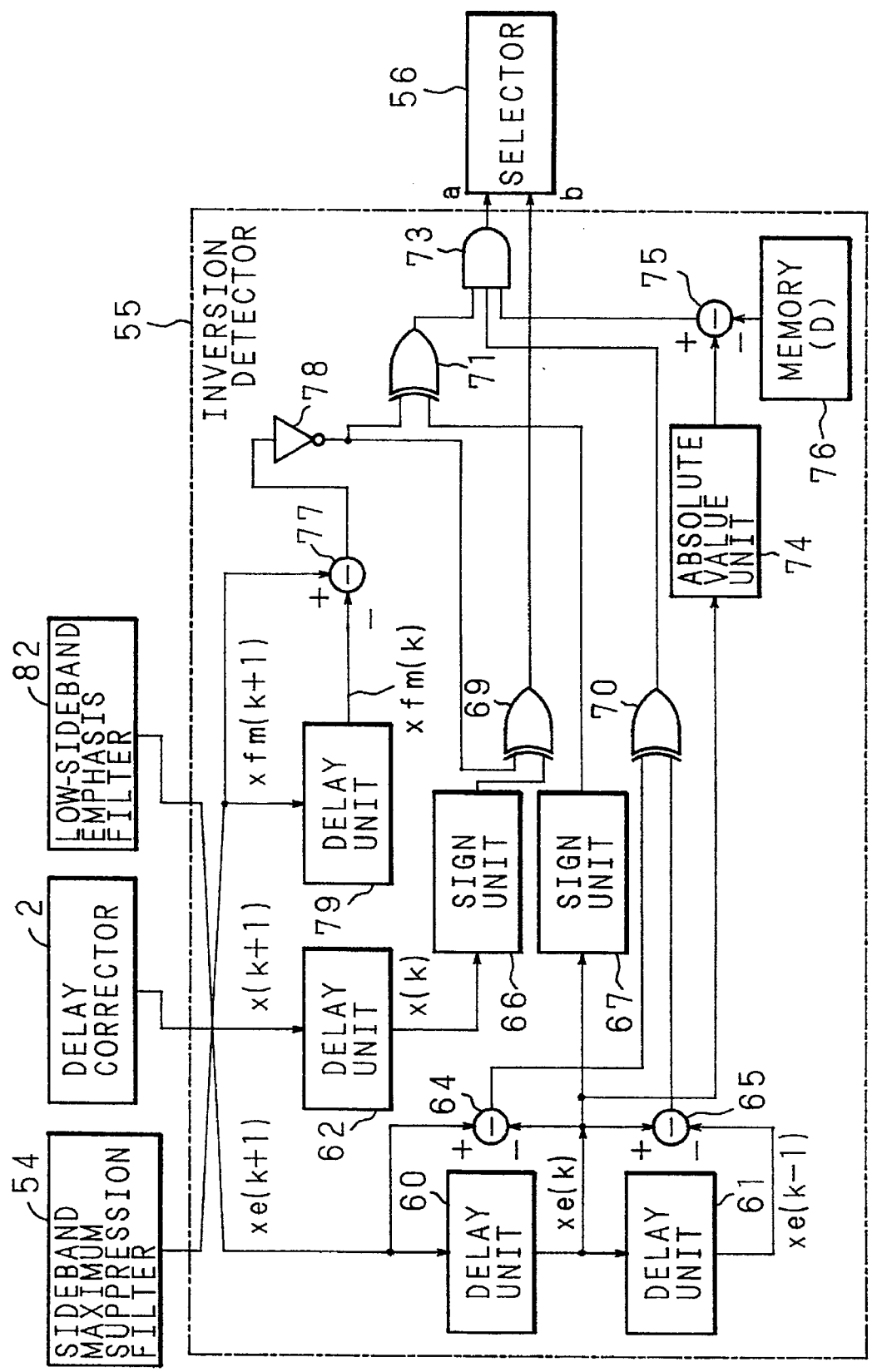
FIG. 60 is a block circuit diagram illustrative of the constitution of inversion prevention devices of the embodiments 48 of the invention.

The overall constitution of the inversion prevention device in the embodiment 48 is the same as that of the embodiment 38 (FIG. 49) and the operation is also similar to that of the embodiment 38, and therefore the description thereof will be omitted. FIG. 60 shows the block circuit diagram of the inversion detector 55 in the embodiment 48. The constitution of the inversion detector 55 of the embodiment 48 shown in FIG. 60 is identical with that of the inversion detector 55 shown in FIG. 40 (embodiment 37) except that the output signal of the delay corrector 2 is inputted to the delay unit 62 and the output signal of the low-sideband emphasis filter 82 is inputted to the delay unit 60 and the subtracter 64, and therefore the description thereof will be omitted.

Now the operation will be described below. The operation of the inversion detector 55 in the embodiment 48 is such that the output x(k+1) of the delay corrector 2 is replaced by the output xe(k+1) of the low-sideband emphasis filter 82, and the output xf(k+1) of the sideband suppression filter 3 is replaced by the output x(k+1) of the delay corrector 2 in the operation of the inversion detector 55 in the embodiment 37, and the description thereof will therefore be omitted.

The output a of the AND gate 73 is 1 in the case of waveform as shown in FIG. 65A, 65B at the time k which satisfies |x(k)|<D, namely when an inversion has occurred at xe(k), and is 0 in other cases, and the selector 56 selects the terminal C as far as a=0. In case an inversion has occurred at xe(k) (a=1), the output b of the XOR gate 69 is 1 when x(k) and inverted {xfm(k+1)−xfm(k)} have different signs and is 0 when they have the same sign. Thus the inversion of x(k) does not occur and a=1 and b=0 so that the selector 56 selects the terminal B in the case of FIG. 68A, and an inversion does not occur only for the output xfm(k) of the sideband maximum suppression filter 54 and a=1 and b=1 so that the selector 56 selects the terminal A in the case of FIG. 68B.

An inversion can be detected in the above operations, and an inversion can be prevented by providing the waveform shown in FIG. 66A to the output terminal 6 of FIG. 49 as the output in the case of FIG. 65A and providing the waveform shown in FIG. 66B in the case of FIG. 65B.

In the embodiments 42, 43, 44, 47, 48, such waveform that has a maximum point and a minimum point at xe(k) is detected, but a similar effect can be obtained also by detecting such waveform that has a maximum point and a minimum point at x(k) instead of xe(k).

Although a simple constitution having a single low-sideband emphasis filter is described in each of the embodiments 38 through 48, a similarly satisfactory effect can be obtained also by using a plurality of low-sideband emphasis filters having different emphasizing ratios. Further, a simple constitution having a single sideband maximum suppression filter as the sideband suppression filter is described in each of the embodiments 38 through 48, a similarly satisfactory effect can be obtained also by using a plurality of sideband suppression filters having different suppression ratios.

Although detection is made by checking whether |x(k)|<D or |xe(k)|<D or not in the embodiments 2, 4, 5, 7, 9, 11, 13, 15, 17, 18, 20, 22, 24, 26, 28, 30, 31, 33, 35, 37, 39, 41, 42, 44, 46, 48, a satisfactory result can be obtained by setting D to a value within a half of the amplitude of the FM wave in advance.

Although detection is made by checking whether |x(k)|<D or not in the embodiments 2, 4, 5, 7, 9, 11, 13, 15, 17, 18, 20, 22, 24, 26, a similar effect can be obtained also by using the condition |xf(k)|<E instead of |x(k)|<D. Also detection is made by checking whether |x(k)|<D or not in the embodiments 28, 30, 31, 33, 35, 37, a similar effect can be obtained by using the condition |xf(k)|<E or |xfm(k)|<E instead of |x(k)|<D. Further, detection is made by checking whether |xe(k)|<D or not in the embodiments 39, 41, 42, 44, 46, 48, a similar effect can be obtained by using the condition |x(k)|<E or |xfm(k)|<E instead of |xe(k)|<D. However, a satisfactory result can be obtained by setting D to a value within a half of the amplitude of the FM wave in advance.

In the embodiments 1 through 24, a similar effect can be obtained also by inserting a filter having the same amount of delay as that of the sideband suppression filter 3 with consideration to the characteristics of the transmission system, instead of the delay corrector 2. A similar effect can also be obtained in the embodiments 27 through 37, by inserting a filter having the same amount of delay as that of the sideband suppression filter 3 and the sideband maximum suppression filter 54 with consideration to the characteristics of the transmission system, instead of the delay corrector 2. Further, a similar effect can also be obtained in the embodiments 38 through 48, by inserting a filter having the same amount of delay as that of the low-sideband emphasis filter 82 and the sideband maximum suppression filter 54 with consideration to the characteristics of the transmission system, instead of the delay corrector 2.

It is a matter of course that a similar effect can be obtained by connecting any type of FM demodulator such as TAN type or pulse count type to the latter stage of the output terminal 6, provided that the inversion prevention device of the embodiments 1 through 48 is used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An inversion prevention device to prevent an inversion in an FM signal, comprising:
    a sideband suppression filter which receives a quantized digital FM signal as an input and suppresses either both upper and lower sidebands or said lower sideband of said digital FM signal;
    inversion detecting means for detecting an inversion of said digital FM signal; and
    selecting means for selecting either said digital FM signal or an output signal of said sideband suppression filter, on the basis of output from said inversion detecting means.

2. An inversion prevention device as claimed in claim 1, wherein
    said inversion detecting means includes:
        detecting means for detecting a maximum point and a minimum point of said output signal of said sideband suppression filter; and
        judging means for judging whether said digital FM signal and said output signal of said sideband suppression filter have the same sign with reference to an alternate zero level.

3. An inversion prevention device as claimed in claim 1, wherein
    said inversion detecting means includes:
        first detecting means for detecting that said digital FM signal is within a predetermined range;
        second detecting means for detecting a maximum point and a minimum point of said output signal of said sideband suppression filter; and
        judging means for judging whether said digital FM signal and said output signal of said sideband suppression filter have the same sign with reference to an alternate zero level.

4. An inversion prevention device as claimed in claim 1, wherein
    said inversion detecting means includes:
        detecting means for detecting a maximum point and a minimum point of said output signal of said sideband suppression filter; and
        judging means for judging a sign of a result of subtraction between said output signal of said sideband suppression filter and an earlier output signal of said sideband suppression filter, and a sign of a result of multiplication of said result of substraction and said digital FM signal.

5. An inversion prevention device as claimed in claim 1, wherein
    said inversion detecting means includes:
        first detecting means for detecting that said digital FM signal is within a predetermined range;
        second detecting means for detecting a maximum point and a minimum point of said output signal of said sideband suppression filter; and
        judging means for judging a sign of a result of substraction between said output signal of said sideband suppression filter and an earlier output signal of said sideband suppression filter, and a sign of a result of multiplication of said result of substraction and said digital FM signal.

6. An inversion prevention device as claimed in claim 1, wherein
    said inversion detecting means includes:
        first detecting means for detecting that said digital FM signal is within a predetermined range;
        second detecting means for detecting a maximum point and a minimum point of said digital FM signal; and
        judging means for judging whether said digital FM signal and said output signal of said sideband suppression filter have the same sign with reference to an alternate zero level.

7. An inversion prevention device as claimed in claim 1, wherein
    said inversion detecting means includes:
        detecting means for detecting a maximum point and a minimum point of said digital FM signal; and
        judging means for judging a sign of a result of subtraction between said output signal of said sideband suppression filter and an earlier output signal of said sideband suppression filter, and a sign of a result of multiplication of said result of subtraction and said digital FM signal.

8. An inversion prevention device as claimed in claim 1, wherein
    said inversion detecting means includes:
        first detecting means for detecting that said digital FM signal is within a predetermined range;
        second detecting means for detecting a maximum point and a minimum point of said digital FM signal; and
        judging means for judging a sign of a result of subtraction between said output signal of said sideband suppression filter and an earlier output signal of said sideband suppression filter, and a sign of a result of multiplication of said result of subtraction and said digital FM signal.

9. An inversion prevention device as claimed in claim 1, wherein said inversion detecting means includes:
  detecting means for detecting a maximum point and a minimum point of said output signal of said sideband suppression filter; and
  judging means for judging a sign of a result of subtraction between said output signal of said sideband suppression filter and a later output signal of said sideband suppression filter, and a sign of a result of multiplication of said result of subtraction and said digital FM signal.

10. An inversion prevention device as claimed in claim 1, wherein
said inversion detecting means includes:
  first detecting means for detecting that said digital FM signal is within a predetermined range;
  second detecting means for detecting a maximum point and a minimum point of said output signal of said sideband suppression filter; and
  judging means for judging a sign of a result of subtraction between said output signal of said sideband suppression filter and a later output signal of said sideband suppression filter, and a sign of a result of multiplication of said result of subtraction and said digital FM signal.

11. An inversion prevention device as claimed in claim 1, wherein
said inversion detecting means includes:
  detecting means for detecting a maximum point and a minimum point of said digital FM signal; and
  judging means for judging a sign of a result of subtraction between said output signal of said sideband suppression filter and a later output signal of said sideband suppression filter, and a sign of a result of multiplication of said result of subtraction and said digital FM signal.

12. An inversion prevention device as claimed in claim 1, wherein
said inversion detecting means includes:
  first detecting means for detecting that said digital FM signal is within a predetermined range;
  second detecting means for detecting a maximum point and a minimum point of said digital FM signal; and
  judging means for judging a sign of a result of subtraction between said output signal of said sideband suppression filter and a later output signal of said sideband suppression filter, and a sign of a result of multiplication of said result of substraction and said digital FM signal.

13. An inversion prevention device as claimed in claim 1, wherein
said inversion detecting means includes:
  judging means for judging a sign of said digital FM signal, a sign of a result of subtraction between said digital FM signal and an earlier digital FM signal, and a sign of a result of subtraction between said digital FM signal and a later digital FM signal.

14. An inversion prevention device as claimed in claim 1, wherein
said inversion detecting means includes:
  detecting means for detecting that said digital FM signal is within a predetermined range; and
  judging means for judging a sign of said digital FM signal, a sign of a result of subtraction between said digital FM signal and an earlier digital FM signal, and a sign of a result of subtraction between said digital FM signal and a later digital FM signal.

15. An inversion prevention device to prevent an inversion in an FM signal comprising:
  a sideband suppression filter which receives a quantized digital FM signal as an input and suppresses either both upper and lower sidebands or said lower sideband of said digital FM signal;
  inversion detecting means for detecting an inversion of said digital FM signal; and
  selecting means for selecting either said digital FM signal or a specified preset value on the basis of output from said inversion detecting means.

16. An inversion prevention device as claimed in claim 15, wherein
said inversion detecting means includes:
  detecting means for detecting a maximum point and a minimum point of an output signal of said sideband suppression filter; and
  judging means for judging whether said digital FM signal and said output signal of said sideband suppression filter have the same sign with reference to an alternate zero level.

17. An inversion prevention device as claimed in claim 15, wherein
said inversion detecting means includes:
  first detecting means for detecting that said digital FM signal is within a predetermined range;
  second detecting means for detecting a maximum point and a minimum point of an output signal of said sideband suppression filter; and
  judging means for judging whether said digital FM signal and said output signal of said sideband suppression filter have the same sign with reference to an alternate zero level.

18. An inversion prevention device as claimed in claim 15, wherein
said inversion detecting means includes:
  detecting means for detecting a maximum point and a minimum point of an output signal of said sideband suppression filter; and
  judging means for judging a sign of a result of subtraction between said output signal of said sideband suppression filter and an earlier output signal of said sideband suppression filter, and a sign of a result of multiplication of said result of subtraction and said digital FM signal.

19. An inversion prevention device as claimed in claim 15, wherein
said inversion detecting means includes:
  first detecting means for detecting that said digital FM signal is within a predetermined range;
  second detecting means for detecting a maximum point and a minimum point of an output signal of said sideband suppression filter; and
  judging means for judging a sign of a result of subtraction between said output signal of said sideband suppression filter and an earlier output signal of said sideband suppression filter, and a sign of a result of multiplication of said result of subtraction and said digital FM signal.

20. An inversion prevention device as claimed in claim 15, wherein
said inversion detecting means includes:
  first detecting means for detecting that said digital FM signal is within a predetermined range;
  second detecting means for detecting a maximum point and a minimum point of said digital FM signal; and judging means for judging whether said digital FM signal and an output signal of said sideband suppression filter have the same sign with reference to an alternate zero level.

21. An inversion prevention device as claimed in claim 15, wherein said inversion detecting means includes:
detecting means for detecting a maximum point and a minimum point of said digital FM signal; and
judging means for judging a sign of a result of subtraction between an output signal of said sideband suppression filter and an earlier output signal of said sideband suppression filter, and a sign of a result of multiplication of said result of subtraction and said digital FM signal.

22. An inversion prevention device as claimed in claim 15, wherein said inversion detecting means includes:
first detecting means for detecting that said digital FM signal is within a predetermined range;
second detecting means for detecting a maximum point and a minimum point of said digital FM signal; and
judging means for judging a sign of a result of subtraction between an output signal of said sideband suppression filter and an earlier output signal of said sideband suppression filter, and a sign of a result of multiplication of said result of subtraction and said digital FM signal.

23. An inversion prevention device as claimed in claim 15, wherein said inversion detecting means includes:
detecting means for detecting a maximum point and a minimum point of an output signal of said sideband suppression filter; and
judging means for judging a sign of a result of subtraction between said output signal of said sideband suppression filter and a later output signal of said sideband suppression filter, and a sign of a result of multiplication of said result of subtraction and said digital FM signal.

24. An inversion prevention device as claimed in claim 15, wherein said inversion detecting means includes:
first detecting means for detecting that said digital FM signal is within a predetermined range;
second detecting means for detecting a maximum point and a minimum point of an output signal of said sideband suppression filter; and
judging means for judging a sign of a result of subtraction between said output signal of said sideband suppression filter and a later output signal of said sideband suppression filter, and a sign of a result of multiplication of said result of subtraction and said digital FM signal.

25. An inversion prevention device as claimed in claim 15, wherein said inversion detecting means includes:
detecting means for detecting a maximum point and a minimum point of said digital FM signal; and
judging means for judging a sign of a result of subtraction between an output signal of said sideband suppression filter and a later output signal of said sideband suppression filter, and a sign of a result of multiplication of said result of subtraction and said digital FM signal.

26. An inversion prevention device as claimed in claim 15, wherein said inversion detecting means includes:
first detecting means for detecting that said digital FM signal is within a predetermined range;
second detecting means for detecting a maximum point and a minimum point of said digital FM signal; and
judging means for judging a sign of a result of subtraction between an output signal of said sideband suppression filter and a later output signal of said sideband suppression filter, and a sign of a result of multiplication of said result of subtraction and said digital FM signal.

27. An inversion prevention device to prevent an inversion in an FM signal, comprising:

inversion detecting means for receiving a quantized digital FM signal as an input and for detecting an inversion of said digital FM signal, said inversion detecting means including a judging unit to judge a sign of a subtraction between said digital FM signal and an earlier digital FM signal, and a sign of a result of subtraction between said digital FM signal and a later digital FM signal; and
selecting means for selecting either said digital FM signal or a specified preset value on the basis of output from said inversion detecting means.

28. An inversion prevention device to prevent an inversion in an FM signal, comprising:

inversion detecting means for receiving a quantized digital FM signal as an input and for detecting inversion of said digital FM signal said inversion detecting means including a detecting unit to detect that said digital FM signal is within a predetermined range, and a judging unit for judging a sign of said digital FM signal, a sign of a result of subtraction between said digital FM signal and an earlier digital FM signal, and a sign of a result of subtraction between said digital FM signal and a later digital FM signal; and
selecting means for selecting either said digital FM signal or a specified preset value on the basis of output from said inversion detecting means.

29. An inversion prevention device to prevent an inversion in an FM signal, comprising:

at least two sideband suppression filters having different suppression ratios which receive a quantized digital FM signal as an input and suppress either both upper and the lower sidebands or said lower sideband of said digital FM signal;
inversion detecting means for detecting inversion of said digital FM signal; and
selecting means for selecting either said digital FM signal or an output signal of one of said sideband suppression filters on the basis of output from the inversion detecting means.

30. An inversion prevention device as claimed in claim 29, wherein said inversion detecting means includes:
detecting means for detecting a maximum point and a minimum point of an output signal from one of said sideband suppression filters;
first judging means for judging whether said digital FM signal and an output signal of a sideband maximum suppression filter, which has a highest suppression ratio among said sideband suppression filters, have the same sign; and
second judging means for judging whether an output signal of one of said sideband suppression filters other than said sideband maximum suppression filter and said output signal of said sideband maximum suppression filter have the same sign.

31. An inversion prevention device as claimed in claim 29, wherein
said inversion detecting means includes:
first detecting means for detecting that said digital FM signal is within a predetermined range;
second detecting means for detecting a maximum point and a minimum point of an output signal from one of said sideband suppression filters;
first judging means for judging whether said digital FM signal and an output signal of a sideband maximum suppression filter, which has a highest suppression ratio among said sideband suppression filters, have the same sign; and
second judging means for judging whether an output signal of one of said sideband suppression filters other than said sideband maximum suppression filter and said output signal of said sideband maximum suppression filter have the same sign.

32. An inversion prevention device as claimed in claim 29, wherein
said inversion detecting means includes:
detecting means for detecting a maximum point and a minimum point of an output signal from one of said sideband suppression filters;
first judging means for judging a sign of a result of subtraction between an output signal of a sideband maximum suppression filter, which has a highest suppression ratio among said sideband suppression filters, and an earlier output signal of said sideband maximum suppression filter, and a sign of a result of multiplication of said result of subtraction and said digital FM signal; and
second judging means for judging a sign of a result of multiplication of said result of subtraction and output signal of one of said sideband suppression filters other than said sideband maximum suppression filter.

33. An inversion prevention device as claimed in claim 29, wherein
said inversion detecting means includes:
first detecting means for detecting that said digital FM signal is within a predetermined range;
second detecting means for detecting a maximum point and a minimum point of an output signal from one of said sideband suppression filters;
first judging means for judging a sign of a result of subtraction between an output signal of a sideband maximum suppression filter, which has a highest suppression ratio among said sideband suppression filters, and an earlier output signal of said sideband maximum filter, and a sign of a result of multiplication of said result of subtraction and said digital FM signal; and
second judging means for judging a sign of a result of multiplication of said result of subtraction and an output signal of one of said sideband suppression filters other than said sideband maximum suppression filter.

34. An inversion prevention device as claimed in claim 29, wherein
said inversion detecting means includes:
first detecting means for detecting that said digital FM signal is within a predetermined range;
second detecting means for detecting a maximum point and a minimum point of said digital FM signal;
first judging means for judging whether said digital FM signal and an output signal of a sideband maximum suppression filter, which has a highest suppression ratio among said sideband suppression filters, have the same sign; and
second judging means for judging whether an output signal of one of said sideband suppression filters other than said sideband maximum suppression filter and said output signal of said sideband maximum suppression filter have the same sign.

35. An inversion prevention device as claimed in claim 29, wherein
said inversion detecting means includes:
detecting means for detecting a maximum point and a minimum point of said digital FM signal;
first judging means for judging a sign of a result of subtraction between an output signal of a sideband maximum suppression filter, which has a highest suppression ratio among said sideband suppression filters, and an earlier output signal of said sideband maximum suppression filter, and a sign of a result of multiplication of said result of subtraction and said digital FM signal; and
second judging means for judging a sign of a result of multiplication of said result of subtraction and an output signal of one of said sideband suppression filters other than said sideband maximum suppression filter.

36. An inversion prevention device as claimed in claim 29, wherein
said inversion detecting means includes:
first detecting means for detecting that said digital FM signal is within a predetermined range;
second detecting means for detecting a maximum point and a minimum point of said digital FM signal;
first judging means for judging a sign of a result of subtraction between an output signal of a sideband maximum suppression filter, which has a highest suppression ratio among said sideband suppression filters, and an earlier output signal of said sideband maximum suppression filter, and a sign of a result of multiplication of said result of subtraction and said digital FM signal; and
second judging means for judging a sign of a result of multiplication of said result of subtraction and an output signal of one of said sideband suppression filters other than said sideband maximum suppression filter.

37. An inversion prevention device as claimed in claim 29, wherein
said inversion detecting means includes:
detecting means for detecting a maximum point and a minimum point of an output signal from one of said sideband suppression filters;
first judging means for judging a sign of a result of subtraction between an output signal of a sideband maximum suppression filter, which has a highest suppression ratio among said sideband suppression filters, and a later output signal of said sideband maximum suppression filter, and a sign of a result of multiplication of said result of subtraction and said digital FM signal; and
second judging means for judging a sign of a result of multiplication of said result of subtraction and an output signal of one of said sideband suppression filters other than said sideband maximum suppression filter.

38. An inversion prevention device as claimed in claim 29, wherein said inversion detecting means includes:
   first detecting means for detecting that said digital FM signal is within a predetermined range;
   second detecting means for detecting a maximum point and a minimum point of an output signal from one of said sideband suppression filters;
   first judging means for judging a sign of a result of subtraction between an output signal of a sideband maximum suppression filter, which has a highest suppression ratio among said sideband suppression filters, and a later output signal of said sideband maximum filter, and a sign of a result of multiplication of said result of subtraction and said digital FM signal; and
   second judging means for judging a sign of a result of multiplication of said result of subtraction and an output signal of one of said sideband suppression filters other than said sideband maximum suppression filter.

39. An inversion prevention device as claimed in claim 29, wherein
   said inversion detecting means includes:
      detecting means for detecting a maximum point and a minimum point of said digital FM signal;
      first judging means for judging a sign of a result of subtraction between an output signal of a sideband maximum suppression filter, which has a highest suppression ratio among said sideband suppression filters and a later output signal of said sideband maximum suppression filter, and a sign of a result of multiplication of said result of subtraction and said digital FM signal; and
      second judging means for judging a sign of a result of multiplication of said result of subtraction and an output signal of one of said sideband suppression filters other than said sideband maximum suppression filter.

40. An inversion prevention device as claimed in claim 29, wherein
   said inversion detecting means includes:
      first detecting means for detecting that said digital FM signal is within a predetermined range;
      second detecting means for detecting a maximum point and a minimum point of said digital FM signal;
      first judging means for judging a sign of a result of subtraction between an output signal of a sideband maximum suppression filter, which has a highest suppression ratio among said sideband suppression filters, and a later output signal of said sideband maximum suppression filter, and a sign of a result of multiplication of said result of subtraction and said digital FM signal; and
      second judging means for judging a sign of a result of multiplication of said result of substraction and an output signal of one of said sideband suppression filters other than said sideband maximum suppression filter.

41. An inversion prevention device to prevent an inversion in an FM signal comprising:
   at least one low-sideband emphasis filter receiving a quantized digital FM signal as an input, and suppressing an upper sideband or emphasizing a lower sideband of said digital FM signal;
   at least one sideband suppression filter suppressing either both said upper and lower sidebands or said lower sideband of said digital FM signal;
   inversion detecting means for detecting an inversion of said digital FM signal; and
   selecting means for selecting either said digital FM signal an output signal of said low-sideband emphasis filter or an output signal of said sideband suppression filter, on the basis of output from said inversion detecting means.

42. An inversion prevention device as claimed in claim 41, further comprising:
   a plurality of said low-sideband emphasis filters, each of said low-sideband emphasis filters having a different emphasizing ratio, receiving said digital FM signal as an input, and suppressing said upper sideband or emphasizing said lower sideband of said digital FM signal;
   a plurality of said sideband suppression filters, each of said sideband suppression filters having a different suppression ratio, receiving said digital FM signal as an input and suppressing said upper sideband and said lower sideband or said lower sideband of said digital FM signal; and wherein
   said selecting means selects one of said digital FM signal, an output signal of one of said low-sideband emphasis filters, and an output signal of one of said sideband suppression filters based on said output from said inversion detecting means.

43. An inversion prevention device as claimed in claim 42, wherein
   said inversion detecting means includes:
      detecting means for detecting a maximum point and a minimum point of a detected output signal of one of said sideband suppression filters;
      first judging means for judging whether an output signal of one of said low-sideband emphasis filters and said detected output signal or an output signal of a sideband maximum suppression filter, which has a highest suppression ratio among said side-band suppression filters, have the same sign with reference to an alternate zero level; and
      second judging means for judging whether said digital FM signal or an output signal of one of said sideband suppression filters other than said sideband maximum suppression filter and said output signal of said sideband maximum suppression filter have the same sign.

44. An inversion prevention device as claimed in claim 42, wherein
   said inversion detecting means includes:
      first detecting means for detecting that either a detected output signal of one of said low-sideband emphasis filters or said digital FM signal is within a predetermined range;
      second detecting means for detecting a maximum point and a minimum point of a detected output signal of one of said said sideband suppression filters;
      first judging means for judging whether said detected output signal of said one of said low-sideband emphasis filters and said detected output signal of said one of said sideband suppression filters or an output signal of a sideband maximum suppression filter, which has a highest suppression ratio among said sideband suppression filters, have the same sign with reference to an alternate zero level; and
      second judging means for judging whether said digital FM signal or an output signal of one of said sideband suppression filters other than said sideband maximum suppression filter and said output signal of said sideband maximum suppression filter have the same sign.

45. An inversion prevention device as claimed in claim 42, wherein
said inversion detecting means includes:
detecting means for detecting a maximum point and a minimum point of a detected output signal of one of said sideband suppression filters;
first judging means for judging a sign of a result of substraction between said detected output signal or an output signal of a sideband maximum suppression filter, which has a highest suppression ratio among said sideband suppression filters, and an earlier detected output signal from one of said sideband suppression filters, and a sign of a result of multiplication between said result of subtraction and an output signal of one of said low-sideband emphasis filters; and
second judging means for judging a sign of a result of multiplication between said result of subtraction and said digital FM signal or an output signal of one of said sideband suppression filters other than said sideband maximum suppression filter.

46. An inversion prevention device as claimed in claim 42, wherein
said inversion detecting means includes:
first detecting means for detecting that either a detected output signal of one of said low-sideband emphasis filters or said digital FM signal is within a predetermined range;
second detecting means for detecting a maximum point and a minimum point of a detected output signal of one of said sideband suppression filters;
first judging means for judging a sign of a result of subtraction between said detected output signal of said one of said sideband suppression filters or an output signal of a sideband maximum suppression filter, which has a highest suppression ratio among said sideband suppression filters, and an earlier detected output signal from one of said sideband suppression filters, and a sign of a result of multiplication between said result of subtraction and said detected output signal of said one of said low-sideband emphasis filters; and
second judging means for judging a sign of a result of multiplication between said result of subtraction and said digital FM signal or an output signal of one of said sideband suppression filters other than said sideband maximum suppression filter.

47. An inversion prevention device as claimed in claim 42, wherein
said inversion detecting means includes:
first detecting means for detecting that either a detected output signal of one of said low-sideband emphasis filters or said digital FM signal is within a predetermined range;
second detecting means for detecting a maximum point and a minimum point of said detected output signal of said one of said low-sideband emphasis filters or said digital FM signal;
first judging means for judging whether said detected output signal of said one of said low-sideband emphasis filters and an output signal of one of said sideband suppression filters or an output signal of a sideband maximum suppression filter, which has a highest suppression ratio among said sideband suppression filters, have the same sign with reference to an alternate zero level; and
second judging means for judging whether said digital FM signal or an output signal of one of said sideband suppression filters other than said sideband maximum suppression filter and said output signal of said sideband maximum suppression filter have the same sign.

48. An inversion prevention device as claimed in claim 42, wherein
said inversion detecting means includes:
detecting means for detecting a maximum point and a minimum point of a detected output signal of one of said low-sideband emphasis filters or said digital FM signal;
first judging means for judging a sign of a result of subtraction between a judgment output signal of one of said sideband suppression filters or an output signal of a sideband maximum suppression filter, which has a highest suppression ratio among said plurality of sideband suppression filters, and an earlier judgment output signal, and a sign of a result of multiplication between said result of subtraction and said detected output signal; and
second judging means for judging a sign of a result of multiplication between said result of subtraction and said digital FM signal or an output signal of one of said sideband suppression filters other than said sideband maximum suppression filter.

49. An inversion prevention device as claimed in claim 42, wherein
said inversion detecting means includes:
first detecting means for detecting that either a detected output signal of one of said low-sideband emphasis filters or said digital FM signal is within a predetermined range;
second detecting means for detecting a maximum point and a minimum point of said output signal or said digital FM signal;
first judging means for judging a sign of a result of subtraction between a judgment output signal of one of said sideband suppression filters or an output signal of a sideband maximum suppression filter, which has a highest suppression ratio among said sideband suppression filters, and an earlier judgment output signal, and a sign of a result of multiplication between said result of subtraction and said detected output signal; and
second judging means for judging a sign of a result of multiplication between said result of subtraction and said digital FM signal or an output signal of one of said sideband suppression filters other than said sideband maximum suppression filter.

50. An inversion prevention device as claimed in claim 42, wherein
said inversion detecting means includes:
detecting means for detecting a maximum point and a minimum point of a detected output signal of one of said sideband suppression filters;
first judging means for judging a sign of a result of subtraction between said detected output signal or an output signal of a sideband maximum suppression filter, which has a highest suppression ratio among said sideband suppression filters, and an earlier detected output signal, and a sign of a result of multiplication between said result of subtraction and an output signal of one of said low-sideband emphasis filters; and
second judging means for judging a sign of a result of multiplication between said result of subtraction and said digital FM signal or an output signal of one of said sideband suppression filters other than said sideband maximum suppression filter.

51. An inversion prevention device as claimed in claim 42, wherein said inversion detecting means includes:
first detecting means for detecting that either detected output signal of one of said low-sideband emphasis filters or said digital FM signal is within a predetermined range;
second detecting means for detecting a maximum point and a minimum point of a detected output signal of one of said sideband suppression filters;
first judging means for judging a sign of a result of subtraction between said detected output signal of said one of said sideband suppression filters or an output signal of a sideband maximum suppression filter, which has a highest suppression ratio among said sideband suppression filters, and a later detected output signal from one of said sideband suppression filters, and a sign of a result of multiplication between said result of subtraction and said detected output signal of said one of said low-sideband emphasis filters; and
second judging means for judging a sign of a result of multiplication between said result of substraction and said digital FM signal or an output signal of one of said sideband suppression filters other than said sideband maximum suppression filter.

52. An inversion prevention device as claimed in claim 42, wherein said inversion detecting means includes:
detecting means for detecting a maximum point and a minimum point of a detected output signal of one of said low-sideband emphasis filters or said digital FM signal;
first judging means for judging a sign of a result of subtraction between a judgment output signal of one of said sideband suppression filters or an output signal of a sideband maximum suppression filter, which has a highest suppression ratio among said sideband suppression filters, and a later judgment output signal, and a sign of a result of multiplication between said result of subtraction and said detected output signal; and
second judging means for judging a sign of a result of multiplication between said result of substraction and said digital FM signal or an output signal of one of said sideband suppression filters other than said sideband maximum suppression filter.

53. An inversion prevention device as claimed in claim 42, wherein said inversion detecting means includes:
first detecting means for detecting that either a detected output signal of one of said low-sideband emphasis filters or said digital FM signal is within a predetermined range;
second detecting means for detecting a maximum point and a minimum point of said detected output signal or said digital FM signal;
first judging means for judging a sign of a result of subtraction between a judgment output signal of one of said sideband suppression filters or an output signal of a sideband maximum suppression filter, which has a highest suppression ratio among said sideband suppression filters, and a later judgment output signal, and a sign of a result of multiplication between said result of subtraction and said detected output signal; and
second judging means for judging a sign of a result of multiplication between said result of subtraction and said digital FM signal or an output signal of one of said sideband suppression filters other than said sideband maximum suppression filter.

54. An inversion prevention device to prevent an inversion in an FM signal, comprising:
a sideband suppression filter which receives a quantized digital FM signal as an input and suppresses either both upper and lower sidebands or said lower sideband of said digital FM signal;
inversion detecting means for detecting an inversion of said digital FM signal based on said digital FM signal and an output signal of said sideband suppression filter; and
selecting means for selecting either said digital FM signal or said output signal of said sideband suppression filter based on output from said inversion detecting means.

* * * * *